United States Patent
Sabesan et al.

(10) Patent No.: US 9,367,785 B2
(45) Date of Patent: Jun. 14, 2016

(54) RFID TAG LOCATION SYSTEMS

(75) Inventors: Sithamparanathan Sabesan, Middlesex (GB); Michael Crisp, Cambridge (GB); Richard Penty, Cambridge (GB); Ian H. White, Cambridge (GB)

(73) Assignee: Cambridge Enterprise Limited (GB)

( * ) Notice: Subject to any disclaimer, the term of this patent is extended or adjusted under 35 U.S.C. 154(b) by 673 days.

(21) Appl. No.: 13/643,267

(22) PCT Filed: Apr. 18, 2011

(86) PCT No.: PCT/GB2011/050762
§ 371 (c)(1),
(2), (4) Date: Mar. 19, 2013

(87) PCT Pub. No.: WO2011/135328
PCT Pub. Date: Nov. 3, 2011

(65) Prior Publication Data
US 2013/0201003 A1    Aug. 8, 2013

(30) Foreign Application Priority Data
Apr. 26, 2010 (GB) .................................. 1006904.5
Dec. 17, 2010 (GB) .................................. 1021455.9

(51) Int. Cl.
*G01S 13/08* (2006.01)
*G06K 19/07* (2006.01)
*G01S 7/42* (2006.01)
(Continued)

(52) U.S. Cl.
CPC ............... *G06K 19/0723* (2013.01); *G01S 7/42* (2013.01); *G01S 13/84* (2013.01); *G01S 13/878* (2013.01)

(58) Field of Classification Search
None
See application file for complete search history.

(56) References Cited

U.S. PATENT DOCUMENTS

| 5,148,178 A * | 9/1992 | Holzer et al. ................. 342/127 |
| 2003/0184491 A1* | 10/2003 | Jocher ........................... 343/818 |
| 2004/0092257 A1* | 5/2004 | Chung et al. ................... 455/429 |

(Continued)

FOREIGN PATENT DOCUMENTS

EP           2 146 304 A1    1/2010
WO    WO 2005/085899 A1    9/2005

(Continued)

OTHER PUBLICATIONS

MOJIX http:www.mojix.com.

(Continued)

*Primary Examiner* — Fekadeselassie Girma
*Assistant Examiner* — Cal Eustaquio
(74) *Attorney, Agent, or Firm* — Tarolli, Sundheim, Covell & Tummino LLP

(57) ABSTRACT

We describe a methods of locating an RFID tag. One method transmits tag location signals at a plurality of different frequencies from a plurality of different antennas spaced apart by more than a near field limit distance. The processing determines a phase difference at the plurality of different frequencies by determining a phase difference between either i) two or more of the transmit signals resulting in a maxima in the returned signal RSSI or ii) a first transmit signal and its corresponding return signal. The range determining uses return signals weighted by signal strength. Further data which may be used for averaging may be generated by using the above techniques along with changes in the polarisation state of the transmit and receive antennas and/or physical reconfiguration of the antennas (e.g. switch the transmit and receive elements).

13 Claims, 39 Drawing Sheets

(51) Int. Cl.
*G01S 13/84* (2006.01)
*G01S 13/87* (2006.01)

(56) References Cited

U.S. PATENT DOCUMENTS

| | | | |
|---|---|---|---|
| 2005/0185618 A1* | 8/2005 | Friday et al. | 370/331 |
| 2007/0073513 A1* | 3/2007 | Posamentier | 702/150 |
| 2007/0268138 A1 | 11/2007 | Chung et al. | |
| 2008/0012710 A1 | 1/2008 | Sadr | |
| 2008/0024273 A1 | 1/2008 | Kruest et al. | |
| 2008/0143482 A1 | 6/2008 | Shoarinejad et al. | |
| 2008/0143584 A1* | 6/2008 | Shoarinejad et al. | 342/127 |
| 2009/0005064 A1 | 1/2009 | Malik et al. | |
| 2010/0052857 A1 | 3/2010 | Ozeki et al. | |
| 2010/0202495 A1* | 8/2010 | Kagawa et al. | 375/142 |
| 2010/0207738 A1* | 8/2010 | Bloy | 340/10.3 |
| 2011/0156870 A1* | 6/2011 | Attew | 340/10.1 |

FOREIGN PATENT DOCUMENTS

| | | |
|---|---|---|
| WO | WO 2006/099148 A1 | 9/2006 |
| WO | WO 2007/094868 A2 | 8/2007 |
| WO | WO 2008027650 A2 | 3/2008 |
| WO | WO 2008/118875 A1 | 10/2008 |
| WO | WO 2009/151778 A2 | 12/2009 |
| WO | WO 2010/080468 A1 | 7/2010 |

OTHER PUBLICATIONS

"EPCglobal Specification for RFID Air Interface" available online at: http://www.epcglobalinc.org/standards/uhfc1g2/uhfc1g2_1_2_0-standard-20080511.pdf.

"EPCglogal Class 1 Gen 2 FRID Specification" available online at: http://www.rfidproductnews.com/whitepapers/files/AT_wp_EPCGlobal_WEB.pdf.

GB Search Report for corres. GB1021455.9, date of search Mar. 31, 2011.

Chattopadhyay et al.: *"Analysis of UHF Passive RFID Tag Behavior and Study of Their Applications in Low Range Indoor Location Tracking"*; 1-4244-0878-4/07/$20.00, 2007 IEEE, pp. 1217-1220.

Dobkin: *"The RF in RFID"*, Communications Engineering Series, pp. v-ix, 103, 176-179.

Guo, et al.: *"Research of Indoor Location Method Based on the RFID Technology"*, Proceedings of the 11$^{th}$ Joint Conference on Information Sciences (2008), pp. 1-6.

Hatami, et al.: *"A Comparative Performance Evaluation of RSS-Based Positioning Algorithms Used in WLAN Networks"*; Center for Wireless Information Network Studies, Worcester Polytechnic Institute (WPI), 0-7803-8966-2/05/$20.00 2005 IEEE, pp. 1-7.

Hatami, et al. 2: *"Comparative Statistical Analysis of Indoor Positioning Using Empirical Data and Indoor Radio Channel Models"*, Center for Wireless Information Network Studies (CWINS), Worcester Polytechnic Institute (CWPI), 1-4244-0086-4/05/$20.00 2005 IEEE, pp. 1018-1022.

Li, et al.: *"Multifrequency-Based Range Estimation of RFID Tags"*; 2009 IEEE International Conference on RFID, pp. 147-.

Nikitin, et al.: *"Phase Based Spatial Identification of UHF RFID Tags"*; IEEE RFID 2010, pp. 102-109.

Sabesan, et al.: *"Demonstration of Improved Passive UHF RFID Coverage Using Optically-Fed Distributed Multi-Antenna System"*; 2009 IEEE International Conference on RFID, pp. 217-224.

Viikari, et al.: *"Ranging of UHF RFID Tag Using Stepped Frequency Read-Out"*; IEEE Sensors Journal, vol. 10, No. 9, Sep. 2010, pp. 1535-1539.

Xu, et al.: *"Random Sampling Algorithm in RFID Indoor Location System"*; Proceedings of the Third IEEE International Workshop on Electronic Design, Test and Applications (DELTA '06), pp. 1-6.

Zhao, et al.: *"Research on the Received Signal Strength Indication Location Algorithm for RFID System"*; IEEE 2006, ISCIT, pp. 881-885.

* cited by examiner

RFID TAG LOCATION SYSTEMS

RELATED APPLICATIONS

The present invention claims priority from PCT Application No. PCT/GB2011/050762, filed 18 Apr. 2011; which claims priority from GB 1021455.9, filed 17 Dec. 2010 and GB 1006904.5 filed 26 Apr. 2010, which are incorporated herein in their entirety.

FIELD OF THE INVENTION

This invention relates to systems, methods and computer program code for locating RFID (Radio Frequency Identification) tags, in particular UHF (Ultra High Frequency) RFID tags.

BACKGROUND TO THE INVENTION

RFID has become established in a wide range of applications for the detection and identification of items, allowing substantial amounts of data to be read at greater range than other technologies. Of particular interest is the high frequency (UHF) passive RFID system which promises to offer read ranges of the order of ten metres using tags which do not require their own power source. Improved techniques for longer range reading of a RFID tag in turn stimulates a desire for improved tag location techniques. However RFID tags are typically difficult to locate accurately because of multipath fading, and this can significantly restrict their use in applications where accurate location sensing is important.

In order for a passive UHF RFID tag to be successfully read, it should receive sufficient radio frequency (RF) power for its internal logic to be activated and transmit back to the reader with sufficient signal-to-noise ratio (SNR). This requirement sets limits on the maximum tag range. However, due to the narrowband nature of the signals, fading effects in real environments generate large variations in the free space loss of both up- and downlink directions and can prevent successful reading of the tag, even well within the maximum read range. Therefore in order to fully deploy these passive UHF RFID tags in real applications, robust reading techniques are required for long range conditions.

By expanding the range of view of a single RFID reader, as well as improving the likelihood of successful tag detection, one can envisage RFID systems with wide coverage areas as opposed to the portal systems currently in use today, where sensitivity constraints require the objects to pass close to the reader antennas for detection. In a portal system however, the location of a tagged object can be inferred from the fact that it has passed close enough to the reader to be read. In a wide area RFID system, the simple reading of a tag will not provide sufficient location resolution for many applications. As a result interest has also arisen in being able to estimate the location of the tag in such systems. Due to the complex multipath environment commonly encountered in RFID implementations, fading and nulls result in the RSSI being only a weak function of range and hence providing location in passive RFID system is a major challenge.

Several studies have been undertaken to enhance passive UHF RFID system performance. However, standard RFID systems currently cannot prevent errors (i.e. 100% probability of a successful read). By way of example, "The RF in RFID—passive UHF RFID in practice" by Daniel M. Doubkin proposes a number of ways of improving SNR: The author suggests that inclusion of a 90° phase shift either the in in-phase (I) or quadrature (Q) channel in the conventional direct-conversion I/O demodulator improves the SNR of the tag backscattered signal since the phase of the backscattered signal is unpredictable due to its dependent on the distance from the tag.

By way of further example, Mojix (http://www.mojix.com/) has a passive UHF RFID system with phased array of antennas (i.e. the antennas are in the near field region of one another). This allows phased array techniques to be employed, for example digital beam forming steering to maximise the link budget. This enables improved receiver sensitivity and transmitters which provide radio frequency (RF) signals in the industrial, scientific and medical (ISM) band (902 MHz and 928 MHz) for activating the tags. Using this scheme a 99.9% tag detection is claimed. Details can be found, for example in: WO2007/094868, WO2008/118875 and WO2008/027650. Further background can be found in: EP2146304 and in US 2008/0024273.

The EPC global UHF Class 1 Generation 2 RFID protocol standard allows frequency hopping spread spectrum (FHSS) technique in the US and listen-before-talk technique in the UK to overcome interference in multiple- and dense-interrogator environment [EPCglobal Specification for RFID Air Interface, online available: http://www.epcglobalinc.org/standards/uhfc1g2/uhfc1g2 1 2 0-standard-20080511.pdf;] [EPCglobal Class Gen 2 RFID Specification, Alien, online available: http://www.rfidproductnews.com/whitepapers/files/AT wp EPCGlobal WEB.pdf].

To date, a number of location schemes for passive RFID have been proposed. The most common techniques are based on received signal strength indicator (RSSI) location algorithms:

Hatami and K. Pahlavan, "A Comparative Performance Evaluation of RSSI-Based Positioning Algorithms Used in WLAN Networks," in *Proc IEEE Wireless Communications and Networking Conference*, pp. 2331-2337, 2005]; [A. Hatami and K. Pahlavan, "Comparative Statistical Analysis of Indoor Positioning Using Empirical Data and Indoor Radio Channel Models," in *Proc IEEE CCNC* 2006, pp. 1018-1022, 2006]; [B. Xu and W. Gang, "Random Sampling Algorithm in RFID Indoor Location System," in *Proc Third IEEE International Workshop on Electronic Design, Test and Applications*, pp. 168-176, 2006]; [J. Zhao, Y. Zhang and M. Ye, "Research on the Received Signal Strength Indications Algorithm for RFID System," in *Proc ISCIT* 2006, pp. 881-885, 2006]; [F. Guo, C. Zhang, M. Wang and X. Xu, "Research of Indoor Location Method Based on the RFID Technology," in *Proc 11th Joint Conference on Information Sciences* 2008, 2008]; [A. Chattopadhyay and A. Harish, "Analysis of UHF passive RFID tag behaviour and study of their applications in Low Range Indoor Location Tracking," *IEEE Antennas and Propagation Society International Symposium, pp.* 1217-1220, 2007.

However due to the complex multipath environment commonly encountered in RFID implementations, fading and nulls result in the RSSI being only a weak function of range.

In active RFID, radar and other wireless systems, a number of powerful location techniques such as time difference of arrival (TDOA) and phase difference of arrival (PDOA) are used. Due to narrow bandwidth available for passive RFID, the TDOA technique cannot be applied to locating passive tags. This is because the narrow bandwidth gives insufficient time resolution for typical RFID ranges.

The PDOA technique can be applied to passive RFID. However, this only works well for line-of-sight communication (i.e. in free-space). In real environments, the PDOA technique suffers from multi-path fading as the fading introduces ambiguities in phase measurements (the phase shift of a direct path returned signal cannot accurately be determined from the sum of multi-path signals. This challenge is also addressed by Pavel V. Nikitin et al, in "Phase Based Spatial Identification of UHF RFID Tags", IEEE RFID 2010.

However, a number of researchers claim to estimate range using this technique. For example, Ville Viikari et al, in "Ranging of UHF RFID Tag Using Stepped Frequency Read-Out", IEEE RFID 2010 and Xin Li et al, in "Multifrequency-Based Range Estimation of RFID Tags", IEEE RFID 2009. By way of further example, a number patents also claim to estimate location based on PDOA. For example, Alien technology and Symbol technologies outlines location technique based on PDOA technique as described in WO 2006/099148 A1 and AU 2010200808 A1 respectively. However, to our knowledge this technique only works reliably for up to a short range (i.e. up to 3 or 4 m) due to multi-path fading.

A technique for transmitting signals at a plurality of antenna polarisations for improved reading of an RFID tag is described in US 2010/0052857. Mojix also outlines a location approach using PDOA technique over a phased array antenna system as described in WO2009151778 (A2).

However there is a need for improved techniques for reading in particular UHF passive RFID tags, and for locating such tags.

SUMMARY OF THE INVENTION

To aid in understanding the invention we first describe some techniques for tag reading.

Thus we first describe an RFID tag reading system for reading one or more RFID Tags, the system comprising an RF transmitter and an RF receiver, a plurality of transmit/receive antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of an RF tag interrogation signal simultaneously from said plurality of antennas and receiving a signal from one or more of said tags, a said tag read round having a set of time slots during which a said tag is able to transmit tag data including a tag ID for reception by said antenna, and wherein said system is configured to perform, during a said tag inventory cycle, one or both of: a change in a frequency of said tag interrogation signal transmitted simultaneously from said plurality of antennas, and a change in a relative phase of a said RF tag interrogation signal transmitted from one of said antennas with respect to another of said antennas.

By combining the RF Signals from the antennas in a system which employs spatial diversity (that is the antennas are spaced so as not to comprise a phased array), and by changing one or both of the transmit frequency and relative phase during an inventory cycle more tags can be read. Counter-intuitively the system also allows a large population of tags to be inventorised more quickly because there are fewer collisions (although one might expect more if more tags are visible). Evidence for this is provided later. In embodiments the frequency/phase is changed on a relatively rapid time scale, for example over a time period of less than one second, 500 ms or 300 ms. Combining the RF signals from multiple antennas results in a reduced number of collisions compared with switching antennas.

An RFID tag is preferably configured to operate in accordance with a protocol for reading multiple passive RFID tags in a common region of space, for example the EPC Gen 2 protocol (ibid). In such a protocol an estimate may be made of the total number of tags and rounded up to the next power of 2, thus defining the number of transmit slots for the tags to use. This number is transmitted to the tags and enables a tag to select a slot in which to transmit and, once read, to keep silent (eventually re-awakening). (The phrase "inventory round" is defined in EPC Gen 2; this definition is explicitly incorporated by reference). During the tag read round we refer to above tags are read during the available time slots and, in embodiments, the frequency and/or relative phase is then changed before performing another tag read round. This is because a proportion, for example around half, of the tags are read in a read round; in some preferred embodiments the number of available slots for the tags is updated to the next power of 2 above the remaining total of number of tags to be read (noting that this may be an estimate as the total number of tags may be unknown). In embodiments this procedure is repeated, for example until no more tags can be read, or for a given or predetermined duration, or indefinitely (since tags eventually re-awake).

Some preferred implementations of the procedure change the relative phase of the transmitted signals at each antenna during the tag inventory cycle. In such an approach the transmitted signal phase at one antenna may be defined as a reference against which to determine the phases at the other antennas.

The system may also be configured to adjust a transmit power or receive antenna gain prior to combining the RF signals, to optimise the combined received RF signal, for example to maximise signal-to-noise ratio or minimise a bit or packet error ratio.

In some preferred implementations the system has at least three spatially diverse antennas which, unlike a switched antenna system, gives improved performance. In embodiments the RFID tags are passive UHF (300 MHz-3000 MHz) RFID tags, preferably operating at a frequency of less than 1 GHz, and preferably the antennas are mutually separated by at least 1 meter, 2 meters, 5 meters, 10 meters or 20 meters.

The above described system can provide greatly improved read/write performance, usable at increased ranges, with improved tag reading SNR (signal-to-noise ratio)—in particular in embodiments it has been found possible to read substantially 100% of tags present in a region bounded by lines joining the antennas, and to substantially eliminate the effects of nulls.

As further background we also describe a method of using an RFID tag reading system for reading one or more RFID tags, the system comprising an RF transmitter and an RF receiver, a plurality of transmit/received antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of one or more RF tag interrogation signal simultaneously from said plurality of antennas and receiving a signal from one or more of said tags, a said tag read round having a set of time slots during which a said tag is able to transmit tag data including a tag ID for reception by said antenna, the method comprising changing, during a said tag inventory cycle, one or both of: a relative phase of a said RF tag interrogation signal transmitted from one of said antennas with respect to another of said antennas, and a frequency of said tag interrogation signal transmitted simultaneously from said plurality of antennas.

Tag Location

According to a first aspect of the invention there is provided a method of locating an RFID tag, the method comprising: transmitting tag location signals from a plurality of different transmit antennas, wherein said antennas are spaced apart by more than a near field limit distance at a frequency of a said signal; receiving a corresponding plurality of receiving return signals from said tag; and processing said tag return signals to determine a range to said tag; wherein said transmitting comprises transmitting at a plurality of different frequencies; wherein said processing comprises determining a phase difference at said plurality of different frequencies to determine said range, and wherein said determining of said phase difference determines a phase difference between either i) two or more of said transmit signals (in embodiments resulting in a maxima in the returned signal RSSI) or ii) a first transmit signal and its corresponding return signal; and wherein said determining of said range to said tag uses said return signals weighted responsive to a respective received signal strength of the return signal.

Thus in embodiments of this method a combination of signal phase and received signal strength indication (RSSI) is used in combination with a plurality of separated antennas in order to provide a more accurate tag location. The antennas are sufficiently separated to be outside the near field region of one another, that is spaced apart such that $D^2/(4\lambda)$ is greater than 1 where D is a maximum dimension of the antenna.

Broadly speaking embodiments of the technique determine a rate of change of phase with frequency, and use this to determine tag range. The change of phase with change in frequency is, in some preferred embodiments, determined by one of two techniques, one which employs a switched antenna system in which the transmit and receive antennas are selected from a set of two or more antennas, another using a distributed antenna system (DAS) in which signals are transmitted from a plurality of antennas simultaneously.

In embodiments of the former approach signals at two different frequencies with a fixed offset are used, varying one of the frequencies (and hence varying both) and determining a difference between transmit signal and return signal phase. (Alternatively, in other approaches, a variable frequency offset may be employed). The transmitted signal comprises a transmission at a plurality of different frequencies, but these different frequencies may be transmitted separately or at the same time (we describe later systems which transmit multiple frequencies simultaneously). In embodiments the receive and transmit antennas may be alternated or exchanged, for example to provide an extra data point at each frequency (the multipath in the two cases is different because the tag response is nonlinear, that is the tag reflection is generally a function of the received power). In an alternative embodiment, the transmit and receive antenna polarisations may be altered.

In the second, distributed antenna system approach two or more transmit signals are transmitted simultaneously towards the RFID tag and their relative phase is adjusted or dithered to identify a reference relative phase angle between each pair. In embodiments preferably, but not necessarily, the phase shift which provides a maximum received signal strength is identified. This effectively measures the signal phase at the tag since the two transmitted signals are in phase at the tag when there is a maximum reflected return (although in principle other fiducial phase shifts could be identified). The effect of such an approach is to halve the multipath fading because the signal is in effect being measured in one direction only. Alternatively, to appreciate this each channel to the tag comprises an amplitude and a phase modulation due to multipath, but the sum of the two channels still comprises just one amplitude and one phase modulation. The skilled person will appreciate that when transmitting signals to the tag simultaneously at multiple-different frequencies, adjusting their relative phase to adjust the phase of the signal at the tag, only one of these need carry tag command data and signals at the one or more other frequencies may simply comprise/consist of a carrier unmodulated by data for the tag.

In either case improved robustness to multipath can be achieved by employing a combination of narrow beam (for example 30°-45°) and wide beam (for example greater than 50°) antennas.

In either case, robustness of a range measurement based upon on change in phase with change in frequency to multipath fading is improved by, in broad terms, weighting the phase measurements based upon received signal strength. In some preferred embodiments one or both of two approaches are employed. To avoid data from deep fades in embodiments the method thresholds the phase measurement based upon received signal strength, more particularly disregarding measurements where the RSSI is less than a threshold. Then, in some preferred implementations, a prediction-correction filter such as a Kalman filter or particle filter is employed to predict variation of phase difference with frequency change, correcting this using the phase measurement data. In such an approach the RSSI of a signal or signals from which the phase measurements are derived (that is, of a return signal from the tag) is used as a measure of the variance of the phase measurements, in effect a phase variance weighting for the, for example, Kalman filter. In embodiments a frequency sweep is employed to provide a series of phase measurements for input to the prediction-correction filter, but in other approaches a selected or random scatter of frequency data points within a range may be employed to gather the data for the filter. Broadly speaking the prediction-correction filter is predicting the trajectory of change of phase with change of frequency.

Depending upon the implementation, the method may include a calibration step, for example to calibrate out a fixed phase shift to an antenna in a co-ax or RF-over-fibre system. Where a Kalman filter is employed it is preferable to tune the coefficients to provide optimum location information; this can be achieved through routine experimentation.

The skilled person will appreciate that the above-described techniques may be extended to more than two transmit/receive antennas. For example, in the case of a three transmit antenna distributed antenna system the phase of one transmitted signal may be used as a reference, the phase of the signals from the second and third transmit antennas both being varied with respect to this to achieve maximum RSSI.

Since the back-end Kalman filter is similar for both the switched and distributed antenna approaches, in principle common hardware may be employed and the system may be configured to use either or both of these approaches to determining the location of a tag.

The invention also provides a tag location system comprising modules for implementing the various aspects and embodiments of the invention described above.

Thus in a related aspect the invention provides a system for locating an RFID tag, the system comprising: a transmitter to transmit tag location signals from a plurality of different transmit antennas, wherein said antennas are spaced apart by more than a new field limit distance at a frequency of a said signal; a receiver to receive a corresponding plurality of receiving return signals from said tag; and a processor to process said tag return signals to determine a range to said tag; wherein said transmitting comprises transmitting at a plurality of different frequencies; wherein said processing comprises determining a phase difference at said plurality of different frequencies to determine said range, and wherein said determining of said phase difference determines a phase difference between either i) two of said transmit signals or ii) a first transmit signal and its corresponding return signal; and wherein said determining of said range to said tag uses said return signals weighted responsive to a respective received signal strength of the return signal The system still further provides a data carrier carrying processor control code to, when running, process said tag return signals to determine a range to said tag; wherein said transmitting comprises transmitting at a plurality of different frequencies; wherein said processing comprises determining a phase difference at said plurality of different frequencies to determine said range, and wherein said determining of said phase difference determines a phase difference between either i) two of said transmit signals or ii) a first transmit signal and its corresponding return signal; and wherein said determining of said range to said tag uses said return signals weighted in responsive to a respective received signal strength of the return signal We will also describe techniques for more rapid access to tag-related data. This may be tag location data and/or it may be data read from an RFID tag.

Thus in a second aspect the invention provides a method of determining tag-related data from a tag employing modulation of a reflected signal, the method comprising: transmitting data towards said tag from at least one transmit antenna, wherein said transmitted signal comprises a signal having at least two different discrete transmit frequencies simultaneously, and wherein either the same tag command data is transmitted on each of said discrete frequencies, or one or more of said discrete frequencies consists of a carrier and one or more others of said discrete frequencies transmit the or the same tag command data; modulating, at said tag, said at least two different discrete frequencies at the same time to generate a modulated return signal having said at least two different discrete frequencies at the same time; receiving said modulated return signal at at least one receive antenna; and determining said tag-related data from signals received from said tag at said different discrete frequencies.

The inventors have recognised that in general an RFID tag has a relatively broadband response, in particular where it employs backscatter modulation (amplitude or phase shift keying). Thus, for example, a UHF RFID tag is often designed to work in both Europe and the United States, and thus over a band of 860-930 MHz. This recognition in turn leads broadly to the above described aspect of the invention, in which multiple frequencies are transmitted simultaneously from the same, or different antennas to, in effect, parallelise the tag reading and/or location operation, which in embodiments is according to one of the improved techniques previously described. The different frequencies employed are discrete frequencies and, unlike say a multiple-carrier system, are all modulated with the same baseband data so that the tag receives the same command on each of the different frequencies and is therefore not confused. (Because the data rates involved in communicating with RFID tags are relatively slow there is no significant skew problem). It will be appreciated that the reader/receiver is frequency selective.

Although a single transmit antenna may be employed, in some preferred embodiments signals are transmitted from at least two transmit antennas in a distributed antenna system (DAS) approach. In either single or multiple transmit antenna embodiments the transmitted signal phase at each frequency may be independently adjustable to enable a DAS-based tag location technique as previously described to be employed. Preferably the phase measurement information is weighted by received signal strength as previously described.

In a related aspect of the invention there is provided a method of determining tag-related data from a tag employing backscatter modulation of a reflected signal, the method comprising: transmitting data towards said tag from a plurality of transmit antennas using a plurality of transmitted signals, wherein the same tag command data is transmitted from each said antenna, and wherein each of said transmitted signals comprises a signal having at least two different discrete transmit frequencies simultaneously; modulating, at said tag using backscatter modulation, said at least two different discrete frequencies at the same time to generate a plurality of modulated backscatter signals each having said at least two different discrete frequencies at the same time; receiving said modulated backscatter signals at at least one receive antenna; and determining said tag-related data from a combination of said modulated backscatter signals at said different discrete frequencies.

The above described techniques can be employed to rapidly read data from a tag additionally or alternatively to locating the tag. Thus in some tag reading embodiments a simple selection of the strongest return signal at one of the multiple simultaneous frequencies is selected for use in retrieving data from the tag. In preferred embodiments the tag is a passive RFID tag.

In a further related aspect the invention provides an interrogation transceiver system for use in a method as described above. The interrogation transceiver system comprises a plurality of transceiver circuits for simultaneous operation, each configured to transmit at a different frequency, wherein each of the transceiver circuits is coupled to a common antenna interface.

The antenna interface may comprise, for example, an RF-over-fibre interface; the same antenna may be used for both transmitting and receiving, or separate may be employed.

In embodiments the transceiver includes a transceiver controller to apply one or both of frequency control and phase control to each of the transceiver circuits. In embodiments this may be coupled to a common tag data protocol handling module for communicating with a tag. When processing the received tag data, in some embodiments a separate RF front end is employed for each frequency, and then the signals are mixed down to base band and low pass filtered before being digitized. In other approaches the signals are together mixed down to approximately base band, digitized using a fast digitizer, and then frequency separation is performed in software. The skilled person will be aware of other approaches which may be employed. Once digitized signal data is available measurement of received signal strength at each frequency, and optionally if locating a tag, phase, is performed in software. Then preferred embodiments also include software and/or hardware for RSSI-dependent tag reading and/or tag location, in embodiments of the latter employing RSSI-weighted phase measurement data preferably in combination with a prediction-correction filter such as a Kalman filter.

Alternative Approach

In an alternative approach, the invention further provides a method of locating an RF device using an RF device interrogation system having a plurality of antennas to communicate with said RF device, said interrogation system comprising a transmitter to transmit an interrogation signal to a said RF device simultaneously from said plurality of antennas and a receiver to receive a combined signal simultaneously from said plurality of antennas, wherein said antennas are distributed over a region of space and spaced apart from one another sufficiently for one said antenna not to be within the near field of another said antenna, the method comprising: calibrating a response of said interrogation system over said region of space by moving a said RF device over a plurality of known locations to determine calibration data for said RF device interrogation system, wherein said calibrating further comprises: i) changing one or both of: a relative phase of said interrogation signal transmitted from one of said antennas with respect to said interrogation signal transmitted from another of said antennas, and a frequency of said interrogation signal transmitted from said plurality of antennas; and ii) determining a combined received signal strength from said plurality of antennas, wherein said combined received signal strength comprises a signal strength of combined RF signals from said plurality of antennas; determining device-locating data defining an RF signal strength from each of said plurality of antennas and a combined received signal strength from combined RF signals received from said plurality of antennas for a said RF device to be located, wherein said determining comprises changing one or both of: a relative phase of said interrogation signal transmitted from one of said antennas with respect to said interrogation signal transmitted from another of said antennas, and a frequency of said interrogation signal transmitted from said plurality of antennas; and determining, using said calibration data, a location for said RF device to be located from said device-locating data including said combined received signal strength.

These techniques are particularly applicable to locating RFID tags but may, in principle, be employed in other location systems, for example to locate an RF device in a WiFi® system. Thus in some preferred embodiments said RF device is an RFID tag, in particular a passive RFID tag. Embodiments of the technique can be employed in situations where multiple tags may be present in a common region of space.

In embodiments of the technique by sweeping phase and/or frequency and recording a combined RF received signal strength together with other individual or combined antenna received signal strengths much more accurate tag location is possible than hitherto. Further embodiments of the technique may be employed for reading and locating multiple passive RFID tags within the region of space defined by the antennas. The calibration data defines, in effect, a calibration of the tag interrogation system in terms of the frequencies/phases, position in two (optionally three) dimensions, and received signal strength(s). It will be appreciated that in embodiments the combined RF signals are received simultaneously from the plurality of antennas from a single tag at a time.

The calibration data may be used to locate the tag either by matching data from the tag to be located to a map defined by the calibration data, or by using the calibration data to define one or more environmental parameters in an analytical expression relating the tag locating data to a location for an RFID tag. Thus in one approach a tag location is determined by determining the closest match of the combined received signal strength at one or more specified relative phases and/or frequencies (used in the location procedure) to a known location of the calibration process. Optionally interpolation between known calibration points may be employed. The combined RF signal strength will not in general define an unambiguous location for a tag—for example it may define a set of locations comprising an approximate ring around location of each antenna. Thus in embodiments the RF signal from a nearest predicated individual antenna may be employed to disambiguate the location of the RFID tag. In such a case the signal strength from the nearest predicted individual antenna and the combined RF signal strength may be differently weighted, for example giving the signal strength from the nearest predicted individual antenna a greater weight than the combined RF signal strength.

In an alternative approach the calibration data defines one or more parameters of an analytical expression as previously mentioned, for example an ITU (International Telecommunication Union) path loss equation for the relevant radio propagation environment. For example where incremental path loss (in dB) is given by $10\gamma \log_{10}(d/d_0)$ where $d_0$ is a reference distance and $\gamma$ is a path loss exponent the calibration data may be employed to define a value for $\gamma$ dependent on the frequency and/or phase(s). This will, in general, define a locus of permitted locations for the RFID tag to be located. The nearest predicted individual antenna to the tag may then be determined, for example by selecting the antenna with the maximum signal strength, thus defining, for example, a locus comprising a ring around this antenna. The relative signal strength from two other antennas may then be used to define a position on a line between these antennas; this position together with the location of the nearest predicted antenna defining a direction or vector which incepts the aforementioned ring to define an estimated location for the RFID tag to be located.

In embodiments of the procedure additionally or alternatively to employing individual received signal strengths from the antennas, combinations or subsets of the plurality of antennas may be employed, with the aim of avoiding severe nulls. As, for example, a combination of signals from two antennas a reduced risk of not seeing a tag located in null. Thus in embodiments as well as individual antenna received signal strengths, signal strengths from pairs, for example all possible pairs, of antennas are also generated by combining the RF signals from these pairs of antennas and these are then employed in finding a location for the tag, for example by finding the closest match to the tag locating data or map.

As previously mentioned, embodiments of the technique are particularly useful for locating a plurality of passive RFID tags within the region of space covered by the antennas, in particular where the tags employ a protocol such as the EPC Gen 2 protocol providing time slots during which individual tags may be accessed.

In an extension of the system, in particular one comprising one or more sets of three antennas, the distributed antenna system may be employed both for communications and for RFID. This is because a three-antenna system facilitates the definition of both generally hexagonal cells for the communication system and triangles for the RFID tag location. Thus a single antenna, for example the middle antenna of a pattern of six may serve as a communications cell antenna for a communications system such as Wifi or the like, and may also serve as one antenna for each of six triangles within the set of six surrounding antennas to provide RFID tag location regions. In embodiments the communications system and RFID tags may employ different communications frequencies and/or polarisations—for example circular polarisation can be preferred for UHF RFID tag location.

In a related aspect the invention provides a system for locating an RF device using an RF device interrogation system having a plurality of antennas to communicate with said RF device, said interrogation system comprising a transmitter to transmit an interrogation signal to a said RF device simultaneously from said plurality of antennas and a receiver to receive a combined signal simultaneously from said plurality of antennas, wherein said antennas are distributed over a region of space and spaced apart from one another sufficiently for one said antenna not to be within the near field of another said antenna, the system comprising: means for calibrating a response of said interrogation system over said region of space by moving a said RF device over a plurality of known locations to determine calibration data for said RF device interrogation system, wherein said means for calibrating further comprises: i) means for changing one or both of: a relative phase of said interrogation signal transmitted from one of said antennas with respect to said interrogation signal transmitted from another of said antennas, and a frequency of said interrogation signal transmitted from said plurality of antennas; and ii) means for determining a combined received signal strength from said plurality of antennas, wherein said combined received signal strength comprises a signal strength of a combined RF signals from said plurality of antennas; means for determining device-locating data defining an RF signal strength from each of said plurality of antennas and a combined received signal strength from combined RF signals received from said plurality of antennas for a said RF device to be located, wherein said determining comprises changing one or both of: a relative phase of said interrogation signal transmitted from one of said antennas with respect to said interrogation signal transmitted from another of said antennas, and a frequency of said interrogation signal transmitted from said plurality of antennas; and means for determining a location for said RF device to be located from said device-locating data including said combined received signal strength, using said calibration data.

The invention further provides an RFID tag interrogation system signal processor for locating an RFID tag using an RFID tag interrogation system having a plurality of antennas, to communicate with said tag, said interrogation system comprising a transmitter to transmit an interrogation signal to a said tag simultaneously from said plurality of antennas and a receiver to receive a combined signal simultaneously from said plurality of antennas, wherein said antennas are distributed over a region of space and spaced apart from one another sufficiently for one said antenna not to be within the near field of another said antenna, the signal processor comprising: a calibration module to calibrate a response of said interrogation system over said region of space by moving a said RFID tag over a plurality of known locations to determine calibration data for said RFID tag interrogation system, said calibration module being configured to: change one or both of: a relative phase of said interrogation signal transmitted from one of said antennas with respect to said interrogation signal transmittal from another of said antennas, and a frequency of said interrogation signal transmittal fro said plurality of antennas; determine combined a combined received signal strength from said plurality of antennas, wherein said combined received signal strength comprises a signal strength of combined RF signals from said plurality of antennas; determine tag-locating data defining an RF signal strength from each of said plurality of antennas and a combined received signal strength from combined RF signals received from said plurality of antennas for a said RFID tag to be located, wherein said determining comprises changing one or both of: a relative phase of said interrogation signal transmitted from one of said antennas with respect to said interrogation signal transmitted from another of said antennas, and a frequency of said interrogation signal transmitted from said plurality of antennas; and determine, using said calibration data, a location for said RFID tag to be located from said tag-locating data including said combined received signal strength.

The invention further provides processor control code to implement the above-described systems and methods, for example on a general purpose computer system or on a digital signal processor (DSP). The code may be provided on a carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

It will be appreciated that features of the above described aspects and embodiments of the invention may be combined.

In some particularly preferred embodiments where long distance transmission is necessary (i.e. over 100 m), the RF signals to and/or from the antennas or antenna units are carried by RF-over-fibre apparatus/methods. Likewise in short transmission distances co-ax, or twisted pair cables (i.e. CAT-5/6) are preferred.

BRIEF DESCRIPTION OF THE DRAWINGS

These and other aspects of the invention will now further described, by way of example only, with reference to the accompanying Figures as follows.

DETAILED DESCRIPTION OF PREFERRED EMBODIMENTS

Multiple fiber-fed antennas can improve the coverage of an RFID system [S. Sabesan, M. Crisp, R. Penty, I. White, "Demonstration of Improved Passive UHF RFID Coverage using Optically-Fed Distributed Multi-Antenna System," *IEEE International Conference on RFID*, April 2009]. We now show how enhanced coverage can be achieved by manipulating the phase differences and carrier frequency of the read/write signals to the RFID tag from the multiple antennas which are placed outside each other's near field.

Figure 1:
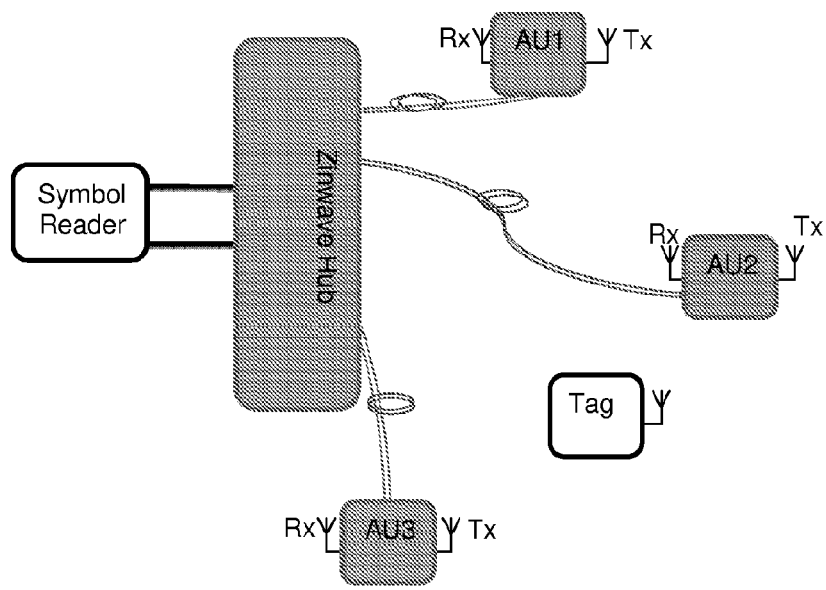
FIG. 1. Triple antenna distributed antenna system (DAS) combined with Symbol reader.
Figure 2:
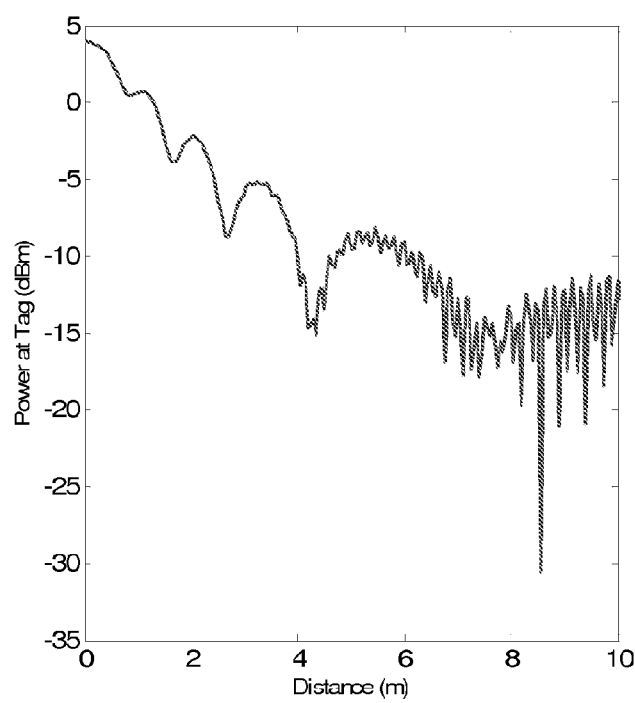
FIG. 2. Plot of power at tag as a function of distance away from an antenna for a triple antenna DAS.

Thus we describe read/writer system which operates over a distributed antenna system (DAS). Although coax-based systems, or those using other transmission media could be used, our work has focussed primarily in using radio over fibre (RoF) systems to transmit and receive signals from antenna units (AUs) to RFID tags. The use of several antennas reduces system errors due to nulls compared to passive RFID system using single omni- and directional antennas because of spatial diversity as shown in FIG. 1. However, multi-path effects (due to reflections from floors, ceilings, and walls, etc) and destructive interference occurring between signals from different antennas in the DAS results in deep fading as shown in FIG. 2 for a modelled simple environment. We make use of the fact that the RFID tags operate over a range of carrier frequencies which, although small, is sufficient so that frequency dithering can allow the movement of nulls from specific positions, and along with control of the amplitude transmitted at each antenna, the depth of remaining nulls can be reduced. By using this combined approach substantially error-free reading and writing as well as enhanced returned signal strength (RSSI) can be achieved for distances, in embodiments of up to 20 m.

Figure 3:
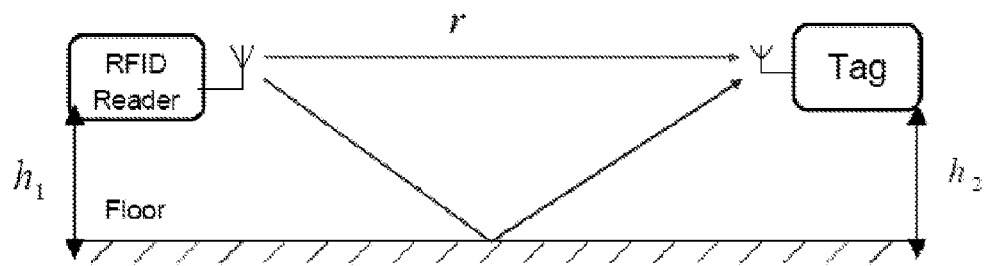
FIG. 3. Two ray model; red line represents the direct path and blue line represents the reflected path from the floor.
Figure 4:
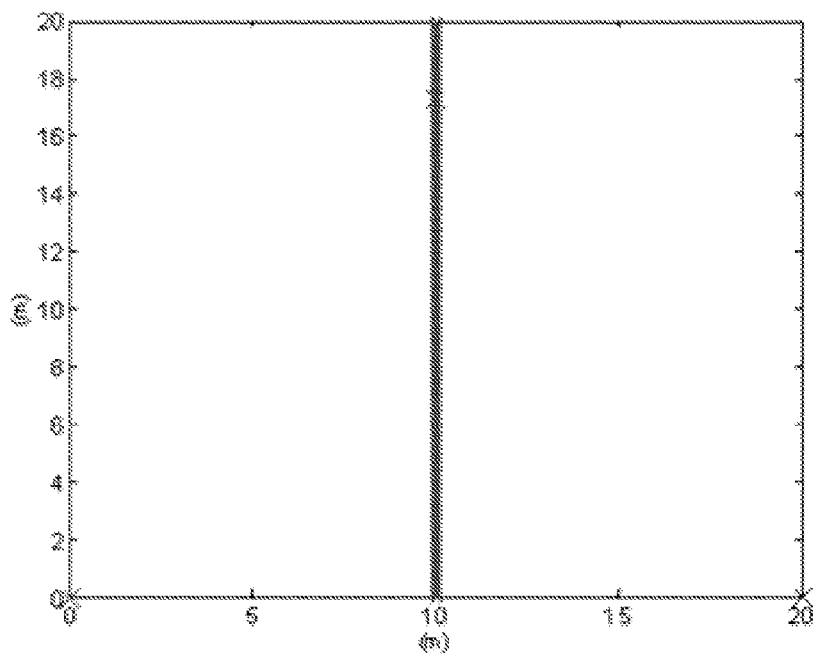
FIG. 4. Antenna arrangement in a 20 m×20 m area. Blue crosses represent the position of the antennas and red crosses indicates the grid points where the power is calculated.
Figure 5:
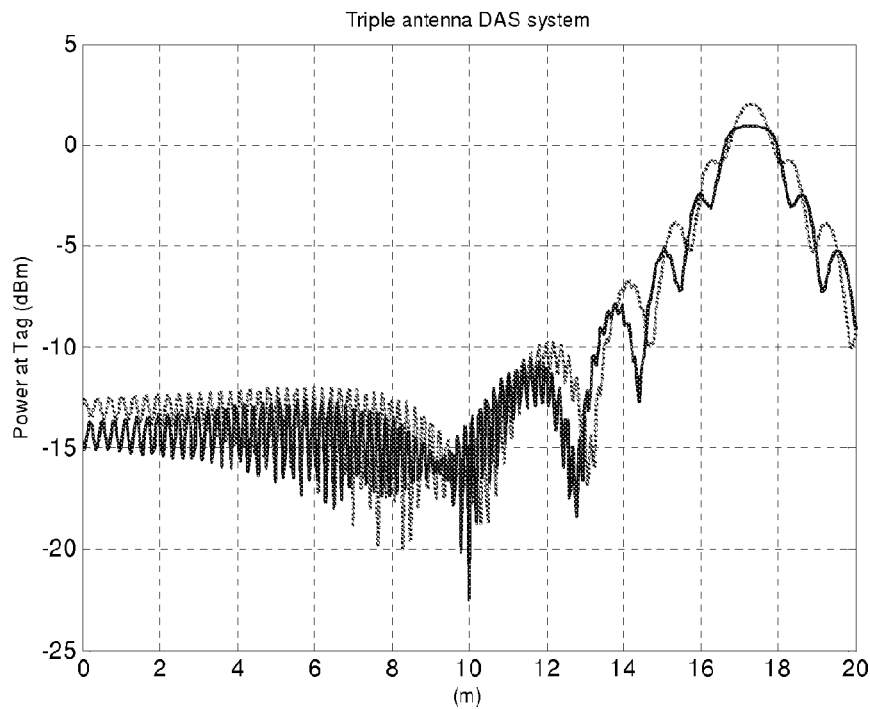
FIG. 5. Plot of power at tag as a function of distance for a triple antenna DAS. This shows how nulls move with frequency. Red and blue represent 860 MHz and 920 MHz respectively.
Figure 6:
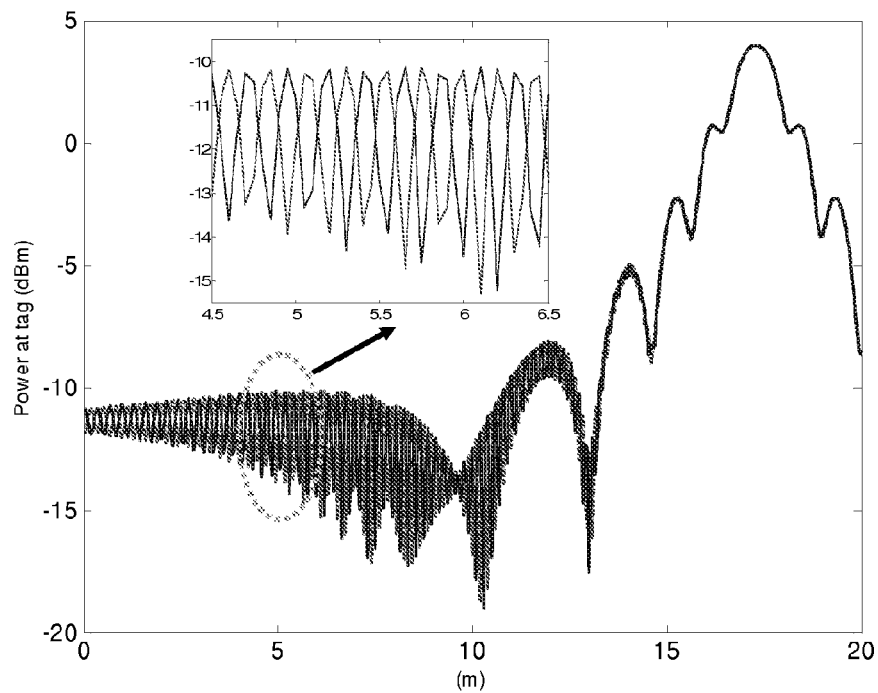
FIG. 6. Plot of power at tag as a function of distance for a triple antenna DAS. This shows how nulls move with phase. Red and blue represent 0, 0, 0 and 8, 0, $\pi$ phase angle of each antenna respectively.

By way of example, three antennas are placed in 20 m apart and a simple 2-ray model (FIG. 3) is used to calculate the power along the red crosses as shown in FIG. 4. It is clearly shown that the nulls move with the frequency and phase dithering as shown in FIGS. 5 and 6 respectively. Therefore, if a tag interrogation procedure is carried out in several frequency and phase configurations, a tag at any given location will not experience a null in one of the combinations Since the tag is generally at an unknown location in an unknown environment, the "correct" combination of amplitudes and frequencies which result in constructive interference at the tag may be found by an exhaustive search.

Figure 7:
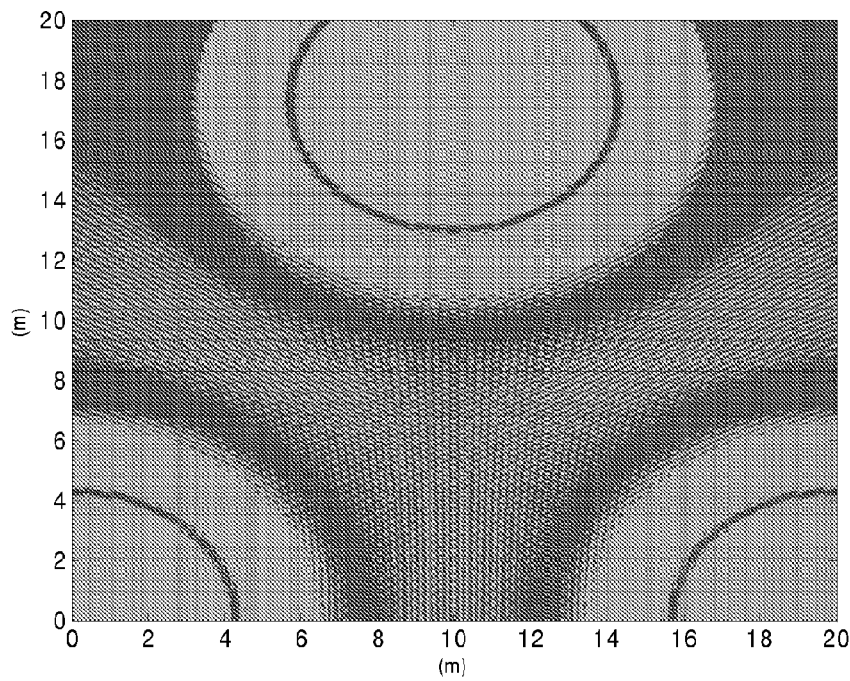
FIG. 7. A plot of spatial variation in the signal power using a 2-ray model. Green represents above −15 dBm power level and red represents below −15 dBm power level which represents nulls. The number of read locations is 55.7%.
Figure 8:
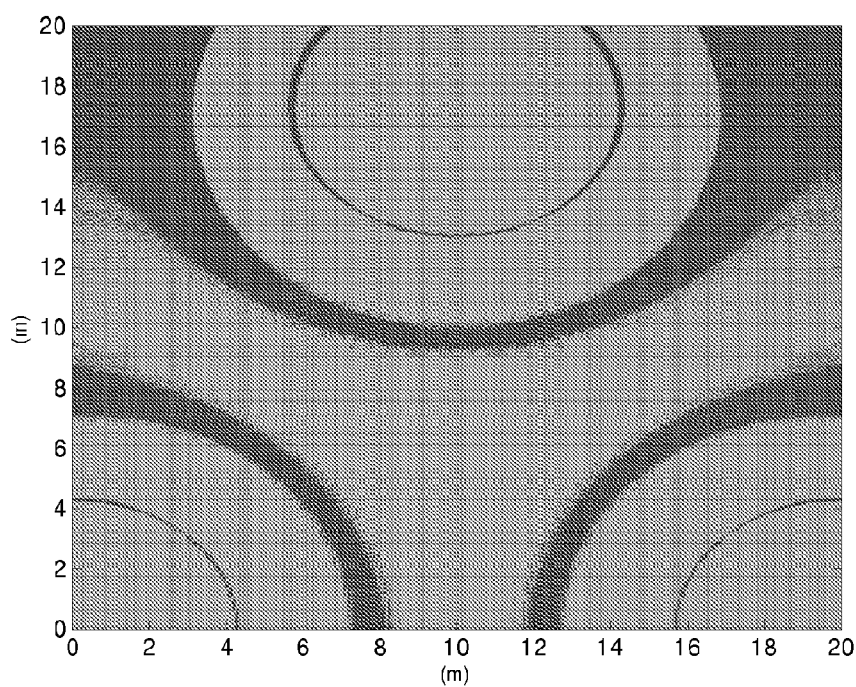
FIG. 8. A plot of spatial variation in the signal power with each antenna shifted by $\pi$ (180°) in turn. Green represents above −15 dBm power level and red represents below −15 dBm power level which represents nulls. The number of read locations is now increased to 77% with the phase diversity.

FIG. 7 shows the received signal power from the three antennas each transmitting +33 dBm is shown on a 5 cm grid interval. It is then used to determine whether a successful read will be possible by considering a tag threshold power of −15 dBm and assuming that the tag threshold power will be the limiting factor. The number of read locations is shown to have increased from 55.7% to 77% with a phase dithering technique as shown in FIG. 8. The phase dithering technique here carries out the modelling with all the DAS antennas being phase matched and then each shifted by 180 degrees with respect to the others; the maximum returned power from the 4 cases is then plotted.

Frequency Dithering

We have demonstrated an improvement in received signal strength and reduction in the number of nulls with the use of multiple transmitting antennas and use of multiple receiving antennas. However, the number of nulls should be preferably further reduced to render the RFID more reliable. Here, a novel frequency dithering technique is applied to substantially eliminate the nulls.

Figure 9:
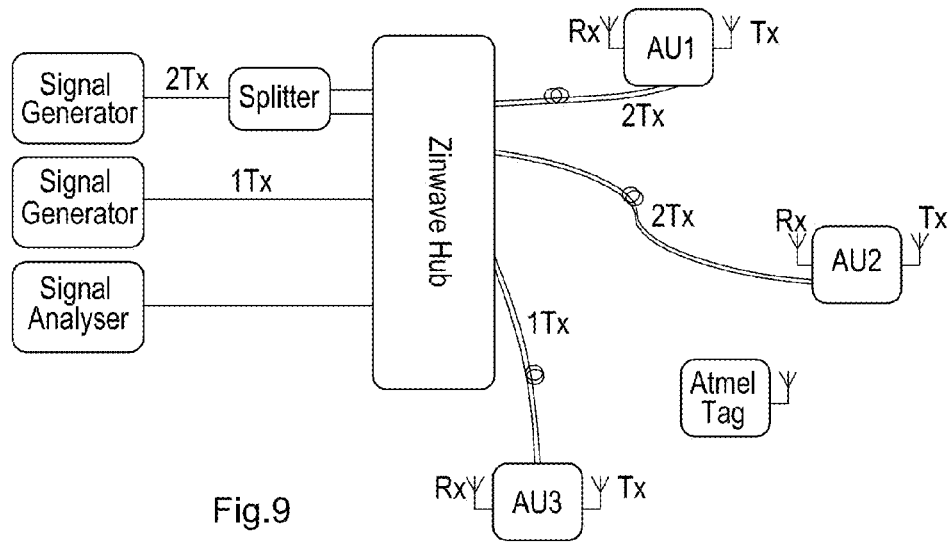
FIG. 9. Experimental Setup for frequency dithering.

The number of nulls can be moved and thus can be reduced by altering the RFID carrier frequency. As shown in FIG. 9, two signal generators are used in this experiment for the purpose of transmitting two different frequencies simultaneously, one to transmit RFID carrier signals within the global tag frequency band (from 860 MHz to 960 MHz) which feeds to AU1 and AU2 and the other one to transmit the same frequency band signals which feeds to AU3. UK regulations allow a 2 MHz band between 865.5 MHz and 867.5 MHz for passive RFID split into 10, 200 kHz channels; the US regulations allow a 25 MHz band between 902 MHz and 928 MHz.

Figure 10:
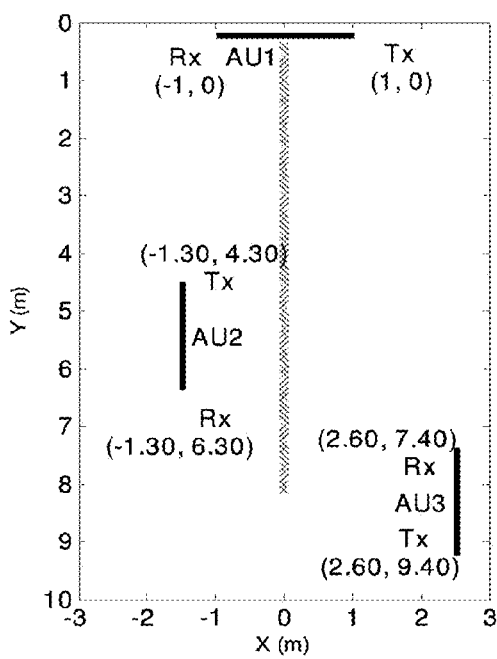
FIG. 10. Antenna arrangement. The positions of the antennas are indicated in metres in the form of (x, 7) coordinates. Red crosses represent the measurement location.

FIG. 10 shows the antenna locations within a 10 m×4 m laboratory. The positions of the antennas are chosen to achieve overlapping areas of coverage within the constraints of a cluttered room. The backscattered signal power is measured at 10 cm intervals along a line away from AU1 in this and the following experiments.

Figure 11:
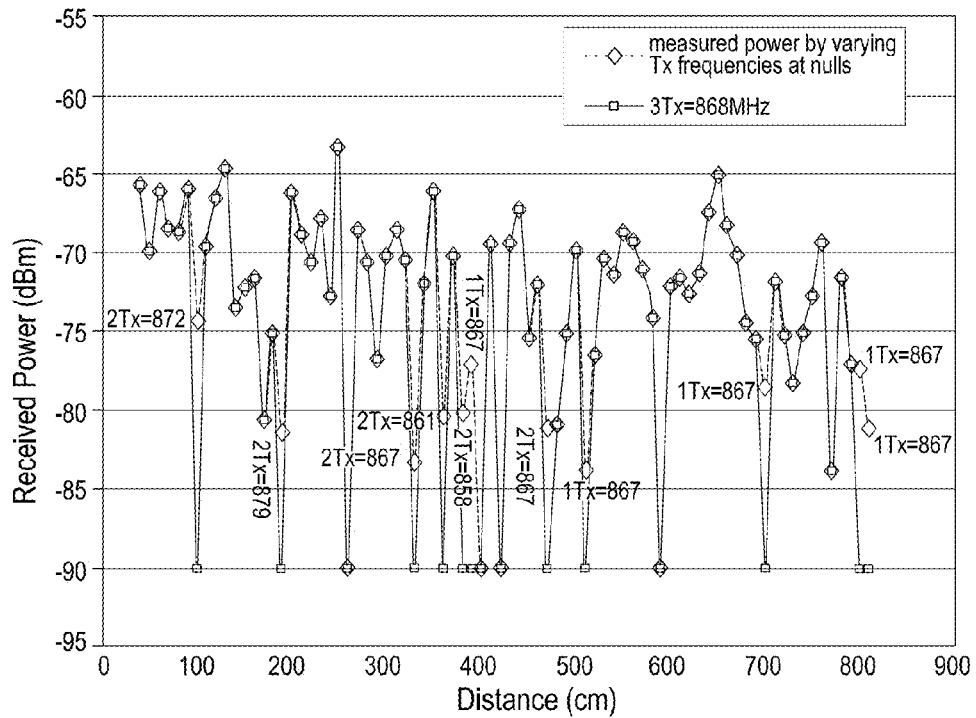
FIG. 11. Variation of returned signal strength with range for a triple antenna with adaptive frequency selection. The numbers in red represent the Tx frequencies in MHz at which nulls disappear.
Figure 12:
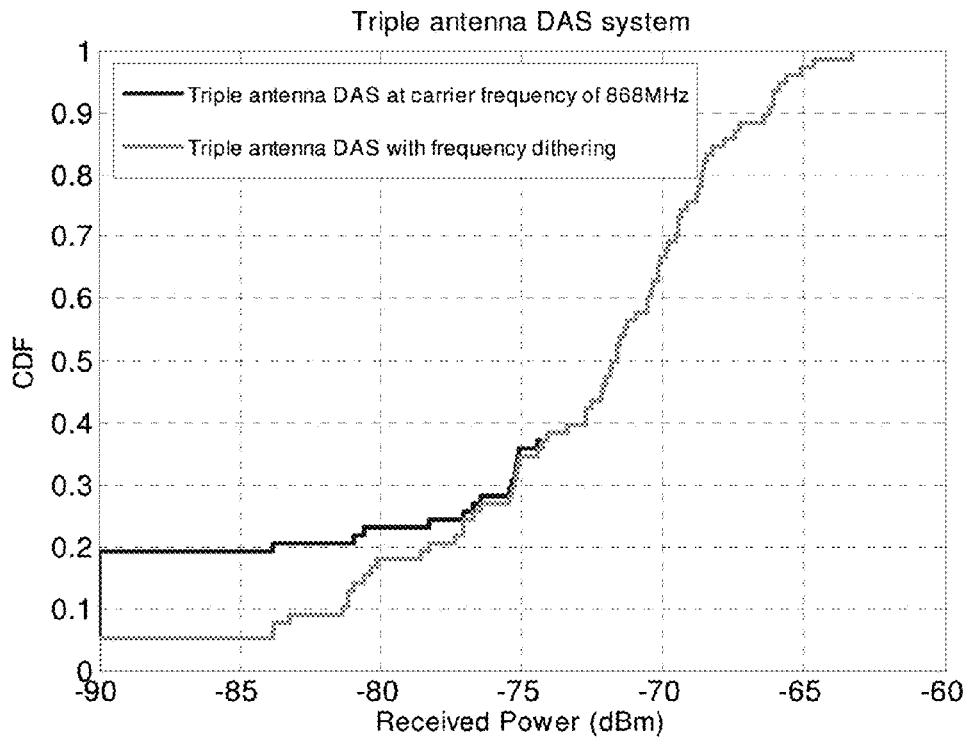
FIG. 12. Cumulative probability distribution of the experimentally measured returned signal power for a triple antenna with adaptive frequency selection and a tripe antenna DAS system.

When a null is encountered, the carrier frequency is varied with the aim of eliminating it. The variation of returned signal strength with range for a triple antenna with adaptive frequency selection is shown in FIG. 11. The numbers in red represent the Tx frequencies in MHz at which nulls disappear. The optimum frequency selection improves the number of read locations to 95%, as shown in FIG. 12. The reason for the enhancement is that at different frequency, the RFID signal has a different multi path effect and gain. Consequently, at an optimum frequency, the path losses are reduced; resulting in reducing the chance of a fade. Thus in a variation of frequency provides potential improvement in system performance. The skilled person will appreciate that the frequency dithering technique we describe improves passive RFID coverage and is different to the FHSS (Frequency hopping spread spectrum) technique of the EPC Class 1 Gen 2 RFID protocol previously mentioned.

Phase Dithering

Figure 13:
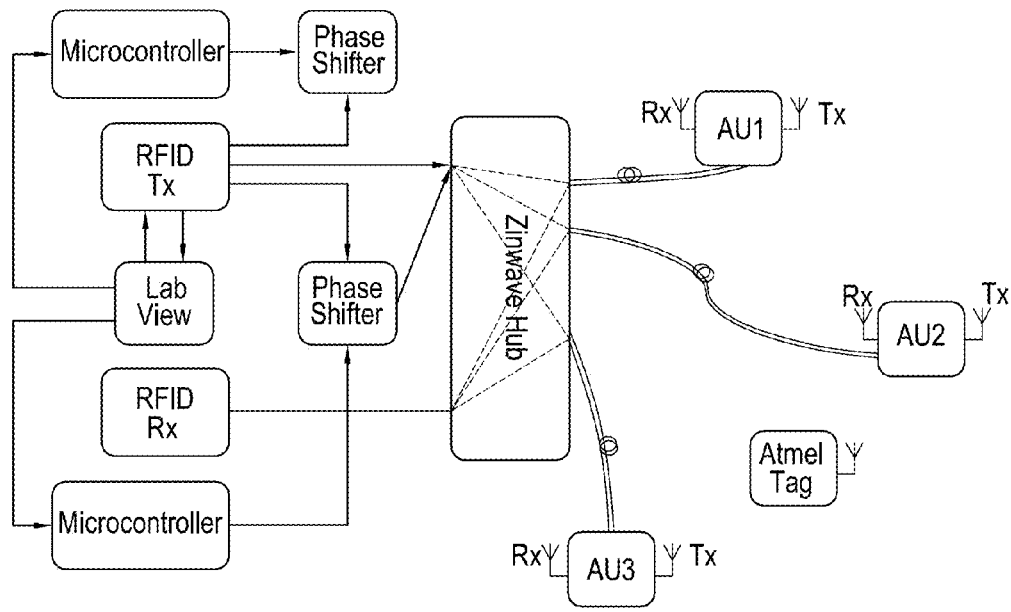
FIG. 13. Experimental setup for phase dithering.

Phase and power control are shown to provide improved performance in the multi-antenna system (FIG. 13). By applying phase shifts between the signals at each antenna while varying the phase in 24° steps between 0° and 360° with respect to a reference signal, it is possible to improve the passive RFID coverage. The coverage can be improved further by combining the received signals from each antenna and applying a different gain to the signal from each antenna to optimise the combined received signal SNR; for example, by altering the gain of uplink of each antenna unit (AU) in 10 dB steps or less between 0 dB and 30 dB.

Figure 14:
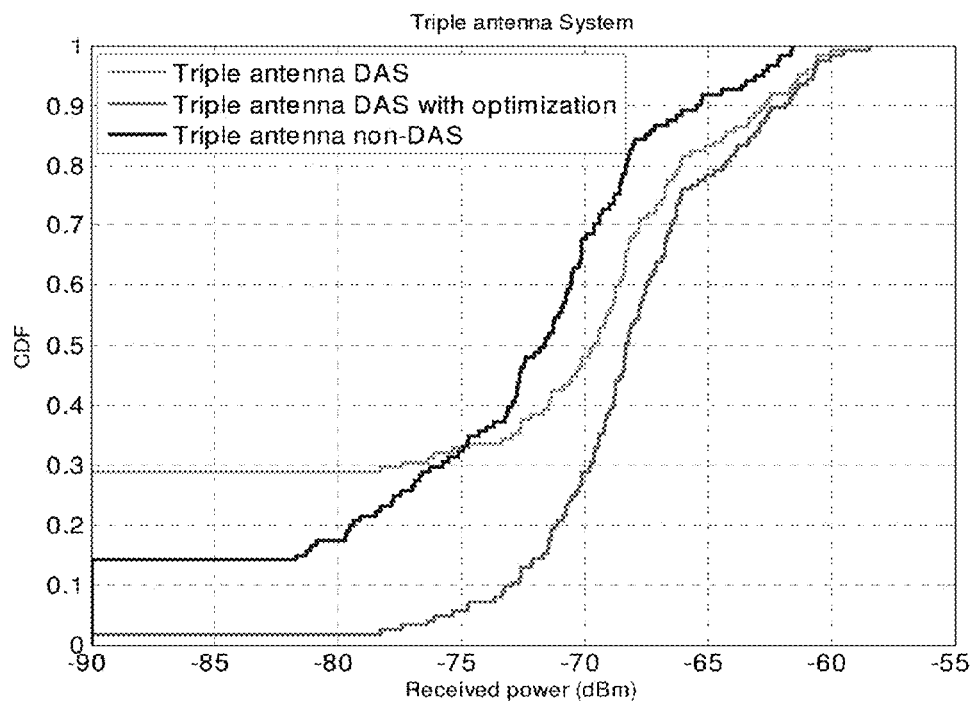
FIG. 14. Empirical cumulative probability distributions of the experimentally measured returned signal strength indicator (RSSI) for a triple antenna DAS, a triple antenna DAS with optimization (phase dithering) and a switched three antenna system.

As a result of these innovations, we have demonstrated a reduction in the number of nulls of a conventional DAS RFID system from 29% to 2% using 3 transmitting antennas and overlapping cells with phase control as shown in FIG. 14. The detected signal strength from the tag is also observed to increase by an average of approximately 10 dB compared with a conventional switched multi-antenna RFID system. However, when the triple antenna DAS system is compared with the more conventional multi-antenna RFID system which switches between antennas and selects the highest SNR, a performance reduction is seen. This is shown by the CDF plots in FIG. 14. It can be seen that the conventional switched triple antenna system has 14% nulls whereas a triple antenna DAS system has 29% nulls. The increase in the number of nulls in the DAS system can be accounted for by distractive interference occurring between signals from different antennas in the DAS resulting in fading. However, optimising the DAS using phase dithering technique can substantially eliminate the fading and thus can provide a significant advantage over a conventional switched multi-antenna system, as shown in FIG. 14.

This improvement has been demonstrated using an R&S (Rohde & Schwarz) SMIQ signal generator and an R&S FSQ spectrum analyser as a RFID reader as shown in FIG. 13. The three antenna DAS system is formed by splitting the signals in the downlink and combining the signals from the antennas in the uplink. We then demonstrate the DAS optimisation by employing the phase dithering technique. The conventional switched three antenna system is tested by transmitting and receiving the signals from one antenna at a time and then obtaining the best received signal strength from all three antennas.

Figure 15:
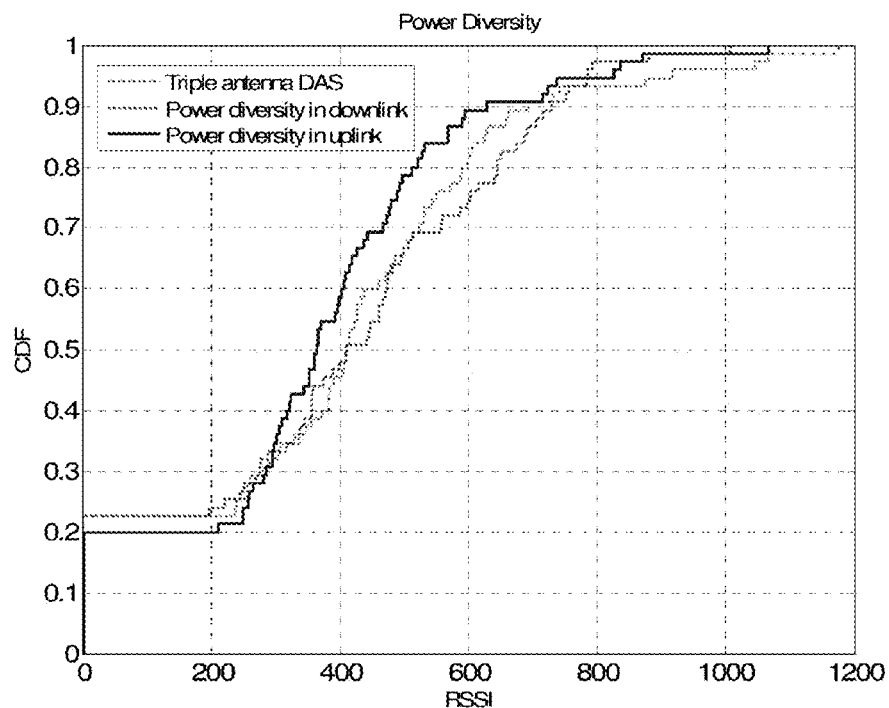
FIG. 15. Empirical cumulative probability distribution of the experimentally measured returned signal strength indicator (RSSI) for a triple antenna DAS, a triple antenna DAS with power diversity in downlink and in uplink.

FIG. 15 shows that the power control in uplink suppressing interference from other receiving antennas) enhances the received signal strength indication (RSSI) as the number of nulls is reduced from 24% to 20% in a triple antenna with power dithering over a triple antenna DAS system. The gain of the uplink and downlink is varied from 0 dB to 30 dB in 10 dB steps in the proposed optical UHF RFID system.

Proof of Principle (Antenna Diversity Combined with Frequency Dithering)

Figure 16:
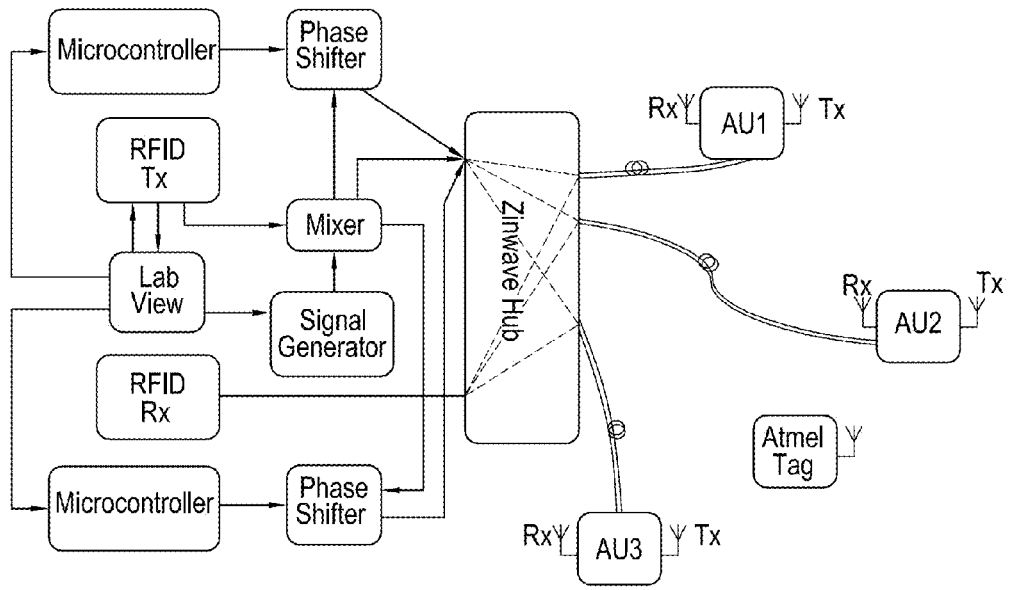
FIG. 16. Experimental setup for passive RFID coverage improvement.

A proof of principle demonstration for the improved passive RFID coverage has been carried out with a single tag in the field; the system is shown in FIG. 16. A signal generator and an analyser have been chosen to illustrate the improvement. A Labview program is designed to automatically vary the phase difference between two of the antennas in 24° steps between 0° to 360° while the frequency is varied from 860 MHz to 960 MHz in 1 MHz steps.

Figure 17:
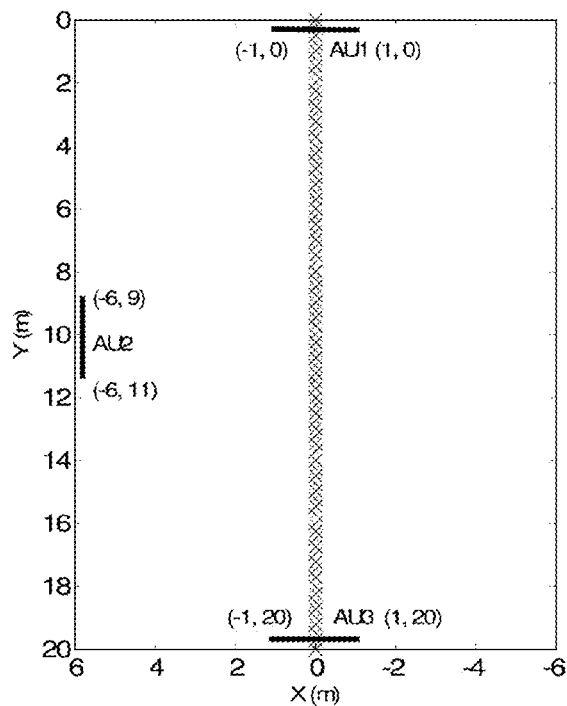
FIG. 17. Antenna arrangement. The positions of the antennas are indicated in meters in the form of (x, y) coordinates. Red crosses represent the measurement location FIG. 18. Cumulative probability distribution of the experimentally measured returned signal power for both triple antenna DAS and triple antenna DAS with optimization FIG. 19. Double antenna DAS combined with Alien 8800 RFID reader.
Figure 18:
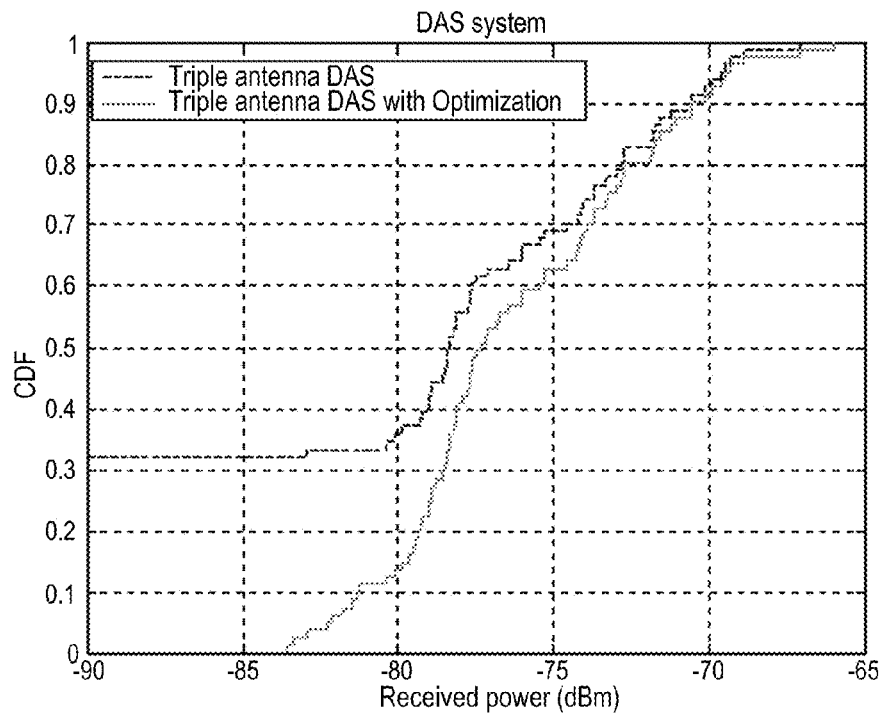

This demonstration is carried out over a 20 m×6 m area as shown in FIG. 17. The antenna diversity combined with frequency dithering technique is shown to increase the probability of a successful read to 100% from 67% as shown in FIG. 18. This result is achieved with +30 dBm EIRP at each antenna.

Coverage Improvement of Multiple Passive RFID Tags

Figure 19:
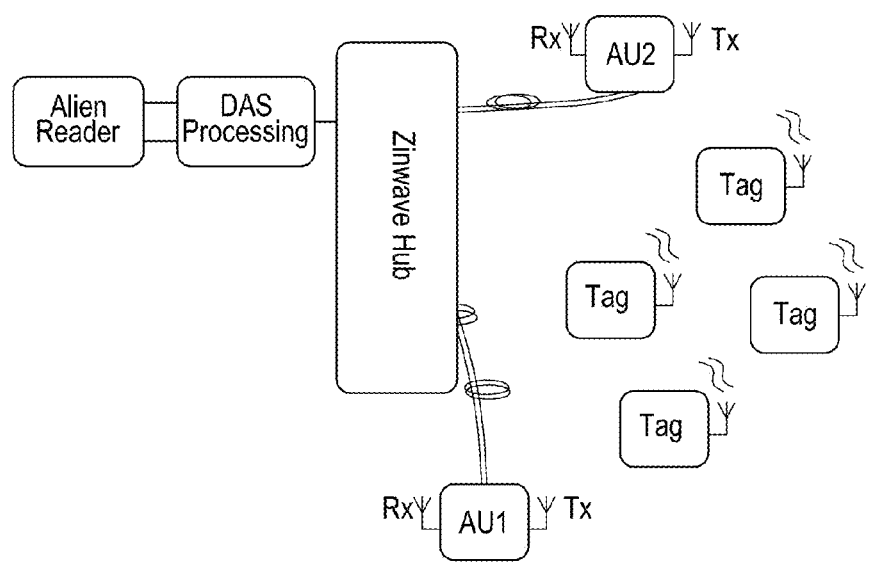
Figure 20:
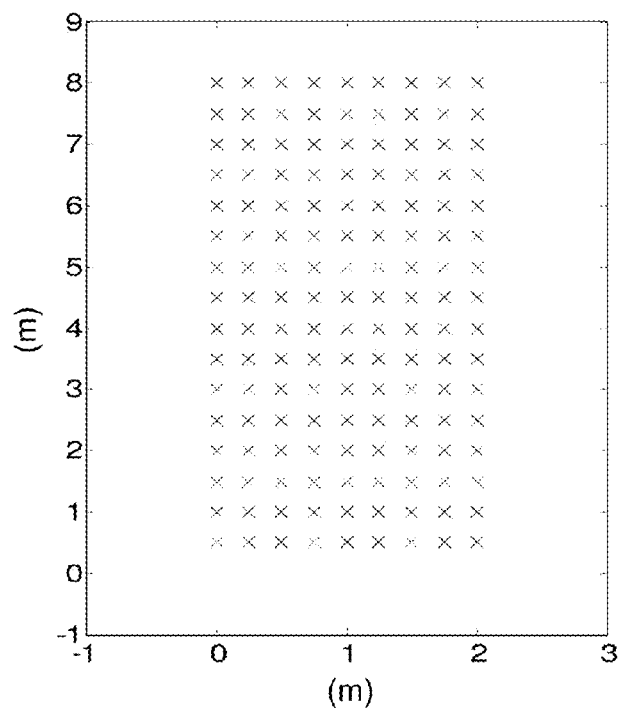
FIG. 20. 140 Alien Higgs2 tags are placed at a height of 2 m in a 25 cm grid interval over a 10 m×4 m area.

Coverage improvement of single tag has been shown in the previous section. Here, it is shown that a similar improvement can be achieved with multiple tags. As shown in FIG. 19, a double antenna combined with Alien 8800 RFID reader is used in this experiment. 140 Alien Higgs2 tags are placed at a height of 2 m in a 25 cm grid interval over a 10 m×4 m area as shown in FIG. 20. A +32 dBm equivalent isotropically radiated power (EIRP) is transmitted from each AU and the combined optimised tag returned signals RSSI is measured. The phase difference between the antenna is randomly dithered quantised in 24° intervals between 0° to 360° while the frequency is varied from 865.7 MHz to 867.5 MHz in 200 kHz steps using a Labview programme.

Figure 21:
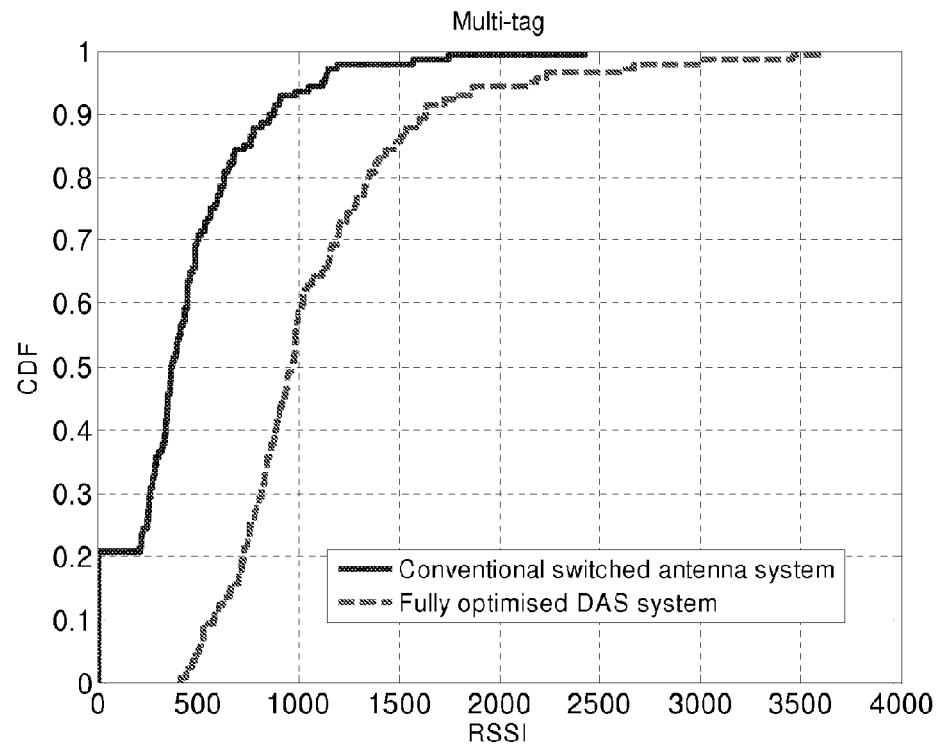
FIG. 21. Cumulative probability distribution of the experimentally measured returned signal power for both conventional switched antenna system and fully optimised DAS system.

The antenna diversity combined with frequency dithering technique is shown to increased the tag read accuracy from 79% (111 tags) to 100% (140 tags) in a fully optimized DAS over a conventional switched multi-antenna system as shown in FIG. 21.

Antenna and Polarisation Switching in Multi-antenna Distributed Antenna (DAS) System It is shown that RFID coverage can be enhanced by dithering phase and frequency. However, this approach could be used alongside other techniques such as polarisation switching (i.e. switching the polarisation (vertical or circular) of Tx and Rx antennas at a particular location), or switching which antennas are employed for Tx and Rx, to enhance the coverage further. This is due to the fact that the locations of constructive interference occurring due to phase and frequency dithering vary with antenna polarisation and radiation pattern.

Read Rate/Speed Enhancement of Multiple Passive Tags

Lack of access to the low level reader functions in off the shelf RFID readers prevent integration of the DAS optimisation algorithms and the tag query cycle. Read rate is investigated using a probabilistic model for the number of occupied successful slots (with useful tag reads), empty slots and collisions (which cause backoffs—if there are too many collisions the number of available timeslots is increased, the reader detecting collisions). Data from the earlier measurements of the ability of the optimised DAS to read multiple tags is used in the simulation to determine how many unique, un-inventorised tags exist in the field of view for the optimised DAS in each state and a conventional system. The DAS is compared to a conventional RFID which switches between antennas performing inventory cycles.

The Alien RFID 8800 reader uses two main parameters to tune the reading of multiple tags. The Q-factor determines how many slots ($2^Q$) are allocated in the Aloha algorithm. In an inventory the O-factor can be varied for each count. The DAS RFID system is configured to perform a tag inventory cycle comprising a plurality of tag read rounds to read tags, a tag read round having a set of time slots, determined by the Q-bit random number in the tag slot counter, during which a tag decrements its slot counter and is able to transmit tag data including a tag ID for reception by antenna when the tag slot counter is 0. During the inventory cycle read tags have the inventorised bit set so that they do not compete in subsequent cycles speeding up the inventory.

Figure 22:
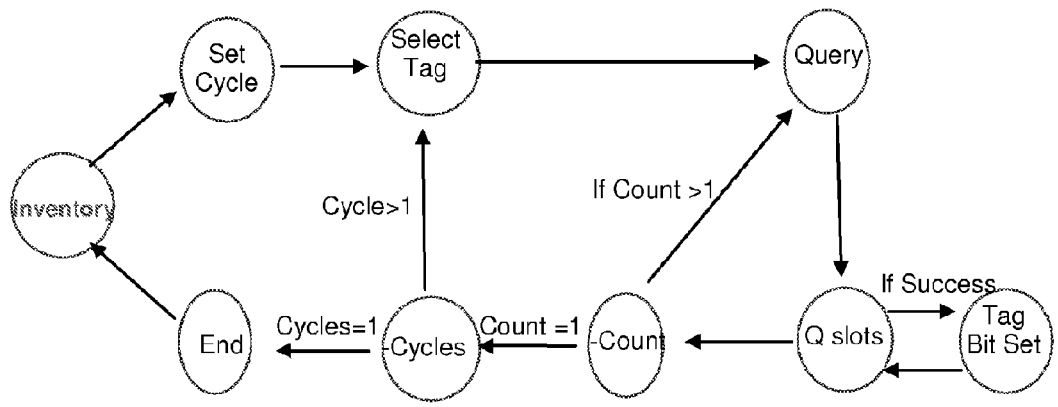
FIG. 22. A schematic of Gen 2 protocol; Inventory is mainly controlled by Count and Q factor. At the start of each cycle, the Tag Select command wakes all tags and count read attempts with Q slots are then made.

At the start of each cycle, the Tag Select command wakes all tags and sets their inventorised bit to zero. Count read attempts are then made. Each read attempt assigns $2^Q$ slots for the tags to compete for. The number (Q) is transmitted to the tags and enables a tag to load a Q bit random number into their slot counter. Tags are then requested to decrement the value of their slot counter and are allowed to transmit if and only if their slot counter is zero. Once they are successfully read, they are instructed to keep silent for a period set by the session flag persistence time (eventually re-awakening). Successfully read tags have the inventorised bit set so they do not compete for slots in future counts until a new cycle is started. The DAS optimization settings are changed for each count (FIG. 22).

Figure 23:
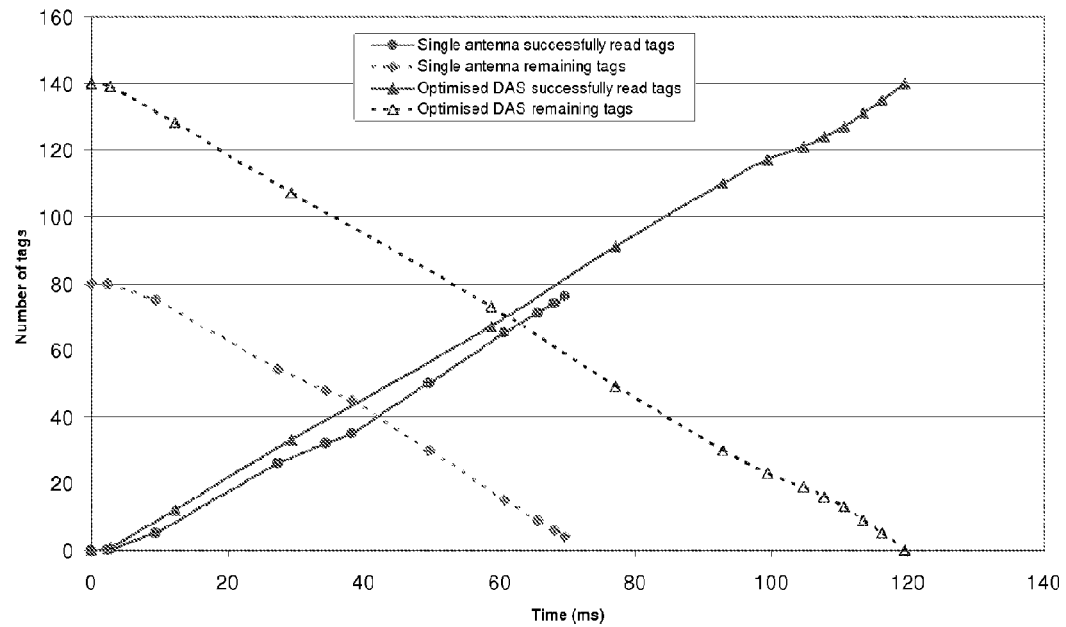
FIG. 23. A plot number of read tags against time for a conventional swithced antenna and a optimised DAS RFID system. Conventional switched antenna system–2× 68.6=137.2 ms with accuracy of 79% (111 tags out of 140 tags)=809 tags/sec. Optimised DAS=119.52 ms with accuracy of 100% (140 tags out of 140). Note that DAS takes only 93.42 ms for 111 tags=1, 188 tags/sec.
Figure 24:
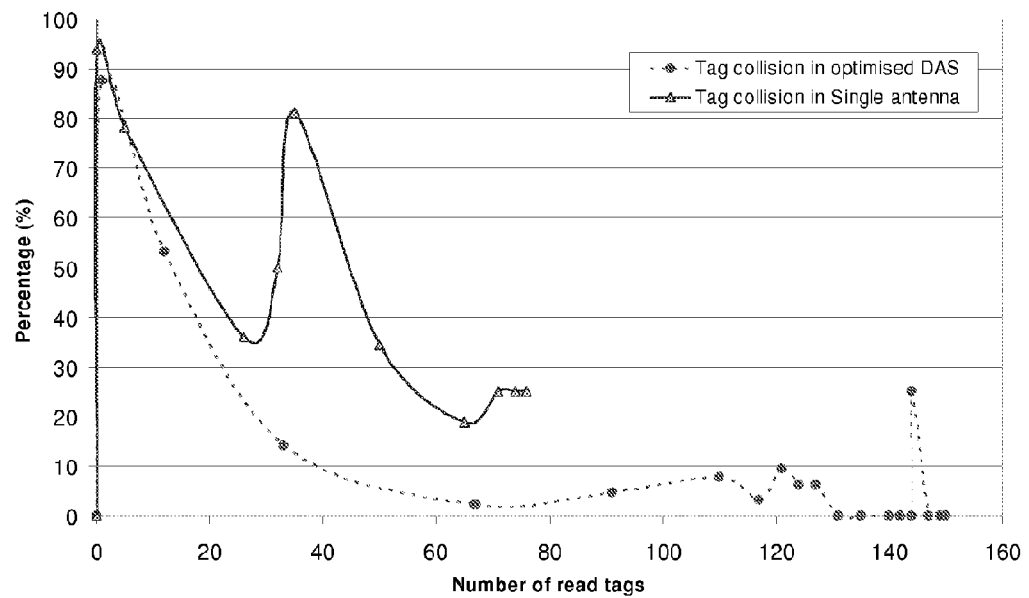
FIG. 24. This shows that the number of collisions is reduced in optimised DAS system over a conventional multi-antenna system FIG. 25. Incorporating the phase dithering in the RF front end using an Intel R1000 reader development kit.

Simulation is performed with 80 tags in view of each antenna in the switched system as well as 140 tags for a DAS system. FIG. 23 shows that a 47% improvement (from 809 tags/sec to 1188 tags/sec) tag read rate can be achieved in optimised DAS system compared to a conventional switched antenna RFID system through modelling. This is achieved by reducing the number of collisions (FIG. 24) within each read as the DAS optimisation technique allows us to move the nulls around the field. Hence, only a certain number of tags are active at any time. (The peaks in FIG. 24 are where the number $2^N$ of available timeslots is decreased). The number of active tags for every DAS setting is obtained from experimental results. It is then used to simulate the optimised DAS in our analytical model. DAS optimisation technique operates on a loop just above the count (such that the Q factor is adjusted for each DAS setting combination). This enables the inventorised bit of the tags to be exploited to prevent the re-reading of tags.

Figure 25:
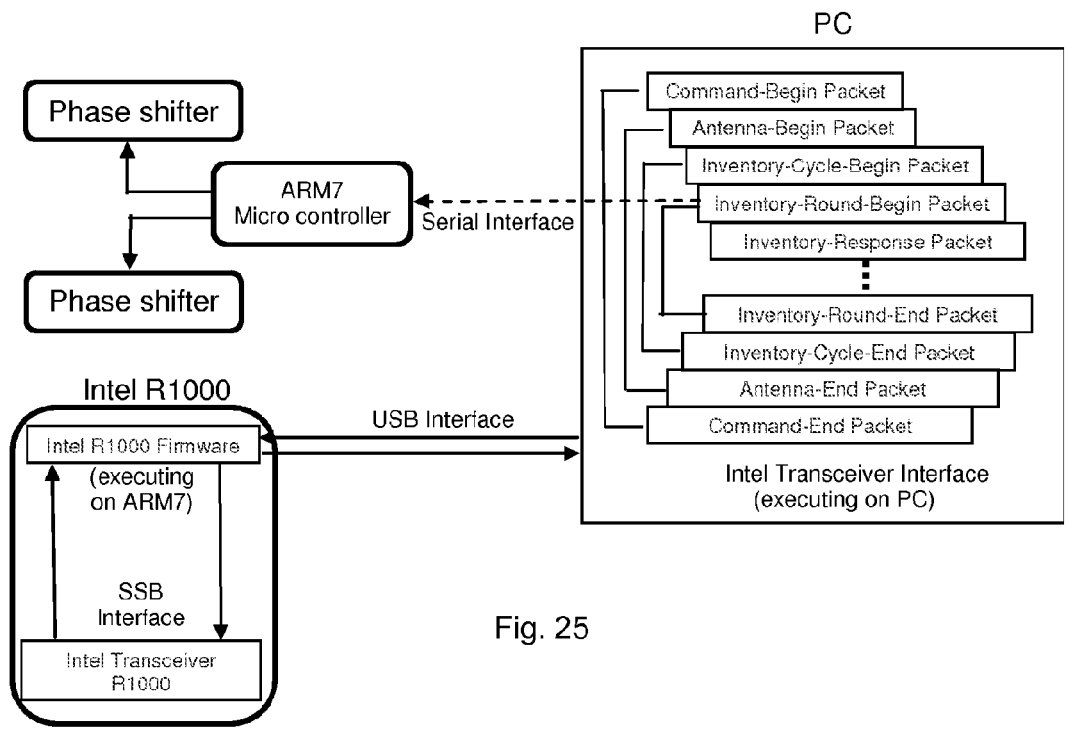
Figure 26:
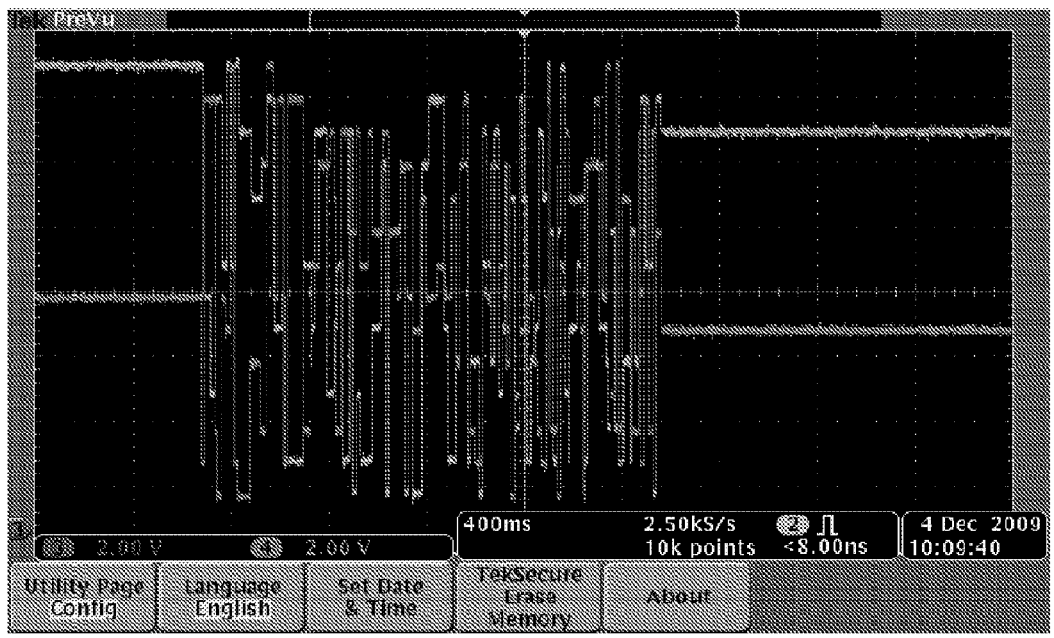
FIG. 26. This shows the random variation in control voltage i.e. random phase dithering. This is done by making use of a random number generator in C/C++.

A proof of principle demonstration for the improved read speed/rate has been carried out. A prototype based on an Intel R1000 development board is developed as shown in FIG. 25. The R1000 supports host side applications (Intel Transceiver interface). The transceiver interface includes a C/C++ functional interface to communicate with the firmware module using USB communication. When an inventory is performed using the transceiver interface, the R1000 returns data from the Intel firmware over the USB interface in a sequential of packets to the host PC. Phase is randomly varied using voltage controlled phase shifters (as shown in FIG. 26) controlled by the PC when the R1000 returns the inventory-round-begin packet which indicates the beginning of an inventory round (as shown in FIG. 25).

Figure 27:
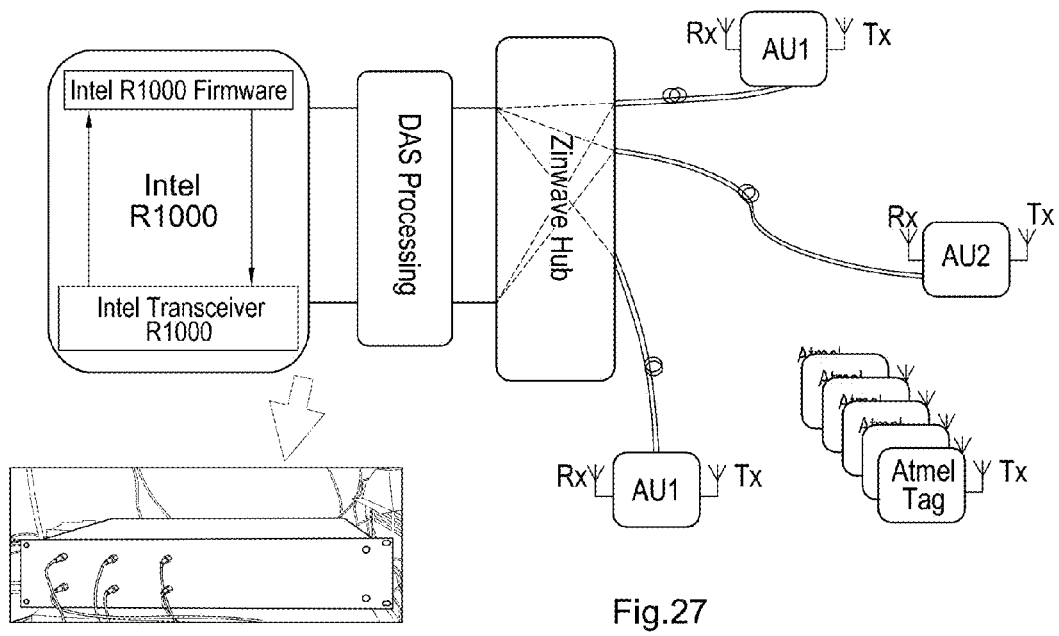
FIG. 27. DAS RFID system based on Intel R1000 has been developed as part of the principle demonstration.
Figure 28:
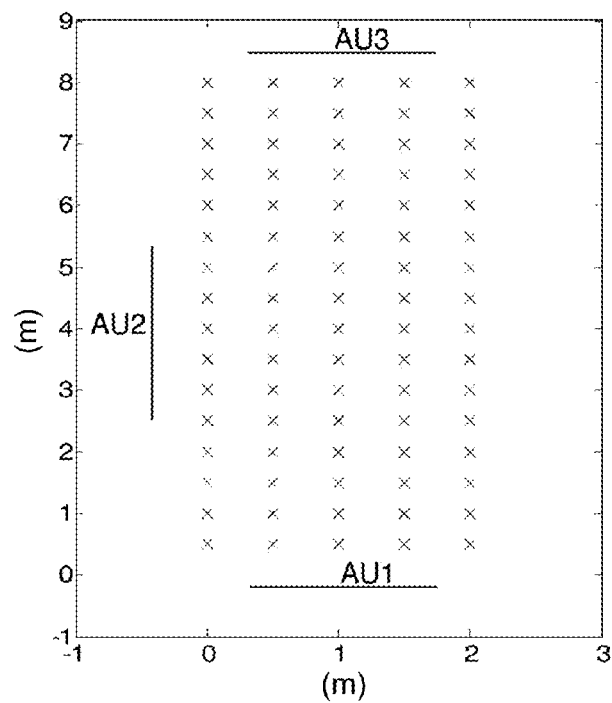
FIG. 28. 80 Alien Higgs2 tags are placed at a height of 2 m in a 50 cm grid interval over a 10 m×4 m area.

The developed triple antenna DAS RFID system is configured to transmit signals in the UK RFID band and a +30 dBm EIRP is transmitted from each antenna as shown in FIG. 27. 80 Alien Higgs2 tags are placed at a height of 2 m in a 50 cm grid interval over a 10 m×4 m area as shown in FIG. 28. We used an R1000 development board to implement fixed and dynamic Q algorithms to read multiple tags. Here, we show a tag read enhancement over both algorithms.

Figure 29A:
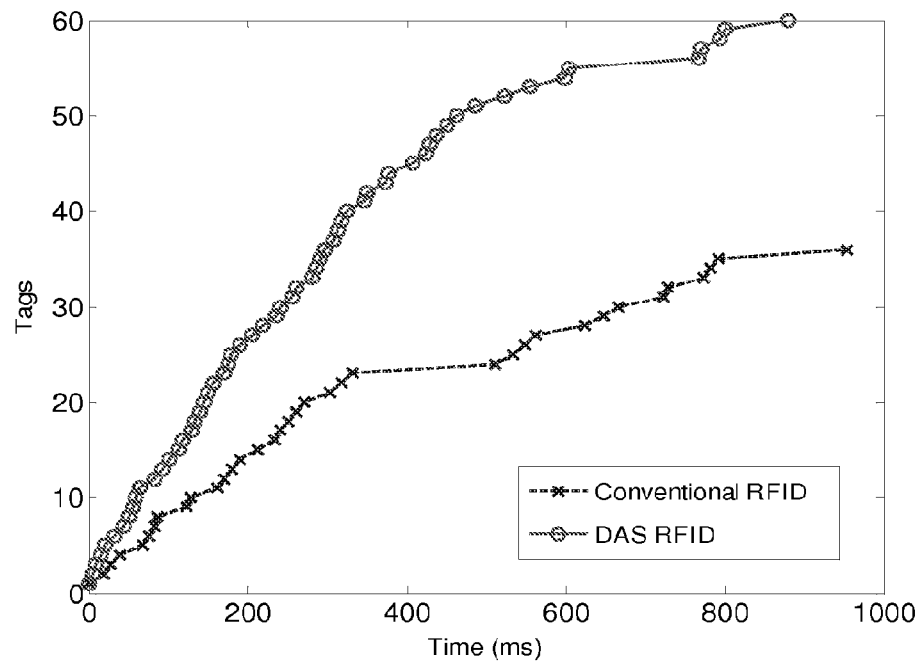
FIGS. 29a to 29h show, respectively, a plot number of read tags against time for a conventional RFID system and an optimised DAS RFID system; a plot number of RN16 timeouts against time for a conventional RFID system and an optimised DAS RFID system; a plot number of RN16 received against time for a conventional RFID system and an optimised DAS RFID system; a plot number of good EPC reads against time for a conventional RFID system and an optimised DAS RFID system; a plot number of read tags against time for a conventional RFID system and an optimised DAS RFID system; a plot number of RN16 timeouts against time for a conventional RFID system and an optimised DAS RFID system; a plot number of RN16 received against time for a conventional RFID system and an optimised DAS RFID system; and a plot number of good EPC reads against time for a conventional RFID system and an optimised DAS RFID system.

Read Rate/Speed Enhancement using Phase and Frequency Dithering over R1000 Fixed Q Algorithm An inventory using the fixed Q algorithm is performed with the system operating as a conventional (where a triple antenna system is used to transmit signals simultaneously) and an optimised triple antenna DAS RFID system (where frequency and phase dithering is applied over a triple antenna system). As shown in FIG. 29a, the conventional antenna system reads tags at a rate of 38 tags/sec while the optimised DAS RFID is at a rate of 68 tags/sec. As a result, an 81% improvement in read rate is demonstrated in the DAS RFID system over a conventional system. In addition, an initial read rate of >110 tags/sec is sustained for a greater proportion of the total tag population using the DAS RFID system as shown in FIG. 29a. The improvement in the tag read rate is due to the fact that the number of collisions within each inventory round is reduced and read success rate is enhanced using the DAS optimisation technique as it moves the nulls around the field. Hence, only a certain number of tags are active at any time. The DAS optimisation technique operates on a loop just above the count (such that the Q factor is adjusted for each DAS setting combination). This enables the inventorized bit of the tags to be exploited to prevent the re-reading of tags.

Figure 29B:
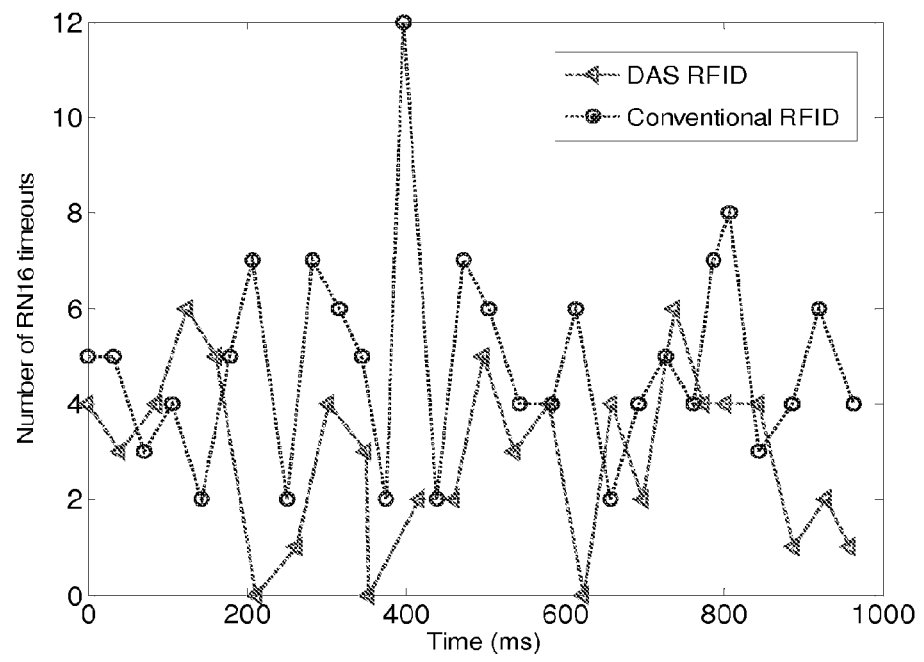
Figure 29C:
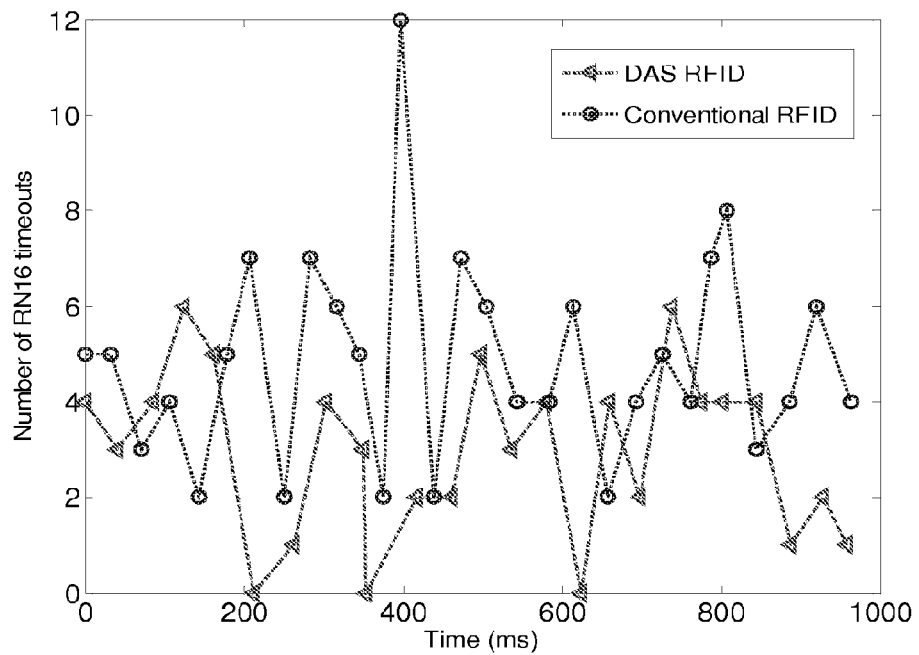
Figure 29D:
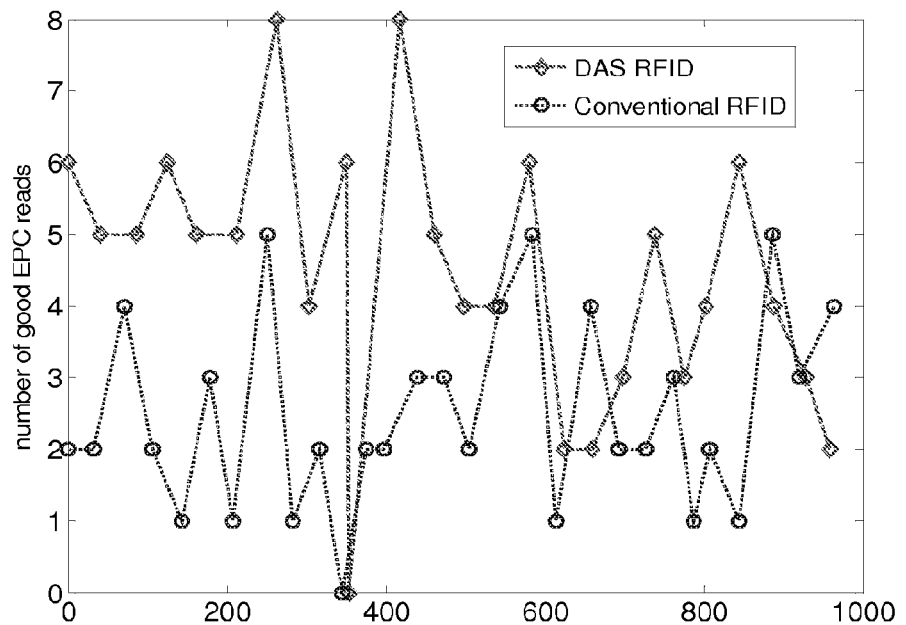

FIG. 29b shows a plot of number of RN16 timeouts against time for the conventional RFID system and the optimised DAS RFID system. The RN16 timeouts occur due to both collided and empty slots. It is clearly shown that DAS RFID encounters fewer collided and empty slots compared with a conventioal RFID system. For a complete comparison, the number of RN16 received and good EPC reads (successful tag reads) are shown in FIGS. 29c and 29d respectively for both DAS RFID and conventional systems. The results clearly illustrate that a high sustained tag throughput with large tag populations can be obtained in a DAS RFID that can outperform conventional RFID readers.

Figure 29E:
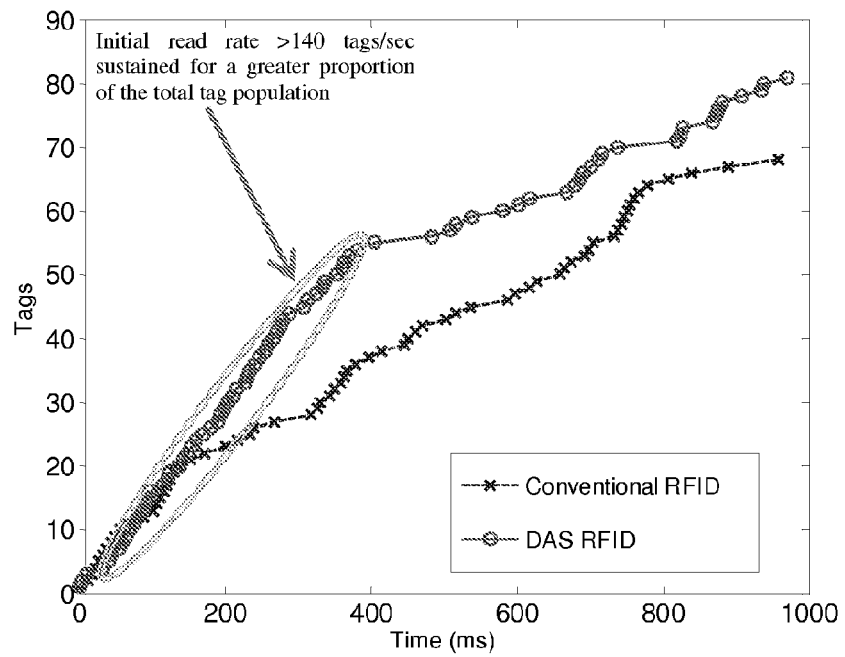

Read Rate/Speed Enhancement using Phase and Frequency Dithering over R1000 Dynamic Q Algorithm An inventory using dynamic Q algorithm is also performed for both conventional and optimised RFID systems. As shown in FIG. 29e, the conventional RFID system presents a tag read at a rate of 71 tags/sec and the optimised DAS RFID provides a read rate of 84 tags/sec. Thus, a 19% improvement in tag read speed is achieved. Moreover, an initial read rate of >140 tags/sec is sustained for a greater proportion of the total tag population using the DAS RFID system.

Figure 29F:
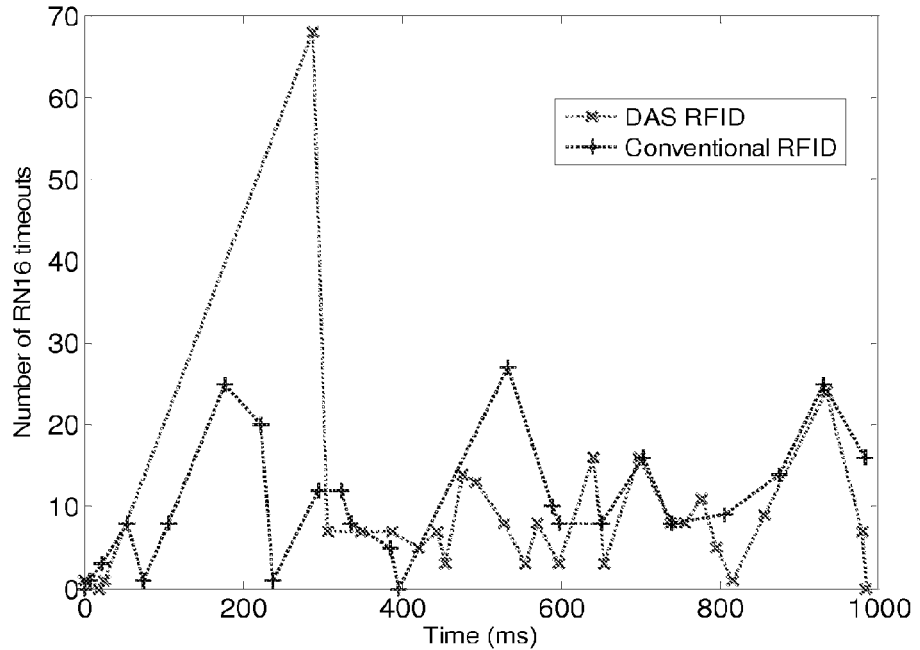
Figure 29G:
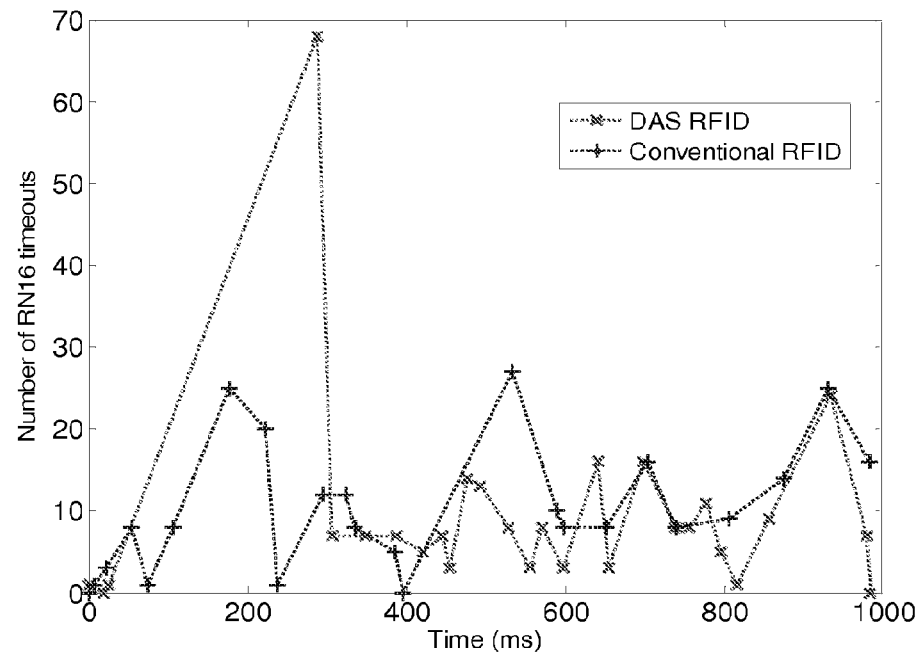
Figure 29H:
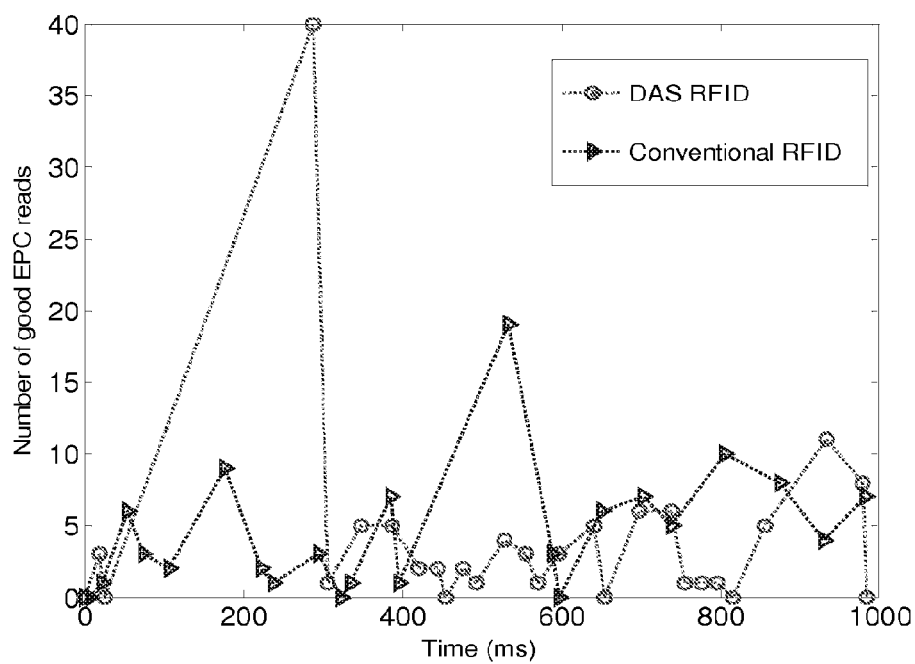

FIG. 29f shows a plot of number of RN16 timeouts against time for the conventional RFID system and the optimised DAS RFID system. It is again shown that DAS RFID encounters fewer collided and empty slots compared with a conventioal RFID system. The number of RN16 received and good EPC reads are shown in FIGS. 29g and 29h respectively for both DAS RFID and conventional systems. The results again indicate that a high sustained tag throughput is possible in a DAS RFID system.

The demonstrator shows that while an enhanced tag read rate is achieved in the DAS RFID system, the initial tag read rate is sustained for a greater proportion of the total tag population. This improvement is due to both a reduction in the number of collisions (result of dynamic grouping) and an improvement in the read success rate (result of enhanced radio coverage). It is anticipated that the projected tag read rate of >1000 tags per second is possible with next iteration of reader development with closer integration and also by configuring the tag to reader protocol to achieve the maximum data rate. The closer integration will be achieved by editing the R1000 reader firmware to provide an indication of each read attempt resulting in perfect synchronisation with phase dithering at each read attempt within an inventory round.

Location Accuracy Improvement of Multiple Passive Tags

By expanding the range of view of a single RFID reader, as well as improving the likelihood of successful tag detection, one can envisage RFID systems with wide coverage areas as opposed to the portal systems currently in use today, where sensitivity constraints require the objects to pass close to the reader antennas for detection. In a portal system however, the location of a tagged object can be inferred from the fact that it has passed close enough to the reader to be read. In a wide area RFID system, the simple reading of a tag will not provide sufficient location resolution for many applications. As a result interest has arisen in being able to estimate the location of the tag in such systems. The most common techniques are based on received signal strength indicator (RSSI) location algorithms. Due to the complex multipath environment commonly encountered in RFID implementations, fading and nulls result in the RSSI being only a weak function of range. Here we show that by measuring combined RSSI from multiple antennas using the optimised DAS, one can determine position more accurately. Any algorithm which makes use of combined RSSI from multiple antennas in the optimised DAS will lead to a better location accuracy since the fading will be minimised. Consequently, two location approaches based on the combined RSSI from multiple antennas are studied. The fingerprinting algorithm makes use of an initially recorded map of the combined RSSI from multiple antennas over the area, while the analytical location technique is based on a propagation model which makes use of the combined RSSI from multiple antennas.

Experimental Setup

Figure 30:
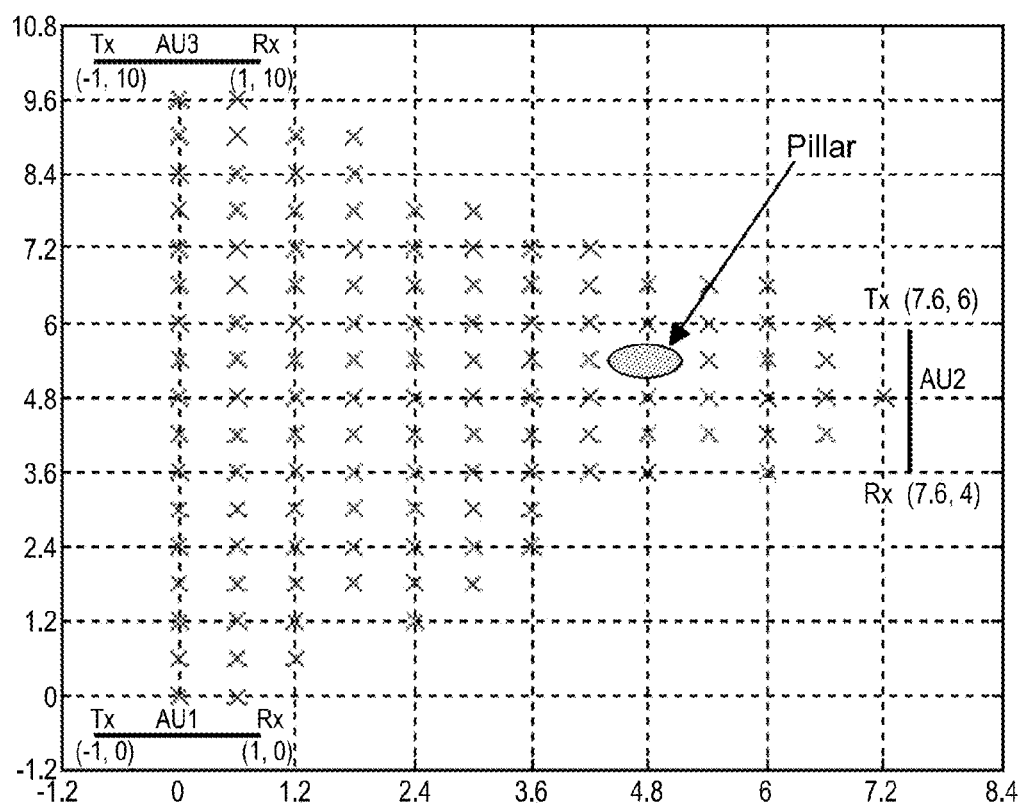
FIG. 30. Plan view of the antenna arrangement. The positions of the antennas are indicated in meters in the form of (x, y) coordinates. Red crosses represent the tag measurement locations. The measurements are taken on a 0.6 m grid interval over a 10 m×7.6 m area.

FIG. 30 shows a plan view of the physical arrangement of the three AUs used in this work and of the measurement locations over a 10 m×7.6 m area in an open atrium. The atrium area is bounded by solid walls at the left and right extremes of the figure and encompasses a concrete pillar. It is a realistic in-building environment. The tag is orientated such that its antenna is vertically polarized to match the AU antennas and is held fixed throughout the experiments. This matching of the tag and reader antenna polarization gives a 3 dB benefit in both the uplink and downlink performance over orientation-insensitive circularly polarized antennas which are often used for RFID readers. The AU locations are chosen to provide overlapping coverage.

The RFID reader (FIG. 19) is configured to transmit signals in the UK frequency band (865.7 MHz to 867.5 MHz). A +30 dBm equivalent isotropically radiated power (EIRP) is transmitted from each AU and the combined optimized tag RSSI is measured on a 0.6 m grid over the triangular area. The RSSI value from each AU is also measured individually by applying 30 dB attenuation in the uplink of the other two AUs so that their contribution to the total signal strength is negligible. This enables the likelihood that the tag is closest to a particular AU to be estimated.

Real Time Location System (RTLS) Fingerprint Algorithm

Figure 31A:
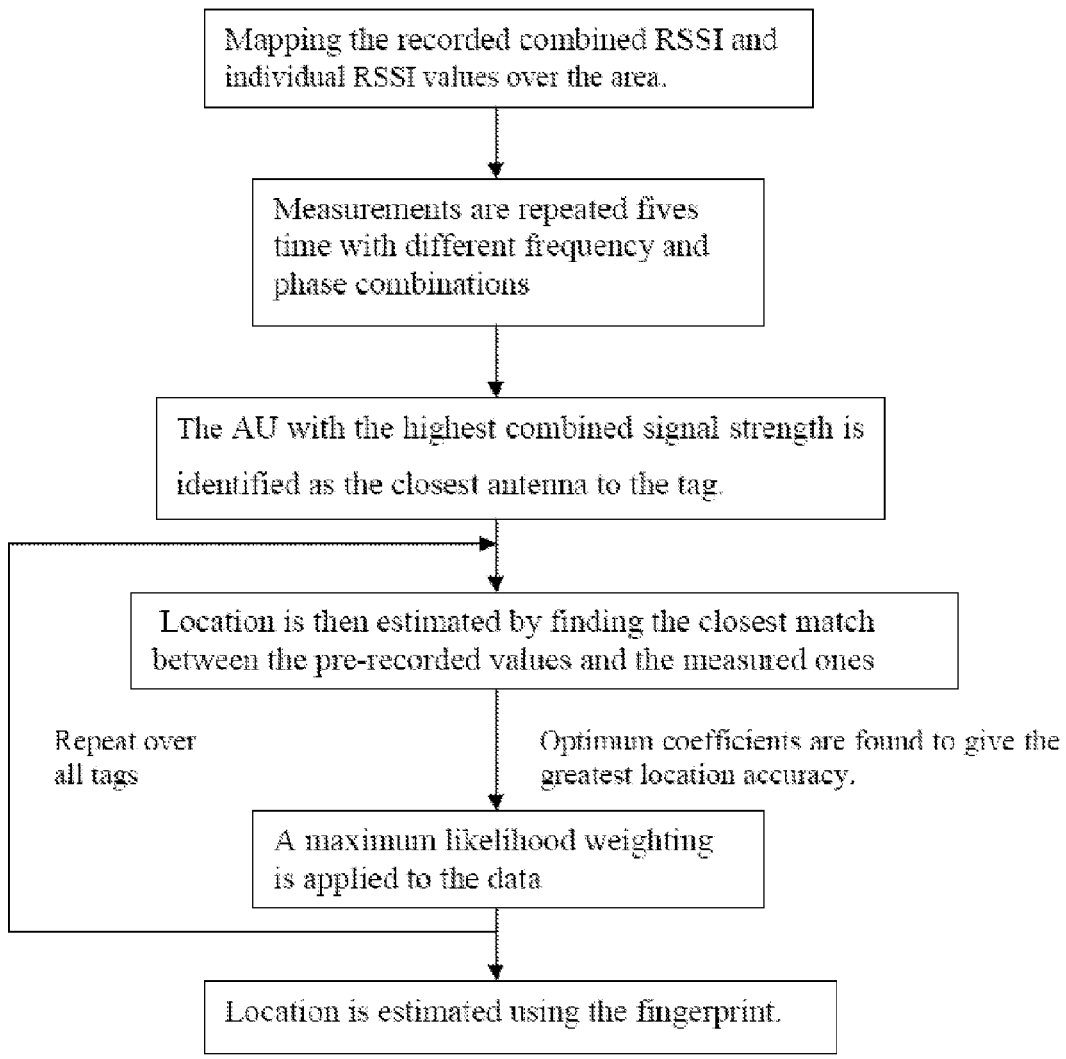
FIG. 31a. Flowchart of a fingerprint tag location algorithm according to an embodiment of the invention.

A fingerprint algorithm based on combined received signal strength indicator (RSSI) from multiple antennas is implemented as shown in FIG. 31a.

The area of interest is first mapped by recording the combined RSSI from all the AUs and the individual RSSI from each AU in turn. The mapping/calibration is done by placing tags at each of the measurement locations and then performing the RSSI measurements simultaneously. Depending upon the operating environment, it is, however, anticipated that the calibration may need to be repeated a number of times (for example if furniture is moved). In this work, the measurements are repeated five times at each grid point with the optimum phase (which gives the maximum RSSI) and different frequency combinations. The AU with the highest combined signal strength is identified for each tag location.

The tag location is then estimated for an unknown point by finding the closest match between the pre-recorded values and the measured maximum combined three antenna RSSI, the RSSI from the closest predicted antenna and the probability that each antenna is closest to the tag amongst the other grid points. A maximum likelihood weighting is applied to the data, with coefficients chosen empirically, to give the greatest location accuracy on a test dataset.

For example, if we consider attempting to locate a tag at an unknown location, the recorded optimized three antenna RSSI and RSSI from the nearest predicted antenna for this tag are first searched within the mapped data set as shown in Table 1 below. A table is then calculated for the root mean square difference between each of the data set elements of known location and the observed data of the tag to be located as shown in Table 2. In this case, the data from position (0.6, 1.8) m is found to be the closest match, so the best estimate of the location of the tag is (0.6, 1.8) m. Since the actual location of the tag was (0, 1.8) m this represents an error of 0.6 m.

TABLE 1

X, Y COORDINATES AND EACH OF THE DATA SET ELEMENTS OF KNOWN LOCATION AND THE OBSERVED DATA OF THE TAG TO BE LOCATED.

| X, Y coordinates | Combined RSSI | AU1 RSSI | AU2 RSSI | AU3 RSSI |
|---|---|---|---|---|
| UNKNOWN (0, 1.8) | 415.5 | 498.1 | 0 | 0 |
| (0.6, 1.8) | 484 | 484 | 0 | 0 |
| (0, 7.8) | 569.9 | 0 | 0 | 225.9 |
| (1.8, 3) | 703.1 | 493.4 | 493.4 | 0 |
| (6.6, 6) | 1091 | 0 | 646.5 | 0 |

TABLE 2

THE ROOT MEAN SQUARE DIFFERENCE BETWEEN EACH OF THE DATA SET ELEMENTS OF KNOWN LOCATION AND THE OBSERVED DATA OF THE TAG TO BE LOCATED.

| Combined RSSI | AU1 RSSI | AU2 RSSI | AU3 RSSI | RSM |
|---|---|---|---|---|
| 69.3 | −13.3 | 0 | 0 | 35.2824 |
| 154.4 | −498.1 | 0 | 225.9 | 284.1539 |
| 287.6 | −4.7 | 493.4 | 0 | 285.5606 |
| 675.5 | −498.1 | 646.5 | 0 | 529.7089 |

Referring again now to experimental measurements made (FIG. 30), a 10 m×7.6 m area was first mapped by recording the combined RSSI from all the AUs and the individual RSSI from each AU in turn. This was carried out for a tag suspended at a height of 1.4 m at each of the locations shown by the red crosses in FIG. 30. In this experiment, the measurements were repeated five times at each grid point with different DAS optimization parameters. The AU with the highest number of successful reads was identified as the most likely to be the closest antenna to the tag.

The tag location was then estimated for an unknown point by finding the closest match between the pre-recorded values and the measured maximum combined three antenna RSSI, the RSSI from the closest predicted antenna and the probability that each antenna is closest to the tag. A maximum likelihood weighting was applied to the data, with coefficients chosen empirically, to give the greatest location accuracy.

In order to test this location algorithm, the area is mapped at each of the locations shown by the red crosses in FIG. 30. Each location is then removed from the dataset in turn and the closest match amongst the other points is found from the remaining data with weighting coefficients of 1 for the combined optimized RSSI and 3.5 for the RSSI from the nearest predicted antenna respectively. This results in a minimum possible error of 0.6 m and should represent a worst case location accuracy. For example, if we consider attempting to locate the tag at the position (0, 1.8) m, the recorded optimized three antenna RSSI and RSSI from the nearest predicted antenna for this data point are first removed from the mapped data set and recorded as the observed data for the tag which is to be located. A table is then calculated for the root mean square difference between each of the data set elements of known location and the observed data of the tag to be located. In this case, the data from position (0.6, 1.8) m is found to be the closest match, so the best estimate of the location of the tag is (0.6, 1.8) m. Since the actual location of the tag was (0, 1.8) m this represents an error of 0.6 m.

The performance of the DAS location technique is compared with that of a commercial RFID reader which can estimate range using RSSI. In this case, location is found by estimating the distance between the tag and each AU in turn using the range estimation feature. The position is then calculated using triangulation. This approach is expected to give a fixed position. However, due to fading and nulls in the commercial RFID system, the RSSI is a weak function of distance and hence the three antennas do not always result in an exact fix. In such cases a least mean squared error approach is used. It should be noted that there are a number of cases where only one or two antennas are used to find the location as the other antenna(s) cannot provide a range estimate if the tag cannot be identified. In this case the location is estimated by random guess on the locus of possible positions calculated from the available data.

Figure 31B:
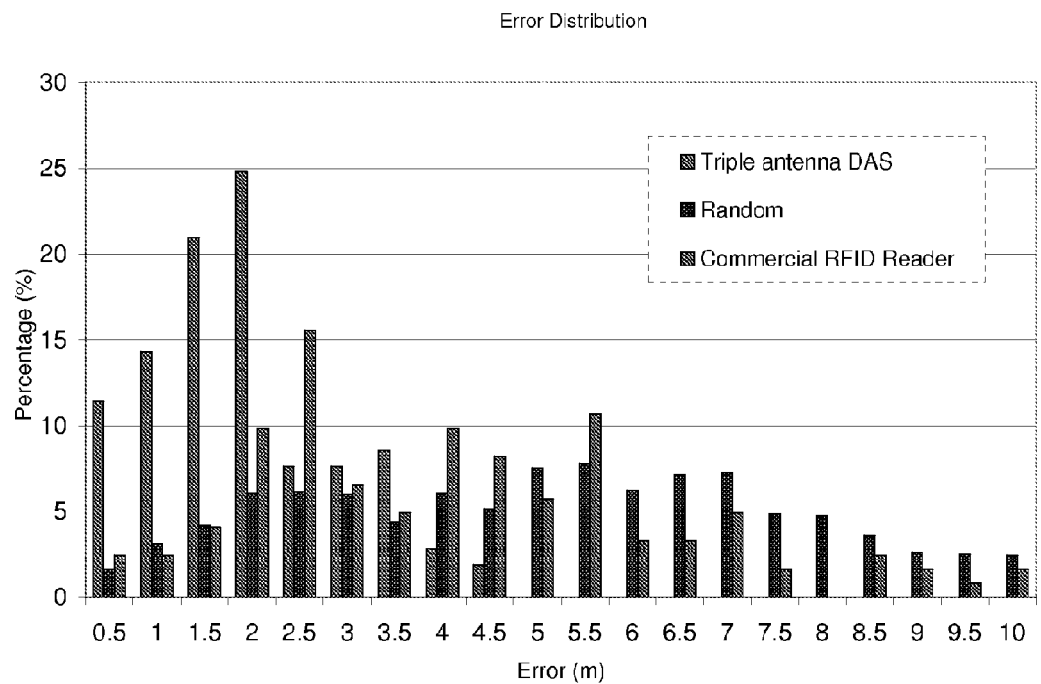
FIG. 31b. Error distribution plot for a triple antenna DAS, a commercial RFID reader and a random algorithm over a 10 m×7.6 m area.

FIG. 31*b* shows the location accuracy error distributions for the fingerprint algorithm for a triple antenna DAS, for a random algorithm and for a commercial RFID reader using RSSI. An average accuracy of 1.9 m (standard deviation of 1.0 m) is achieved for the DAS RFID system, this comparing with an average 4.6 m accuracy (standard deviation of 3.6 m) if the location is picked at random from the set of measurement locations. The average location accuracy using the commercial reader is found to be 4.1 m (standard deviation of 2.1 m). Thus a 2.2 m improvement in location accuracy is achieved by the optical DAS RFID system over the commercial multi-antenna RFID system.

Figure 32:
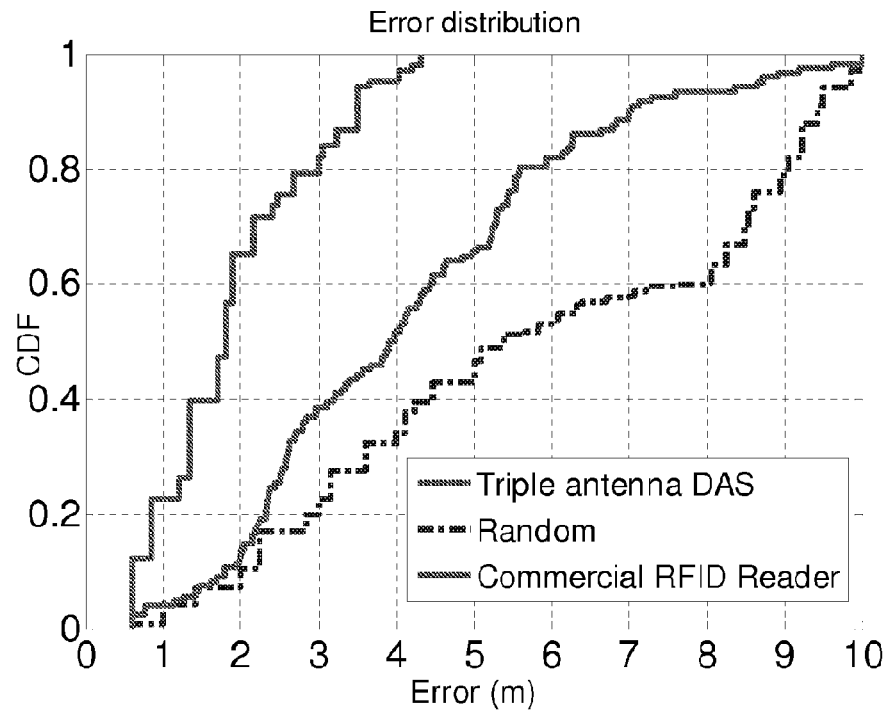
FIG. 32. Cumulative probability distribution (CDF) of error for a triple antenna DAS, a commercial RFID reader and a random algorithm location systems.

FIG. 32 shows a plot of the error cumulative probability density function (CDF) versus error for the various measurements. The CDF values indicate the fraction of locations where the error is less than or equal to the x-axis value. 100% of the location estimations using the DAS have less than 4.2 m error compared with only 55% and 40% from the commercial RFID reader and the random algorithm respectively.

Figure 33:
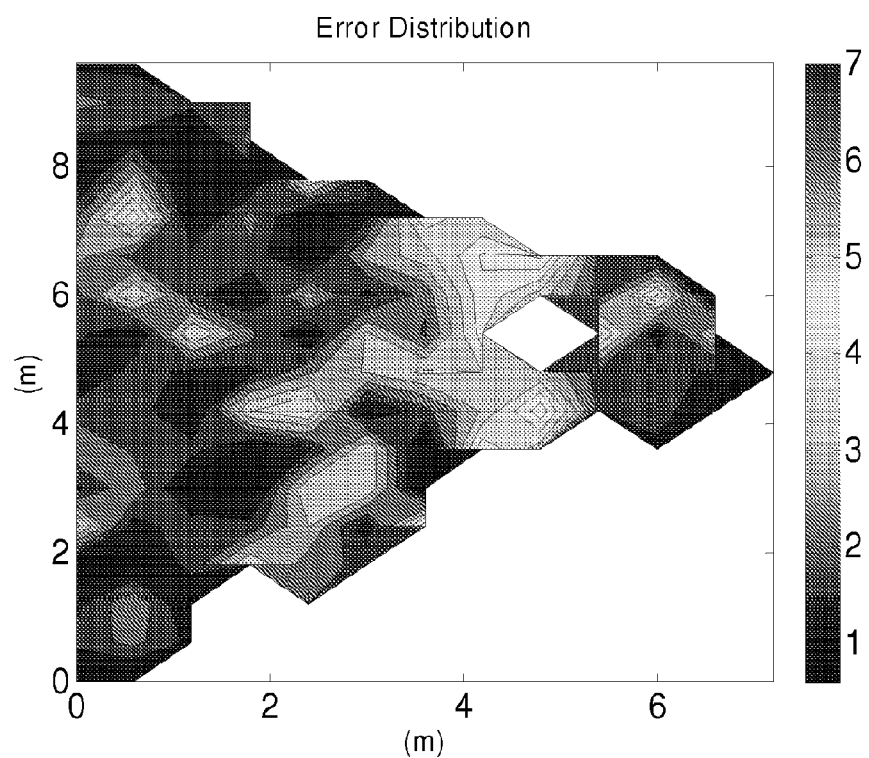
FIG. 33. Plot of spatial variation in the location accuracy for a triple antenna DAS system over a 10 m×7.6 m area.

FIG. 33 shows the spatial variations in the location accuracy for a triple antenna DAS RFID system over the 10 m×7.6 m area. As can be seen, the peak errors in the DAS location measurement arise around the (4.8, 5.4) m location. This is due to an obstacle (a reinforced concrete pillar) at this location. If the measurements within a 1 m radius from the concrete pillar are excluded, the mean location accuracy is improved to be 1.7 m (standard deviation of 0.9 m), and 80% of measurements have an accuracy of better than 2.2 m as opposed to the 3.0 m otherwise.

RTLS Analytical Location Algorithm

An analytical algorithm based on a signal propagation model is also investigated to determine whether an enhancement in location accuracy is possible. An analytical algorithm based on a two ray model, signal propagation model (and a radiation pattern) was implemented as shown in FIG. 34*a*.

Figure 34A:
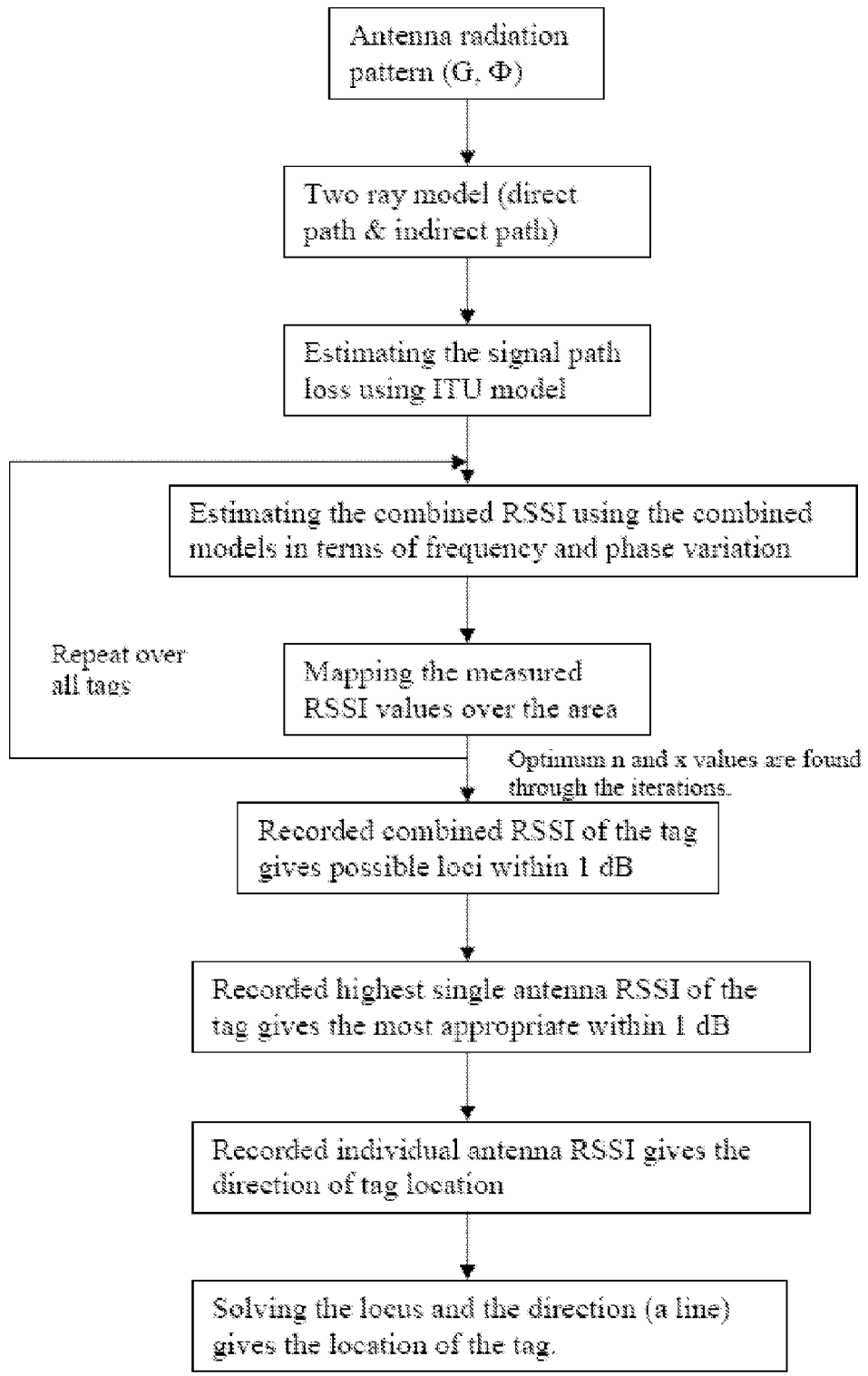
FIG. 34a. Flowchart of an analytical tag location algorithm according to an embodiment of the invention.

As shown in FIG. 34*a*, the combined RSSI distribution from three antennas is modelled over the area of interest based on the antenna radiation pattern, a two ray model, frequency dithering (f), phase dithering ($\theta$) as well as the ITU indoor path loss model which can be written as $L=20\times\log_{10} f+n\times\log_{10} r-28$; where L=total path loss, f=the frequency of transmission, r=distance and n=loss exponent which takes a value depending on the environment.

Figure 34B:
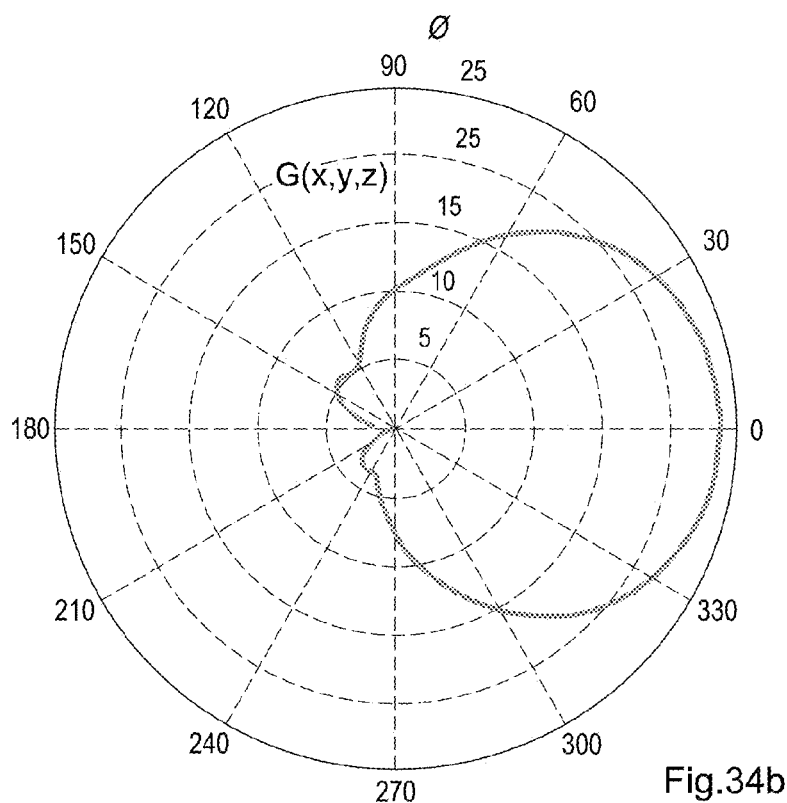
FIG. 34b. Radiation pattern of a circular polarised antenna.

The radiation pattern gives the gain, G(x, y, z) in the direction of interest ($\phi$) as shown in FIG. 34*b*. The two 2-ray model is used to predict the RFID fading occurring due to the interaction between a direct path and a single reflection from the floor as previously shown in FIG. 3. The direct path, $r_1$ and indirect path, $r_2$ are given by $\sqrt{(h_1-h_2)^2+r^2}$ and $\sqrt{(h_1+h_2)^2+r^2}$ respectively; where $h_1$ and $h_2$ are highest of the antenna and tag respectively and r is the distance of the tag away from the antenna location. By combing the ITU and 2-ray models, which assumes the floor is a perfect reflector, as well as the antenna radiation pattern (to give the antenna gain in the particular direction), the amplitudes of the direct and indirect path of the transmitted signal from each antenna at the tag location are calculated at the random signal frequency (f) between 865-868 MHz and are written as $M_1$ and $M_2$ respectively; where P is the transmitted power. In other words, the path loss (in dB) on each of the direct and indirect paths are first estimated using the ITU model, the antenna gain is added to the total transmitted power (G(x, y, z)) in the direction of the direct and reflected ray making use of the antenna pattern to estimate the power at the tag location. This gives the magnitude of the direct and indirect signals.

$$M_1=10\times\log_{10}P+G(x,y,z)-20\times\log_{10}f-n\times\log_{10}r_1+28$$

$$M_2=10\times\log_{10}P+G(x,y,z)-20\times\log_{10}f-n\times\log_{10}r_2+28$$

The phase of the direct and indirect path signals at the tag location are given by $\theta_1$ and $\theta_2$ respectively; where $\lambda$ is the wavelength of the transmitted signal and $\theta$ is the random phase angle between 0-360°.

$$\theta_1 = \text{rem}\left(\left(\frac{\text{rem}(r_1, \lambda)}{\lambda} \times 2\pi\right) + \theta, 2\pi\right)$$

$$\theta_2 = \text{rem}\left(\left(\frac{\text{rem}(r_2, \lambda)}{\lambda} \times 2\pi\right) + \theta, 2\pi\right);$$

where rem( ) are the functions that return the remainders after divisions.

The linear sum of the complex representation of the signals gives a vector representation, V of the signal strength at the location.

$$V = 10^{\frac{M_1}{10}} \times \exp(j\theta_1) + 10^{\frac{M_2}{10}} \times \exp(j\theta_2)$$

The maximum power received by the tag is then calculated by combing the vector representations of the signal power from all three antennas in the direct and the reflected signal path at the optimum frequency and phase combination. The power received by the receiving antenna (RSSI) is calculated in the similar manner and the tag loss is assumed to be x %.

A map is then built up over a matrix of X, Y values.

Figure 34C:
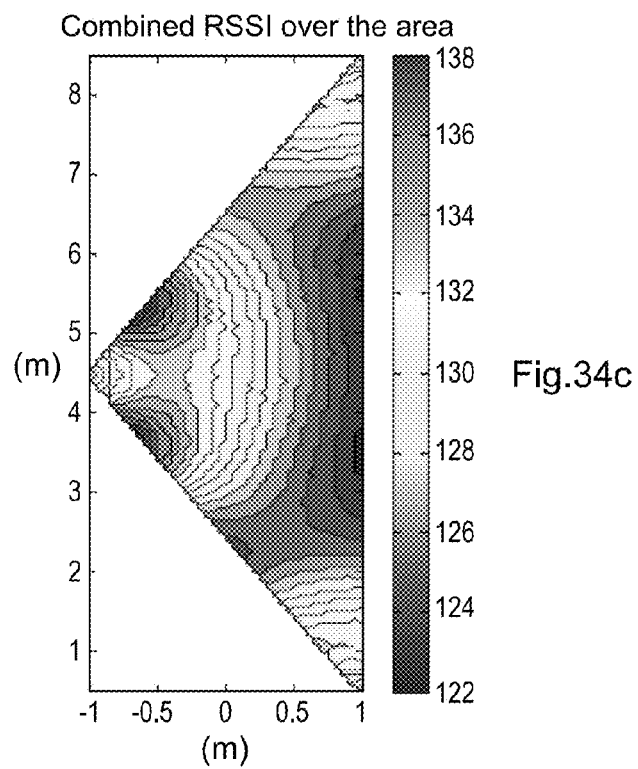
FIG. 34c. Modelled Combined RSSI over the area based on a two ray model, signal propagation model (and a radiation pattern).

The value of the loss exponent (n) in the ITU model and the tag loss, x dB are determined from experimentally record RSSI values which are fitted to the calculated model through an empirical process. n is varied from 1 to 40 while x is dithered from 0.1 to 0.9 and the values of n and x which gives the best fit are then selected. Once the values of n and x are determined, the calculated model (FIG. 34c) is then used to estimate the location. The combined RSSI from a tag of unknown location with 1 dB tolerance (if no solution find then the tolerance is incremented by 1 dB until a solution is found) is compared with the pre-calculated map of RSSI's from the three antennas to give a contour of possible positions. Single antenna RSSI is used to select the appropriate locus within the contour of 1 dB variation (if no solution find then the tolerance is incremented by 1 dB until a solution is found). RSSI from individual antennas (including a rolling average of three previous recordings of the tag RSSI) are then used to find the direction (angle) of the tag location from the nearest antenna location. The angle is estimated using the ratio between the RSSI from the two furthest antennas. The intersection between the locus and the direction (a line) gives a fix position.

Figure 34D:
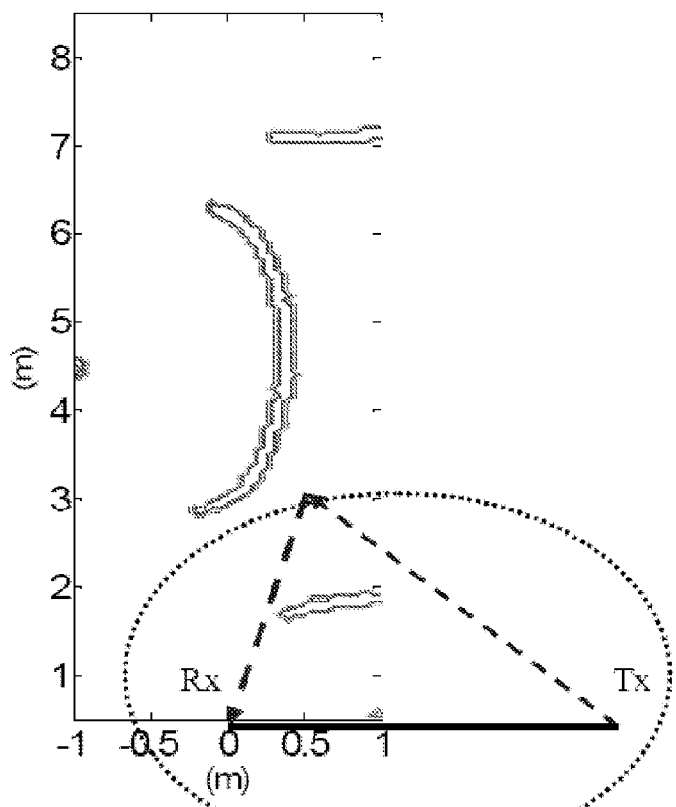
FIG. 34d. In an experimental example, a measured combined RSSI of 128 from the three antennas gives a number of possible loci within 1 dB tolerance and the most appropriate locus is selected within the antenna range.
Figure 34E:
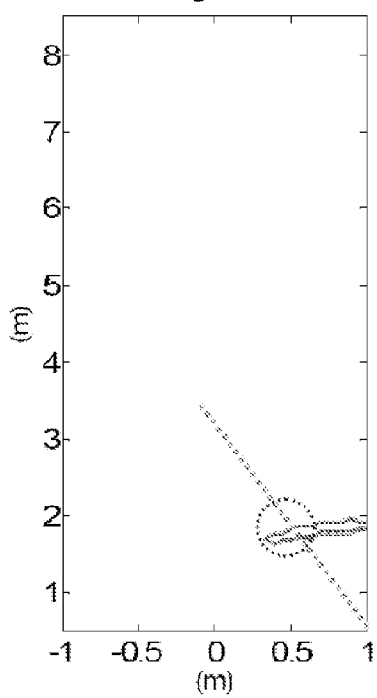
FIG. 34e. In an experimental example, solving the locus and the line (based on the direction) gives the estimated location at (0.5, 1.8).

For instance, a measured combined RSSI of 128 from the three antennas gives a number of possible loci within 1 dB tolerance as shown in FIG. 34d. The AU with the highest RSSI is selected as the most likely closest antenna to the tag location. In this case AU1 gives the highest RSSI as shown in Table 3 and hence the most appropriate locus is selected within the antenna range as shown in FIG. 6. The RSSI values from AU3 and AU2 are then used to estimate the angle (direction) by taking the ratio between them (i.e RSSI of AU3:RSSI of AU2). Solving the locus and the line (based on the direction) gives the estimated location at (0.5, 1.8)—see FIG. 34e.

TABLE 3

INDIVIDUAL ANTENNA RSSI OVER THE LAST THREE HISTORIES

| AU1 | AU2 | AU3 |
|-----|-----|-----|
| 105 | 80  | 80  |
| 131 | 111 | 115 |
| 128 | 118 | 122 |

Figure 35A:
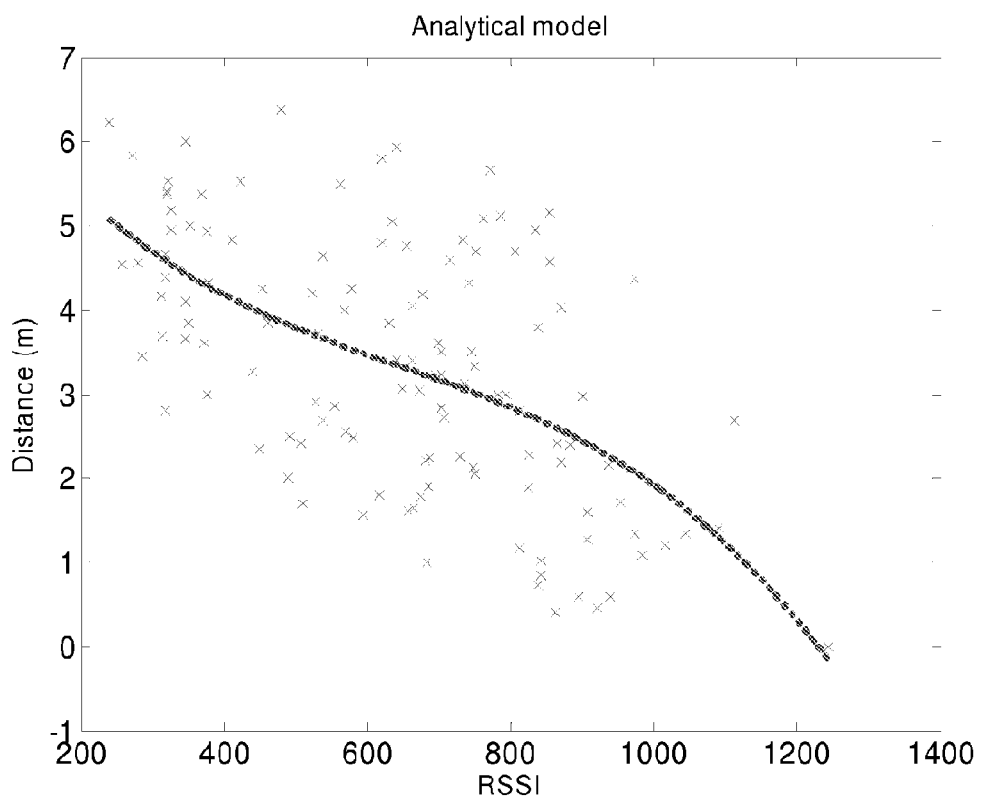
FIG. 35a. An analytical model for a passive UHF RFID system using a $3^{rd}$ order polynominal.

Example Implementation of the Analytical Algorithm:

In an example implementation of the analytical algorithm, measured combined RSSI values from multiple antennas are fitted with a 3rd order polynomial function in order to achieve a minimum error as shown in FIG. 35a. The analytical model is then used to estimate distance which gives an average range accuracy of 1.1 m. The combined optimum RSSI from the three antennas gives three loci of possible positions (circles with the radius of the range). Single antenna RSSI is used to select the appropriate locus among the three loci. Combined RSSI from two antennas are then used to give a fix position.

Figure 35B:
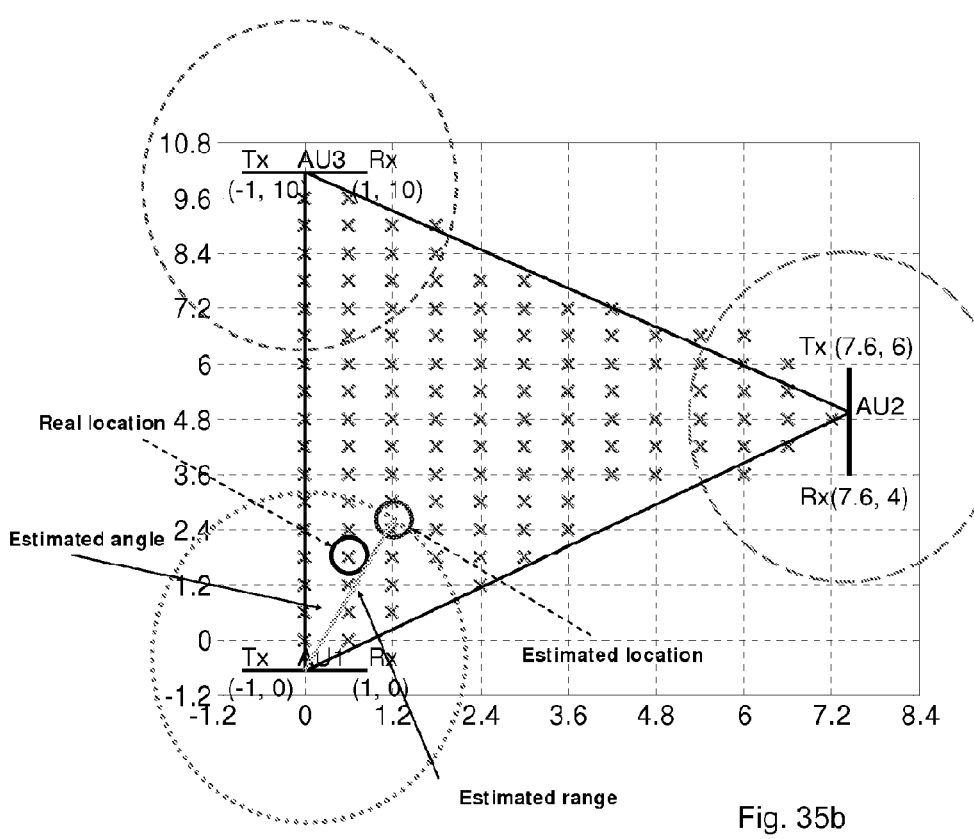
FIG. 35b. The dashed circles represent the three possible loci for a measured optimum RSSI of 640.7. Green circle locus is then chosen due to the highest number successful reads. The probability of successful reads and RSSI from AU1 & AU3 and AU1 & AU2 are then taken into account to estimate the angle and thus it gives a fix position which is represented by the blue circle. The black circle represents the measurement location at (1.5, 2.8) in this case.

For instance, a measured optimum RSSI of 640.7 from the three antennas gives three possible loci (dashed circles with a radius of 3.2 m) as shown in FIG. 35b. The AU (antenna unit) with the highest number successful reads is selected as the most likely closest antenna to the tag location. In this case AU1 gives the highest probability. Therefore, green dashed circle locus is selected to be the appropriate one. The probability of successful reads as well as RSSI values from AU1 & AU3 and AU1 & AU2 are then used to estimate the angle and hence gives the estimated location at (1.5, 2.8) as illustrated in FIG. 35b.

Figure 36:
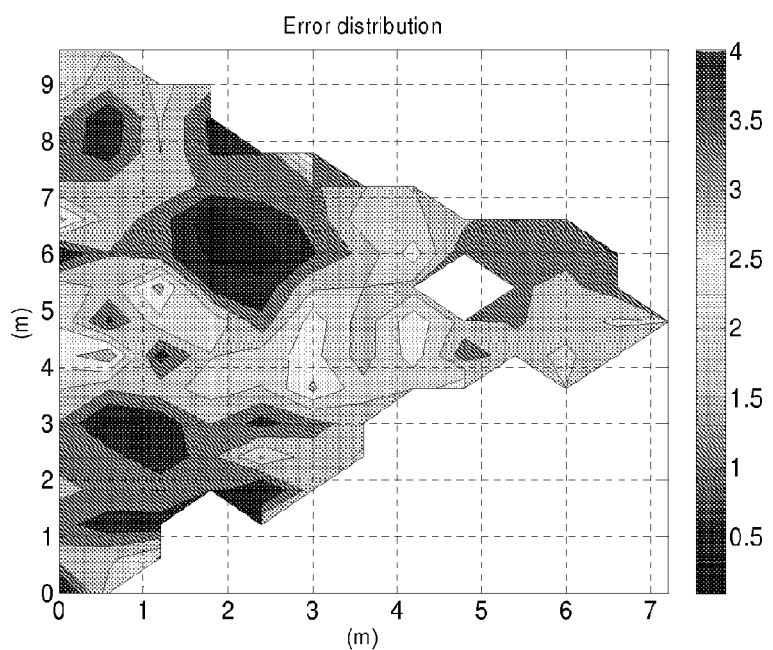
FIG. 36. Plots spatial variation in the location accuracy for a triple antenna optimised DAS system using an analytical algorithm over a 10 m×7.6 m area.

The location accuracy using the analytical algorithm is measured to be 1.6 m with a standard deviation of 0.7 m. The enhanced location accuracy for optimised DAS using the analytical algorithm over a 10 m×7.6 m area is shown in FIG. 36. One advantage of this analytical algorithm is that detailed mapping is not required and hence it can speed up the location process as it only requires calibration within the area of interest to acquire the model parameters.

Effect of Tag Orientation on Location Accuracy

Figure 37:
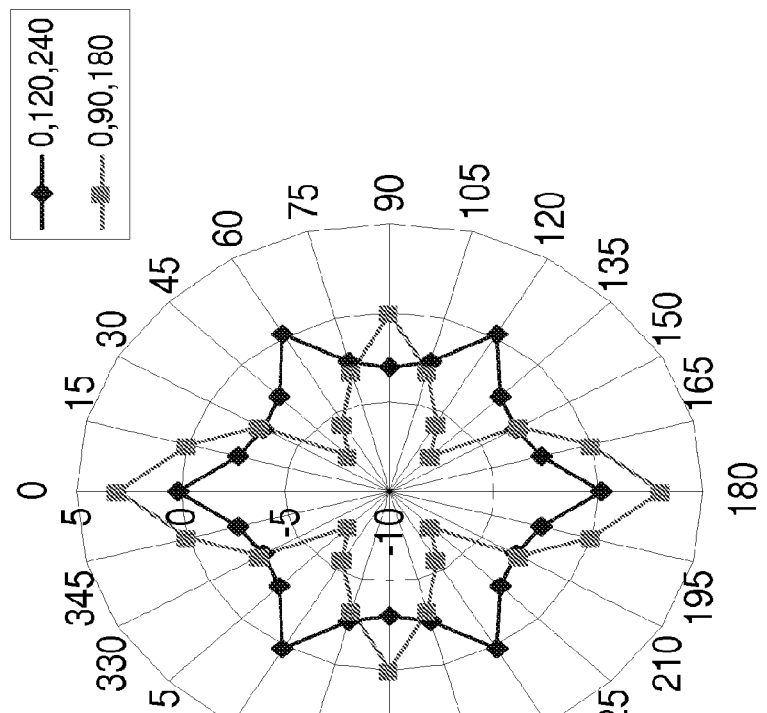
FIG. 37. (a) Typical tag dipole radiation pattern, and (b) effective radiation pattern when three read antennas are used at the indicated angular separations. Note the different radial scales FIG. 38. An example tracking/location system graphical user interface (GUI).
Figure 37:
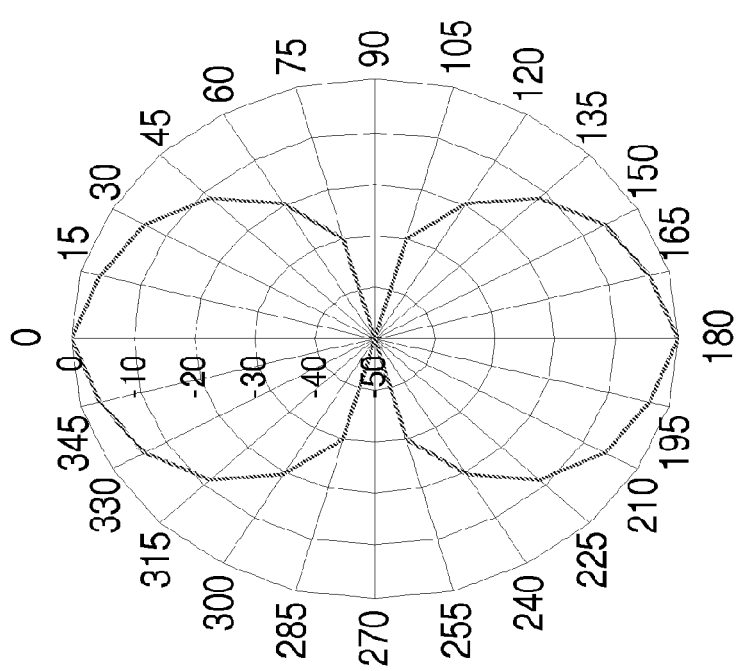

The results discussed so far have used tag antennas matched in orientation to the reader antennas. However, in practice, tag orientation can have a strong effect on the RSSI at a particular reader antenna. The effect of tag orientation on RSSI is reduced for the DAS approach due to antenna diversity. For example, consider a tag with a radiation pattern shown in FIG. 37(a). If the RSSI is summed from 3 antennas, in the best case directions (0°, 120°, 240°) and worst case (0°, 90°, 180°), the orientation dependence of the RSSI is reduced from 50 dB to 3 dB (best case) and 10 dB (worst case) using the DAS, as shown in FIG. 37(b). This orientation insensitivity also gives a much higher probably of tag detection. We thus expect tag orientation to have a relatively small impact on location accuracy in our triple antenna DAS RFID system compared with a conventional RFID system.

A Proof of Principle Demonstration

Figure 38:
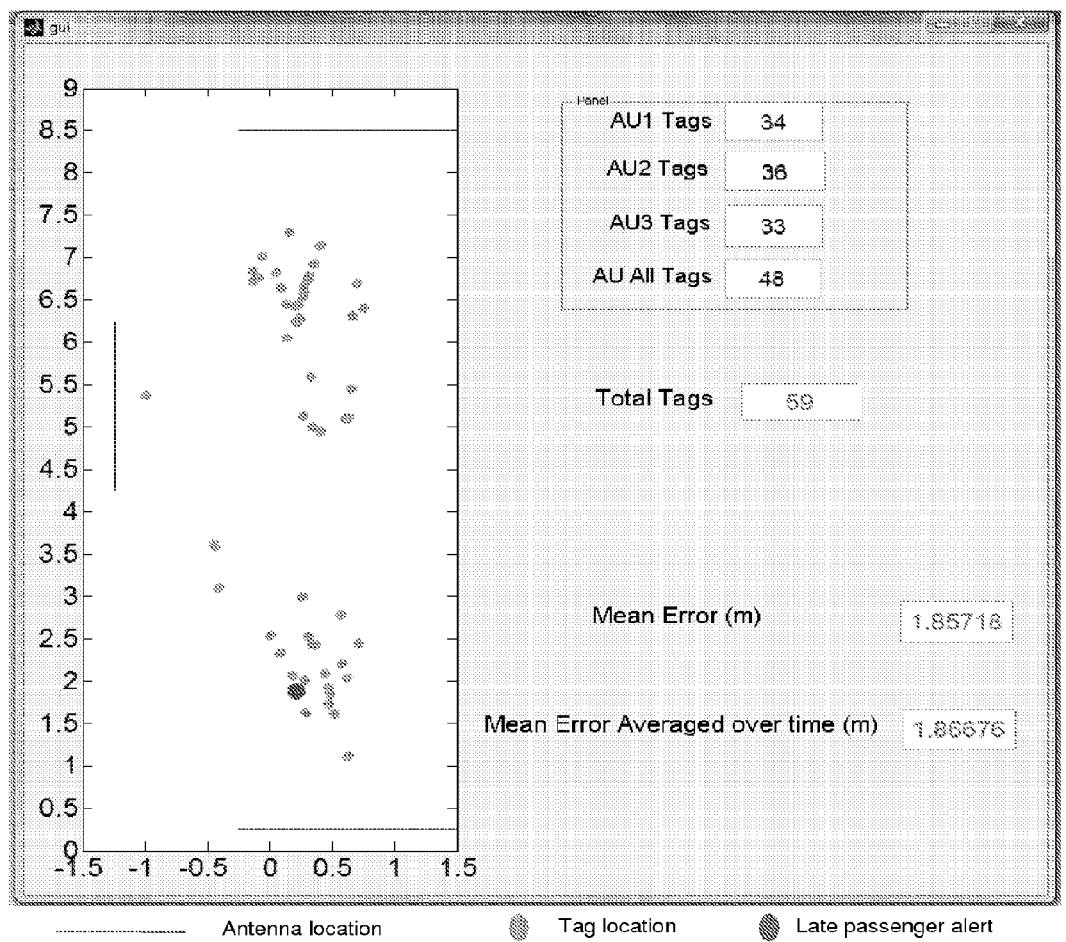

A prototype real time location system based is demonstrated based on low cost passive UHF RFID (FIG. 27). We have shown that by distributing the RFID signals over a radio over fibre DAS the area of coverage can be enlarged at the same time as improving the likelihood of tag detection. As a result of the enlarged coverage, it is necessary to be able to locate tags within the covered area. By using the DAS to reduce fading the returned signal strength from the RFID tag is a strong indicator of position allowing tags to be located by triangulation. The analytical algorithm is implemented using a piece of Matlab® programme and the screen shot of a GUI is shown in FIG. 38. The green circles represent the real time location of an array of passive tags. The location accuracy is shown to be 1.8 m over a 10 m×4 m area.

Multi-antenna Distributed Antenna (DAS) System

Figure 39:
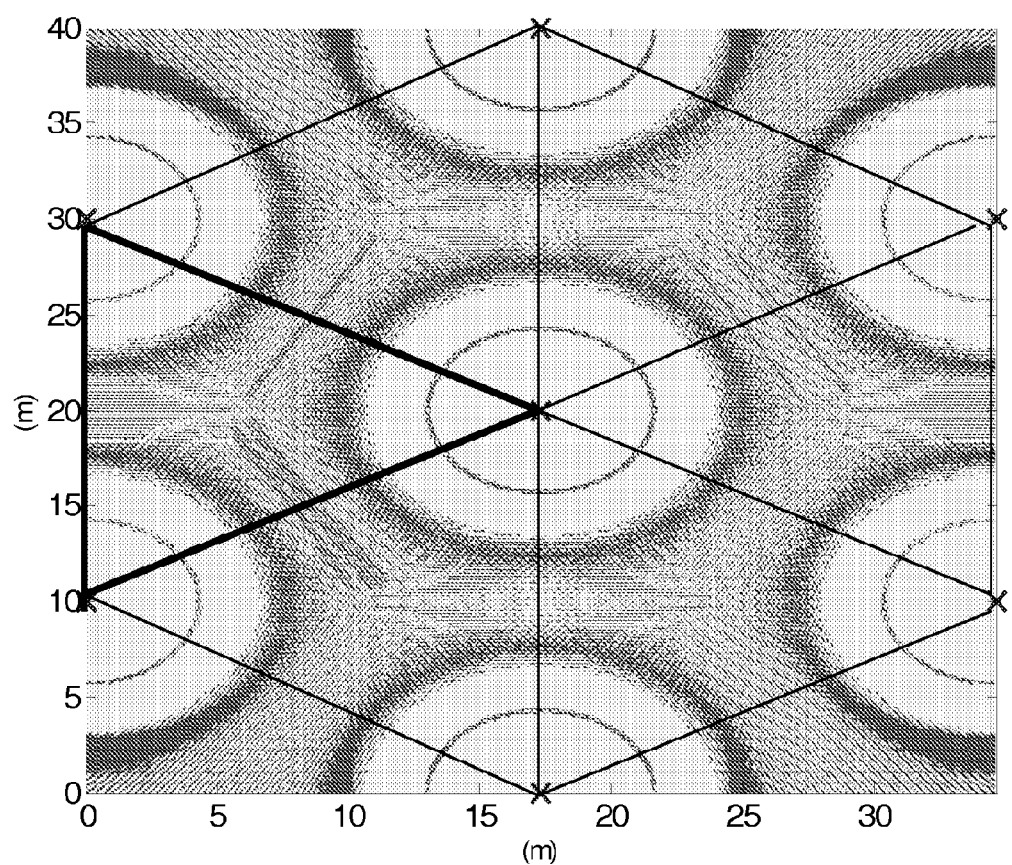
FIG. 39. A hexagonal structure with 20 m antenna spacing. A plot of spatial variation in the signal power using a 2-ray model. Yellow represents above −15 dBm power level and red represents below −15 dBm power level which represents nulls. The positions of the antennas are indicated by blue crosses. The number of read locations is 70%.

We have shown that passive RFID coverage of a triple antenna DAS system can be improved using antenna diversity combined with frequency dithering technique. As a result there is a potential for forming a multi-antenna DAS system which employs six three-antenna DAS to form a hexagonal structure. A hexagonal structure is formed to achieve tessellating cells as shown in FIG. 39. The antennas are shown by the blue crosses. A simple 2-ray model is used to model the RFID fading. As shown in FIG. 39, the received signal power from the antennas each transmitting +30 dBm is calculated on a 5 cm grid interval. It is then used to determine whether a successful read is possible at that location by assuming a tag threshold power of −15 dBm and that the tag threshold power will be the limiting factor. The fading can be reduced by using the antenna diversity and frequency dithering technique. Hence, it is possible to form a number of hexagonal cells and thus we believe that the read range can be extended similar to a value comparable with a wireless local area network (WLAN) and ubiquitous coverage can then be achieved with common infrastructure.

It is anticipated that a large number of tags need to be read in a multi-antenna DAS system. It is therefore possible to split a hexagonal structure into six cells of 3 antennas and searching, ensuring other cells are on different frequency dithers. This can be managed by using a single antenna to transmit simultaneously two ore more frequencies. Moreover, it is possible to sweep all 6 triangles in a hexagon concurrently if tag density is low. Consequently, channel management will be the key in order to handle high volume tags. Therefore, frequency reuse, time diversity technique can be applied for handling large number of tags in a multi-antenna DAS system.

It should be noted that the invention not only provides enhanced coverage for passive UHF RFID, but it can also deliver improved performance for any RF powered system.

We have thus described methods and systems for providing enhanced coverage of RF powered systems such as passive UHF RFID by multicasting the signals over two or more antennas and manipulating the phase differences and carrier frequency between the transmitted signals. Preferably the antennas are placed outside each other's near field.

Embodiments substantially eliminate nulls using RFID signal sources to transmit two or more frequencies from each antenna and vary (dither) the carrier frequency between them in steps. Embodiments also substantially eliminate nulls using phase shifts between two or more antennas and varying (dithering) the phase between them in steps. Further embodiments substantially eliminating the nulls by manipulating the phase differences and carrier frequency where the phase is varied between two of the antennas in 24° steps between 0° to 360° while the frequency is varied from 860 MHz to 960 MHz in 1 MHz steps. In each case, where more than two antennas are used an exhaustive search may be employed. The methods/systems combine the received signals from two or more antennas and then process them at the base station. Preferably the methods/systems apply a different gain to the signal from each antenna to optimise the combined received signal SNR; this may be by altering the gain of uplink of each antenna unit (AU) in 10 dB steps or less between 0 dB and 30 dB. Embodiments provide enhanced passive UHF RFID and sensor coverage using the phase and power diversity. Embodiments also improve read range of a RFID and sensor system with the phase and power diversity, and/or improve the read speed/rate of a RFID and sensor system with the phase and power diversity, and/or improve the location accuracy of a RFID and sensor system with the combined RSSI from multiple antennas, phase diversity and power diversity.

In some preferred embodiments of the methods the antennas are fed either by co-ax or by radio over fibre techniques. In embodiments one or more of the transmit/receive antennas may comprise a leaky feeder.

Tag Location Using RSSI-weighted Phase-frequency Gradient Measurements

One of the problems which these techniques address is the difficulty in determining the location of a tag if it is in or near a null. Broadly speaking to address this we use a combination of phase information from the received tag back-scatter signal or from the transmitted carrier signal at the tag location, and RSSI, to increase accuracy. By selective use of information from the system, in particular neglecting low RSSI signals and using weighting techniques/Kalman filtering one can minimize the causes of errors. In embodiments we also use several antennas so that the likelihood of nulls is reduced, dynamically shift any nulls by phase dithering, frequency dithering and antenna switching (i.e. switching the Tx and Rx antennas at a particular location or change the polarisation of each) so that successful location is enhanced, and reduce the likelihood of indirect paths causing interference which leads to nulls by employing beamed antennas, that is narrow beamwidth antennas (for example less than 45° or 35°). These features, especially when combined, provide greatly improved tag location sensing over increased distances.

Thus, broadly speaking, preferred embodiments of the system first aim to minimize the effect of multipath fading on location accuracy, and second use joint phase information and RSSI to increase location accuracy, in particular by Kalman filtering techniques. Some preferred embodiments operate over a distributed antenna system (DAS), and although coax-based systems or other transmission media may be employed, some preferred embodiments use radio over fibre (ROF) systems to transmit and receive signals from antenna units (AUs) to RFID tags.

We will describe an accurate passive RFID location sensing system which operates over a distributed antenna system (DAS). Although coax-based systems, or those using other transmission media could be used, a preferred approach uses radio over fibre (RoF) systems to transmit and receive signals from antenna units (AUs) to RFID tags.

Figure 40:
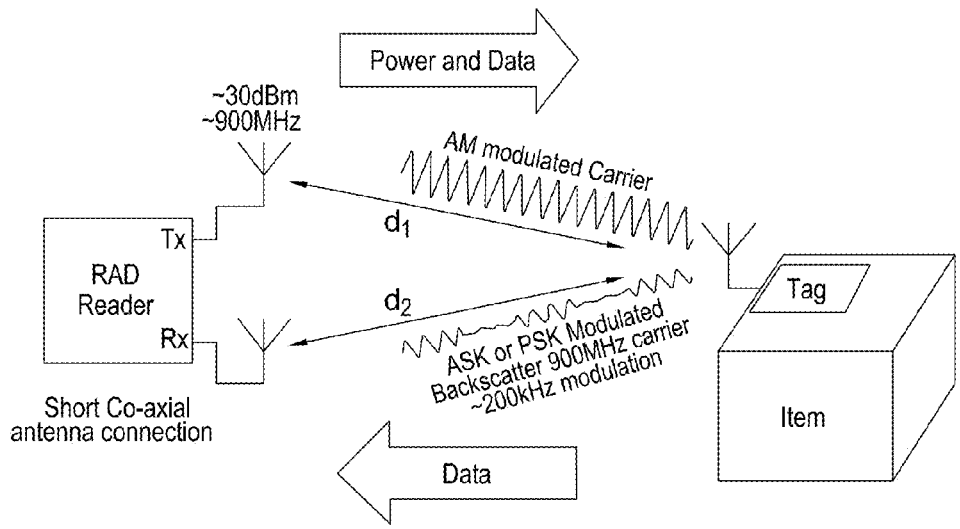
FIG. 40. Shows reader to tag and tag to reader communications.

The distance between the reader and tag can be estimated by measuring the phase shifts between the transmitted carrier and received tag signals at two different carrier frequencies. For instance, for a bi-static reader system as shown in FIG. 40, the phase shift ($\theta_1$) of the coherent tag backscatter signals at $f_1$ frequency (wavelength $\lambda_1$) can be given by equation (1). Similarly, the phase shift ($\theta_2$) of the coherent tag backscatter signals at $f_2$ frequency (i.e $\lambda_2$ corresponding wavelength) can be given by equation (2).

$$\theta 1 = ((d_1+d_2)-k\lambda_1)/\lambda_1 \times 2\pi \qquad (1)$$

$$\theta 2 = ((d_1+d_2)-k\lambda_2)/\lambda_2 \times 2\pi \qquad (2)$$

Where $d_1$ and $d_2$ are the forward and return distances and k is an integer number.

By combing equations (1) and (2), eliminating k and substituting for $\lambda$ in terms of f (i.e $\lambda=c/f$, where c is speed of light), the total distance, $d_1+d_2$ can be calculated as $$d_1+d_2 = (c/2\pi) \times (\theta_1-\theta_2)/(f_1-f_2) \qquad (3)$$

Figure 41:
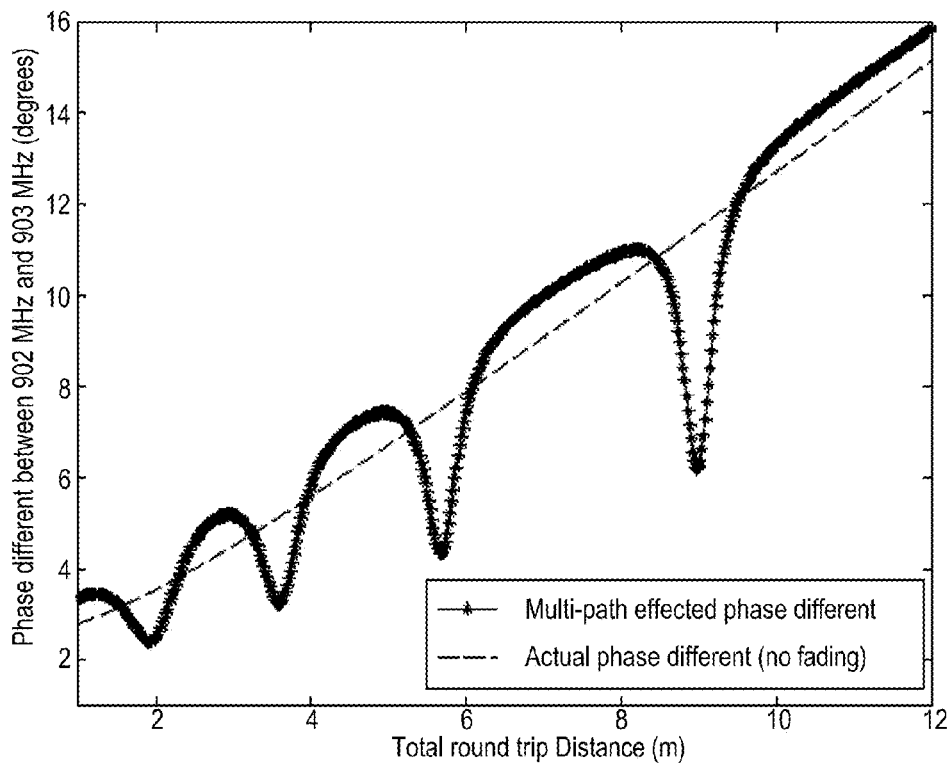
FIG. 41. Shows the effect of multipath fading on phase difference.

Location can then be estimated by using distance estimation from three or more readers and triangulating. However, two key factors reduce the accuracy of this location technique in passive RFID systems. The multi-path effects (due to reflections from floors, ceilings, and walls, etc) results in poor location accuracy due to inaccurate phase shift measurements due to the observed signals being the complex sum of the direct and reflected paths (FIG. 41) which lead to poor range estimations. The second is due to poor read success rate as this technique uses range estimations from multiple readers, which may not be possible.

RTLS Based on a Combination of RSSI and Phase of Backscatter Signals with Frequency Dithering and Antenna Diversity This approach for locating RFID tags uses information from (a) frequency dithering and (b) a combination of RSSI and phase of the tag signals. Hence, we determine them as follows.

Figure 42:
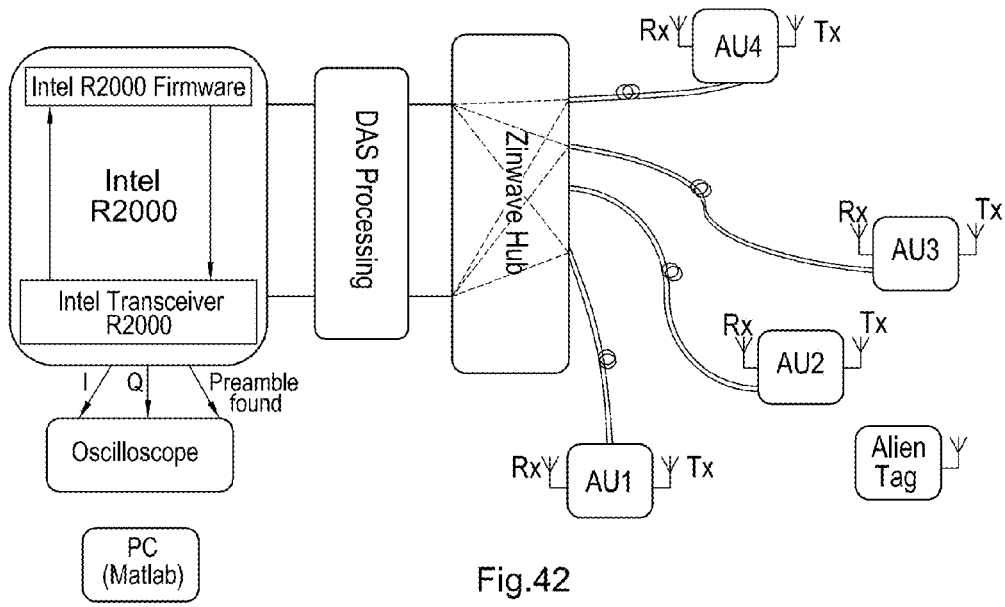
FIG. 42. Shows an example experimental arrangement of an embodiment of the invention using a 4 antenna DAS combined with an R2000 tag reader; the demodulated tag backscatter signals are fed into an oscilloscope to sample and acquire I and Q signals which are processed in Matlab™ (a preamble-found signal is used as a trigger signal for the oscilloscope).

An example experimental setup using a four antenna DAS combined with an Intel R1000™ reader is shown in FIG. 42. The demodulated tag backscatter signals are fed into an oscilloscope to sample and acquire I and Q signals which are then processed in Matlab™. The preamble-found signal is used as a trigger signal in the oscilloscope.

Figure 43:
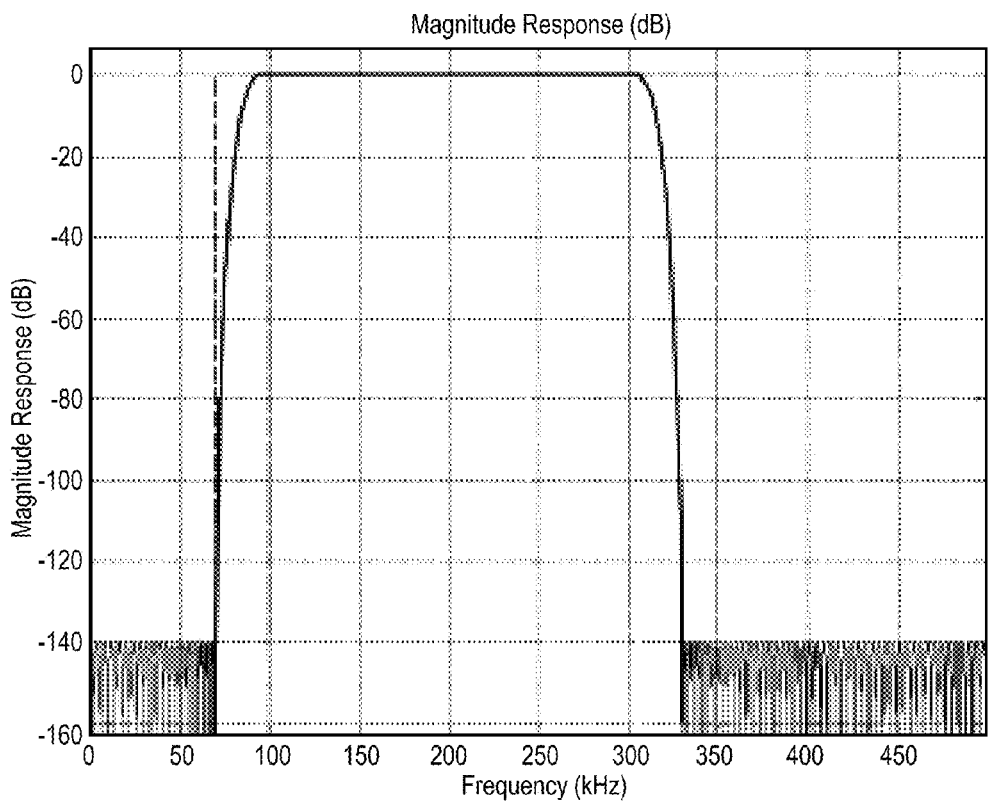
FIG. 43. Shows an example response of a digital Butterworth and Kass filter for removing unwanted signals.

A +30 dBm equivalent isotropically radiated power (EIRP) is transmitted from each antenna unit (AU) at a time. In addition, Tx and Rx antennas are switched to each perform both transmit and receive operations in each AU. This provides extra measurements which are used later with signal processing techniques to accurately estimate the phase difference. The received tag backscatter signals are demodulated in the R1000 reader module which provides baseband I and Q components of the backscatter signals. The signals are then sampled using an oscilloscope and processed in Matlab to estimate the amplitude (i.e RSSI) and phase angle. A digital Butterworth band pass filter is implemented in Matlab™ to remove unwanted signals. The filter frequency response is shown in FIG. 43.

Figure 44:
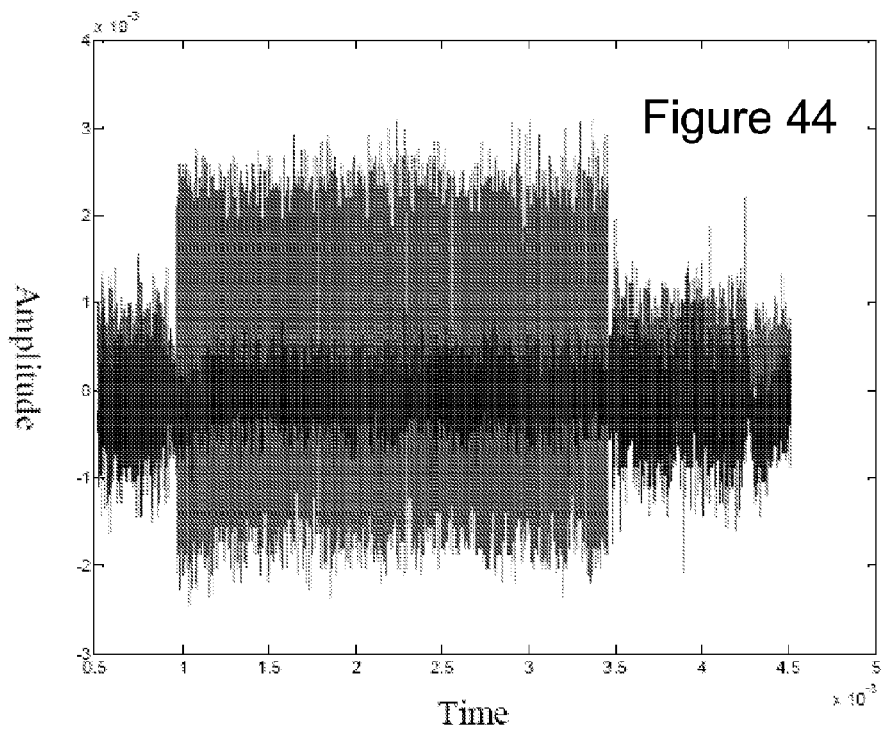
FIG. 44. Shows I and Q components of the tag backscatter signals (the Q component is the larger/red signal).
Figure 45:
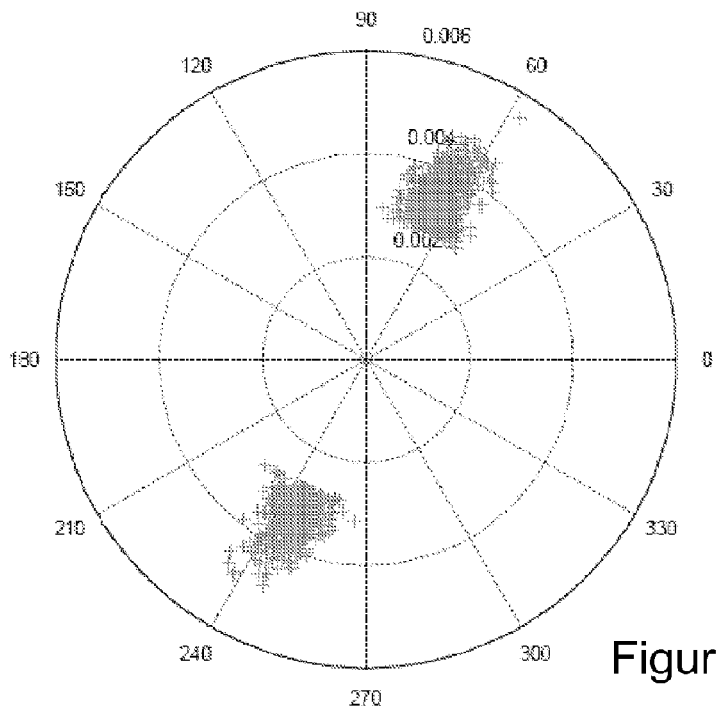
FIG. 45. Shows a constellation diagram illustrating tag backscatter signals; RSSI and phase angle of the tag signals can be calculated from this diagram.

Matlab™ processing, as described above gives the desired I and Q of the tag backscatter signals as shown in FIG. 44. FIG. 45 shows a constellation diagram of the tag backscatter signals. The RSSI and phase of the signals are determined from this. It should be noted that the phase shift due to fibre length is calibrated out to give the actual phase shift over the wireless transmission range between the AU and tag. The RSSI and phase of the backscatter signals are measured over six frequencies in this example, from 902.75 to 912.75 MHz with a 2 MHz step.

Figure 46:
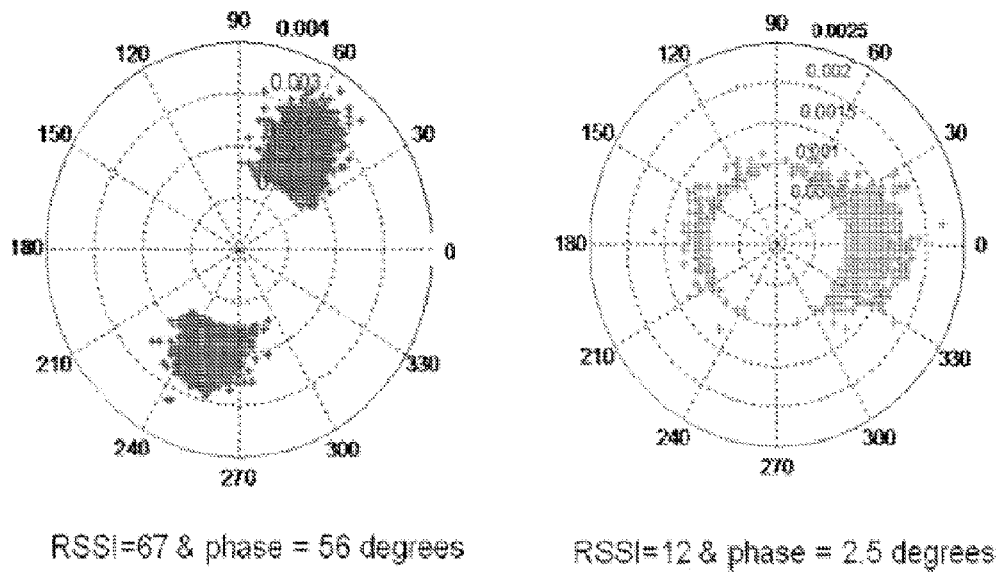
FIG. 46. Shows constellation diagrams for RSSI=12 (right) and for RSSI=67 (left) illustrating that the low RSSI constellation diagram exhibits more multipath fading.

Having found RSSI and phase angle, one can investigate how they relate. From FIG. 46, one can see that heavily multi-path affected backscatter signals tend to have a low RSSI value. Hence, phase angle can be corrected using RSSI information.

The measured RSSI and phase values are used to provide the best estimate of the range by employing a Kalman filtering algorithm. The most weight is given to the value with the least uncertainty (i.e. phase angle at maximum RSSI). The weights are calculated from the covariance. The Kalman filter produces an estimate of the actual phase based on the recorded phase values by computing a weighted average of the measured phase values. The estimated phase values are much closer to the known ideal values than the original measurements as the weighted average has a better estimated uncertainty. The Kalman filtering algorithm predicts the actual value based on the measurements using equations 4 and 5, using the RSSI as an indicator of confidence. It then corrects the values (equations 6, 7, 8 and 9).

Time Update (Predict)

$$X_1(k)=X(k-1) \quad (4)$$

$$P_1(k)=P(k-1)+Q \quad (5)$$

Measurement Update (Correct)

$$K(k)=P_1(k)/(P_1(k)+R(k)) \quad (6)$$

$$X(k)=X_1(k)+K(k)\times(z(k)-X_1(k)) \quad (7)$$

$$P(k)=(1-K(k))\times P_1(k) \quad (8)$$

In the equations k labels the measurement in a frequency sweep, Q is the process variance and assumed to be a predetermined, preferable small value, for example $1\times 10^{-5}$, z is the phase measurement, X is corrected phase value, P is an initial guess of error estimate and R=(1/normalised RSSI$^n$) is an estimate of measured phase variance based on the measured RSSI. In embodiments only phase values from signals with a normalised RSSI of >0.2 are taken into account; otherwise the data is discarded. The normalised RSSI is calculated by taking the ratio between the RSSI and maximum RSSI. The filter is optimised by tuning the filter parameters R (and Q) and the empirical coefficient, n, which in one implementation was chosen to be 0.23 for minimum range error. The weighting by K (the blending factor) is such that as the measurement error covariance approaches zero, the actual measurement is "trusted" more and more, while the predicted measurement is trusted less and less.

Figure 47:
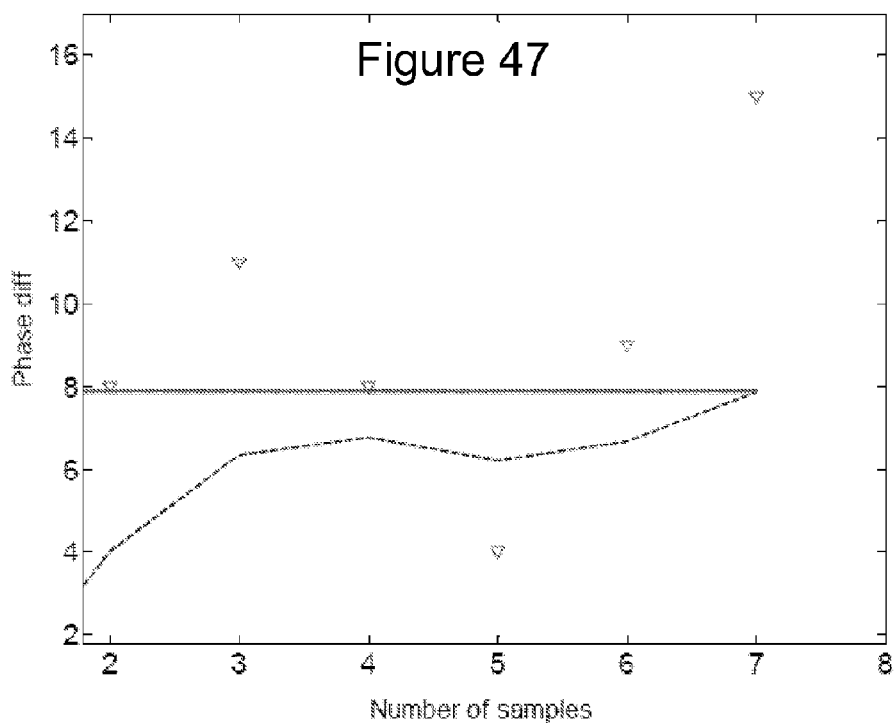
FIG. 47. Shows a number of phase samples (triangles), actual phase (solid line), and corrected phase (dashed line) for these samples using a Kalman filter technique.
Figure 48:
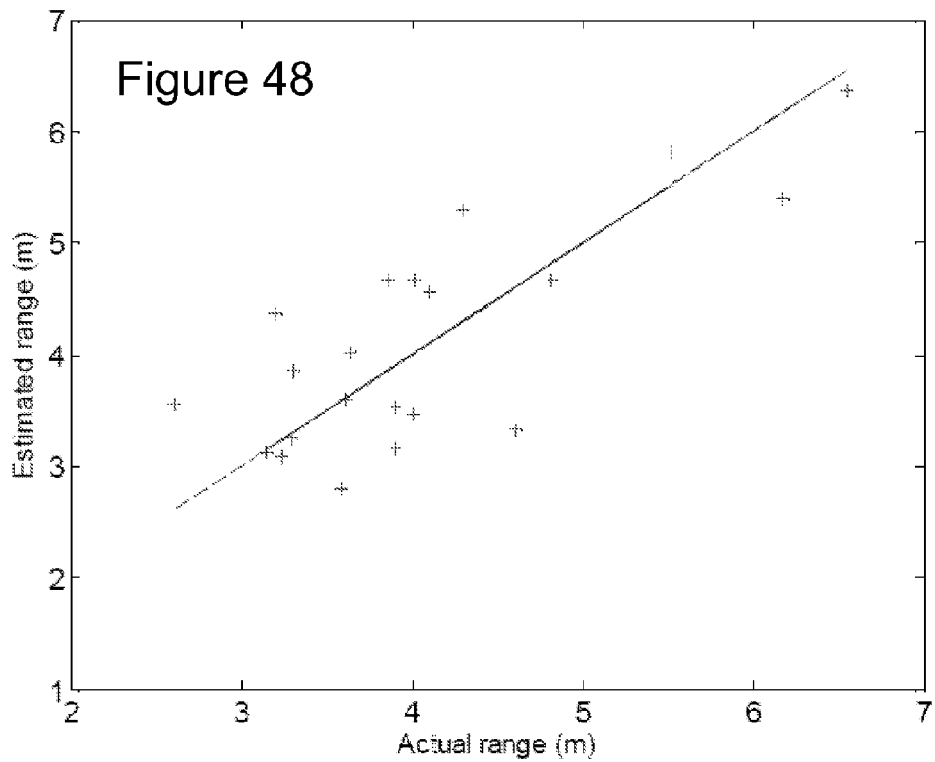
FIG. 48. Shows estimated range values (crosses) and expected values (dashed line).

FIG. 47 shows the corrected phase measurement over 7 samples for an example location. The samples were obtained by dithering the carrier frequency as well as switching the Tx and Rx antennas at the particular location (phase shifts are calculated between the adjacent frequencies with a 2 MHz frequency offset/bandwidth ($f_1-f_2$). The antenna switching and frequency dithering provide measurements to accurately estimate the phase difference as this technique minimises the multipath fading that causes inaccurate measurements. This leads to enhanced location accuracy. It can be seen that Kalman filtering algorithm tends to estimate phase values very close to the ideal calculated phase. The corrected phase angles are then used to estimate the range using the range equation (9) below. The estimates are plotted against the actual range in FIG. 48. An average range accuracy of 0.54 m was achieved using this approach.

$$R=(c/4\pi)\times(\theta_1-\theta_2)/(f_1-f_2) \quad (9)$$

Figure 49:
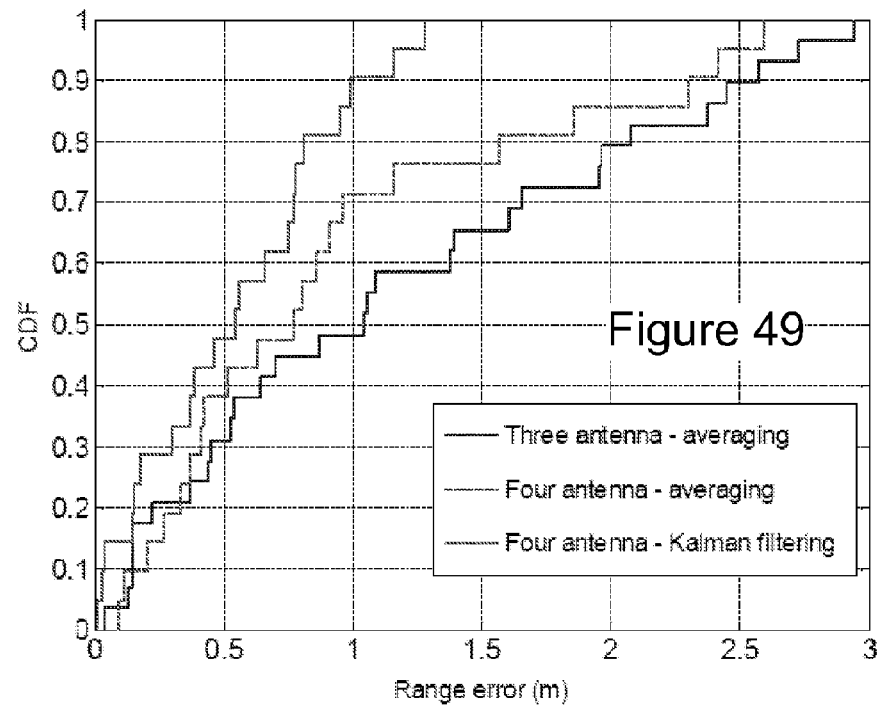
FIG. 49. Shows an accumulative probability distribution of the experimentally measured range error for a 3 antenna (averaging), 4 antenna (averaging), and 4 antenna (Kalman filtering) system; the upper line is for Kalman filtering, the middle line is for 4 antenna averaging, and the lower line for 3 antenna averaging.

FIG. 49 shows cumulative probability distributions of the experimentally measured range error for three different algorithms namely a three antenna DAS with phase averaging over the frequency channels, a four antenna DAS with phase averaging over frequency channels, and a four antenna DAS with a Kalman filtering algorithm. It is shown that adding an extra antenna improves the range error due to an improvement in multi-path robustness. However, by applying Kalman filtering algorithms to the four antenna DAS, it is possible to achieve a much enhanced accuracy in a passive RFID system.

For wider area coverage, a large number of antennas may be used. The additional antennas may be used to enhance the location resolution further by providing additional degrees of freedom, i.e. a better chance that all the antennas in the array do not suffer substantial multipath for a particular tag location, and a better chance of a favourable geometric arrangement of the antennas and tag. Signal processing may be employed to exploit and improve the accuracy of detection of low SNR signals, for example by (cross) correlation with high SNR signals.

Figure 50A:
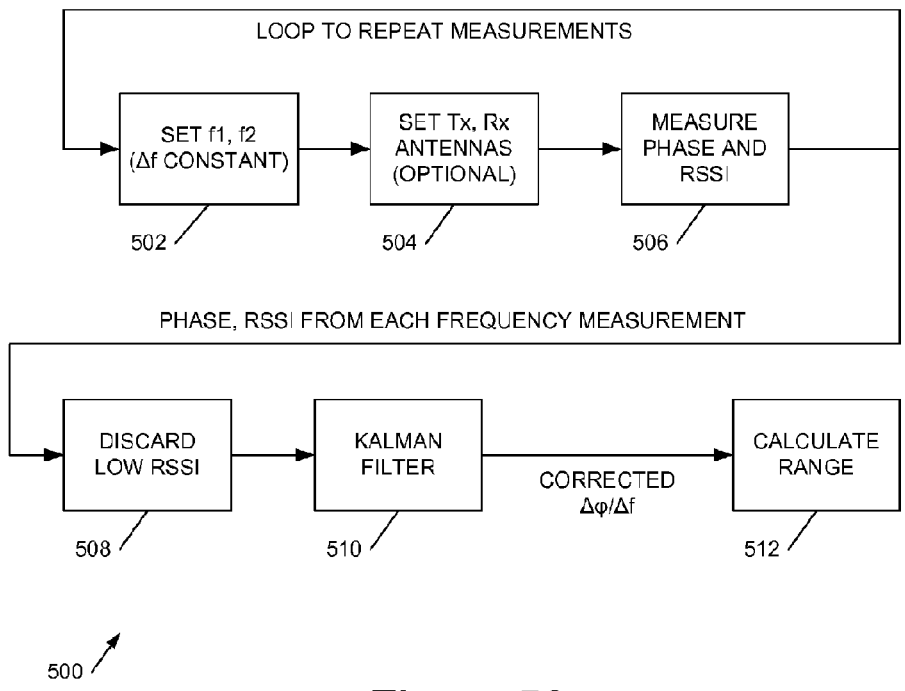
FIGS. 50a and 50b. Show, respectively, functional and structural block diagrams of a first embodiment of an RFID tag location system according to a first aspect of the invention.
Figure 50B:
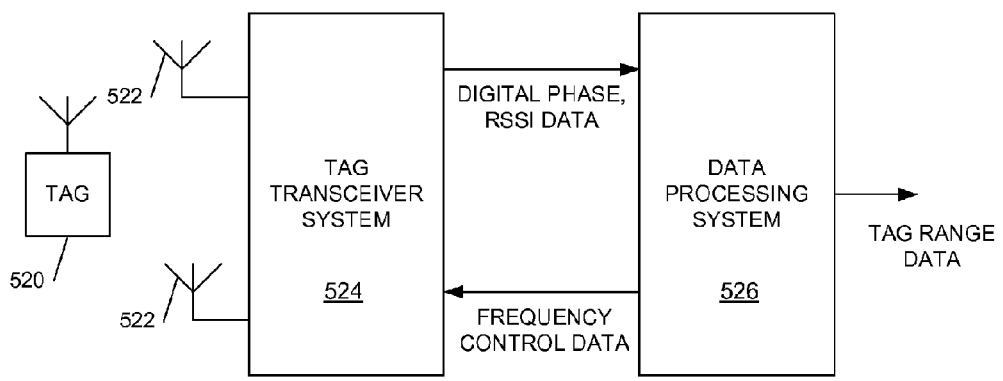

FIGS. 50a and 50b show, respectively, functional and structural blocked diagrams of an embodiment of an RFID tag location system 500 according to a first aspect of the invention. Thus in module 502 the system sets a frequency $f_1$ to use, which in turn determines $f_2$, since in this embodiment a substantially constant frequency offset is employed. Then in module 502, optionally one antenna is selected for transmitting, and a second for receiving, the functions of these antennas being exchanged on a second measurement. The system then measures phase of the tag return signal at the two frequencies (with respect to the transmitted signal), and also determines the received signal strength for the return at each frequency, using module 506. This loop is repeated a number of times for a set of different frequencies, for example to perform a frequency sweep over a range of frequencies. The resulting phase and RSSI information is provided to module 508 which discards data resulting from received signals with a RSSI below a threshold, and then the remaining data is Kalman filtered 510 as previously described to provide coaxed change of phase with frequency data, which is in turn used for a range calculation 512.

The skilled person will appreciate that the modules of FIG. 50a may conveniently be implemented in software controlling a interrogation transceiver system. Thus FIG. 50b shows the same system implemented as an interrogation transceiver system 524 having multiple transmit/receive antennas 522 in communication with a passive RFID tag 520, and under control of a data processing system 526. The data processing system 526 provides frequency controlled data to the transceiver system 524 to control the frequencies employed and receives digital phase and RSSI data from system 524 which it processes to output tag range data.

Figure 51:
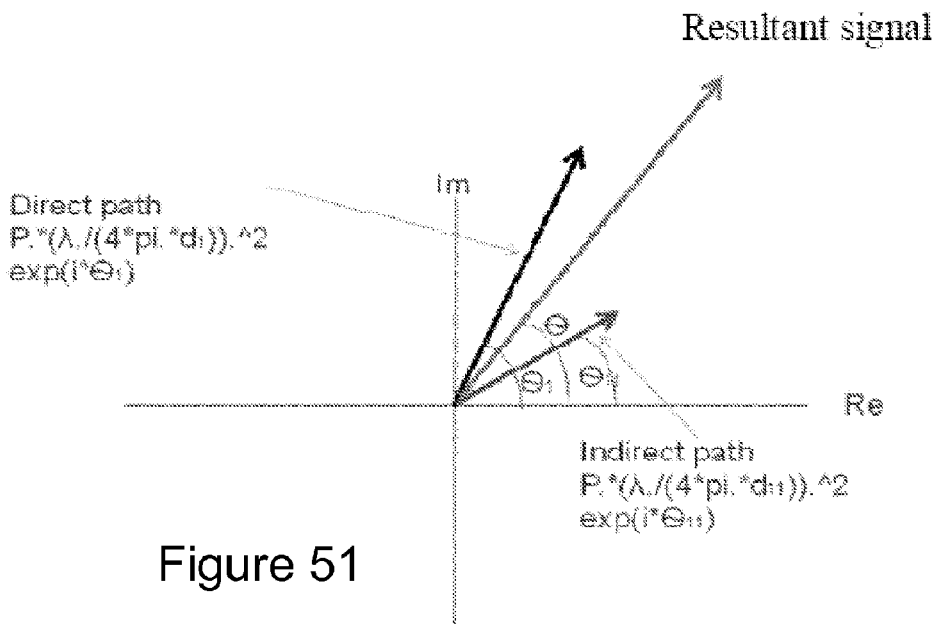
FIG. 51. Shows a vector illustration of a received signal at a tag due to direct and indirect paths; frequency dithering varies both amplitude and the phase of the direct and indirect path signals while phased dithering only varies the phase of both signals.

RTLS Based on a Combination of RSSI and Phase of Backscatter Signals with Frequency Dithering, Phase Dithering and Antenna Diversity An alternative embodiment of the technique uses the RSSI of the returned signal to estimate the phase relationship between the signals from various antennas at the tag. FIG. 51 shows a vector illustration of signal at tag due to direct and indirect paths. Phase dithering alters the phase of both the direct and the indirect signals together, but does not vary the amplitude. Hence, the resultant signal at tag can be rotated to any desired direction on the IQ plane.

Figure 52:
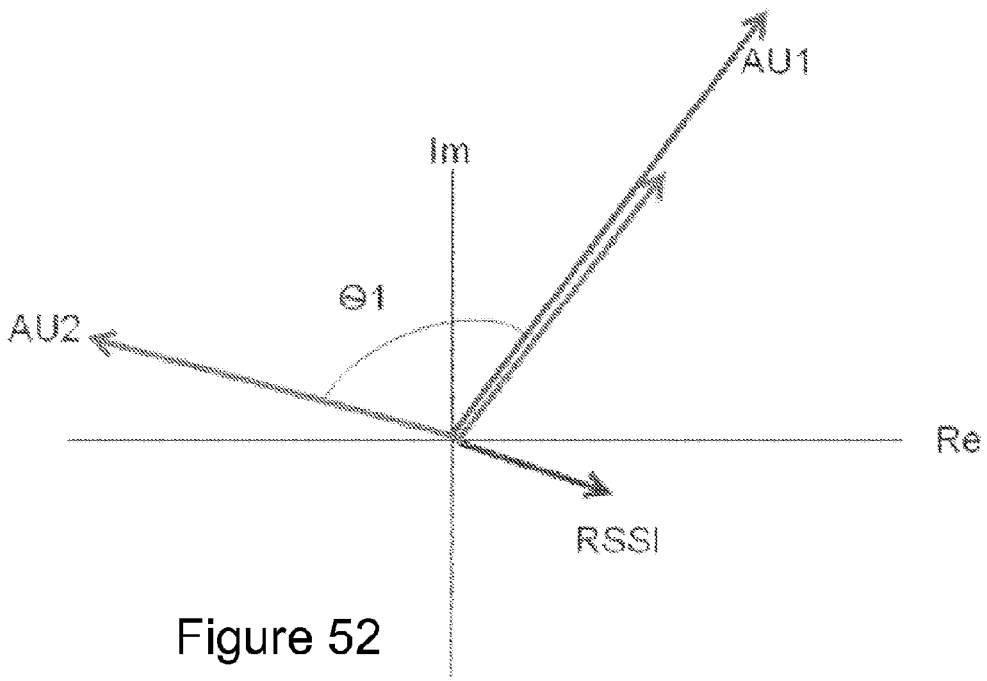
FIG. 52. Shows a vector representation of a signal at a tag resulting from signals transmitted from antennas AU1 and AU2; the AU2 signal needs to be rotated by $\theta_1$ and $\theta_2$ with respect to the AU1 to obtain maximum RSSI at respective frequencies $f_1$ and $f_2$, and the phase angles of the received signals at AU1 or AU2 are measured at both frequencies ($\theta_3$ and $\theta_4$) for range estimation.

If we now consider a double antenna system and assuming the resultant signals at tag from AU1 and AU2 antennas are in the directions for a frequency f1 as shown in FIG. 52. While the phase angles of each AU signal cannot easily be directly measured at the tag, by observing the RSSI, it is possible to determine the phase shift required to give the maximum RSSI, which occurs when both signals are in phase at the tag. If the AU2 signal then needs to be rotated by angles $\theta_1$ and $\theta_2$ with respect to AU1 signal to get a maximum RSSI at frequencies $f_1$ and $f_2$ respectively. It is then possible to determine the ranges $R_1$ and $R_2$ in terms of the known parameters as given in equation (10):

$$R_1 - R_2 = c \times (\theta_1 - \theta_2)/2pi \times (f_2 - f_1) \quad (10)$$

Where $R_1$ and $R_2$ are the distances to tag from AU1 and AU2 antennas respectively. It should be noted that this equation only represents one way fading instead of two way fading as this was the case previously.

As there are two unknowns $R_1$ and $R_2$, it is therefore necessary to use another equation to solve for ranges. As a result, the phase angles ($\theta_3$ and $\theta_4$) of maximum RSSI at receiver AU1 or AU2 are measured for both frequencies. Hence, R1 or R2 can be given by $$2R_1 \text{ or } 2R_2 = c \times (\theta_4 - \theta_3)/2pi \times (f_2 - f_1) \quad (11)$$

Ranges $R_1$ and $R_2$ can then be estimated from equations (10) and (11) and this will improve the location accuracy further as the DAS will reduce the fading. One potential drawback is that phase step to find the maximum RSSI may need to be small, which can slow down the location update speed.

Figure 53A:
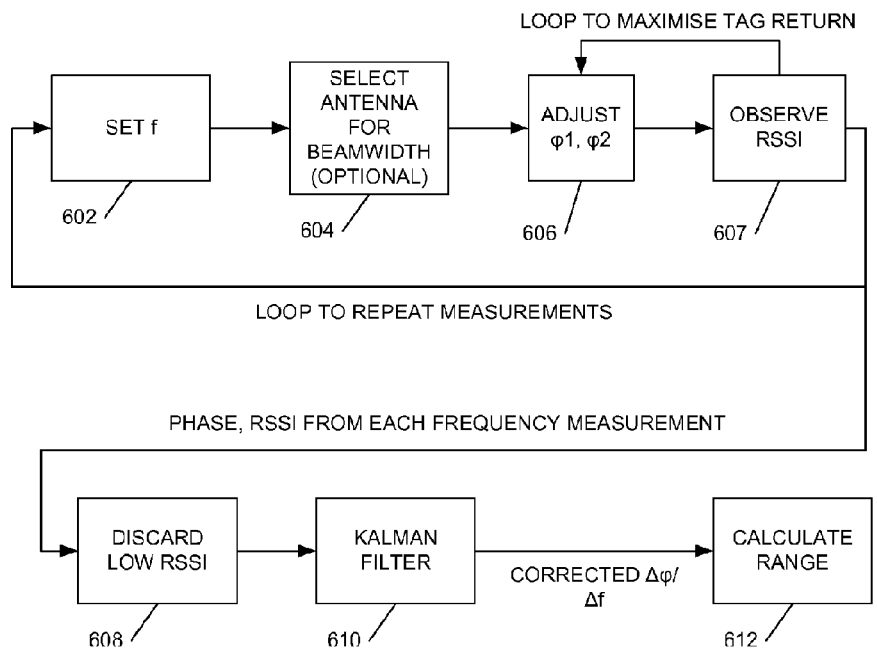
FIGS. 53a and 53b. Show, respectively, functional and structural blocked diagrams of a second embodiment of an RFDI tag location system according to a first aspect of the invention.
Figure 53B:
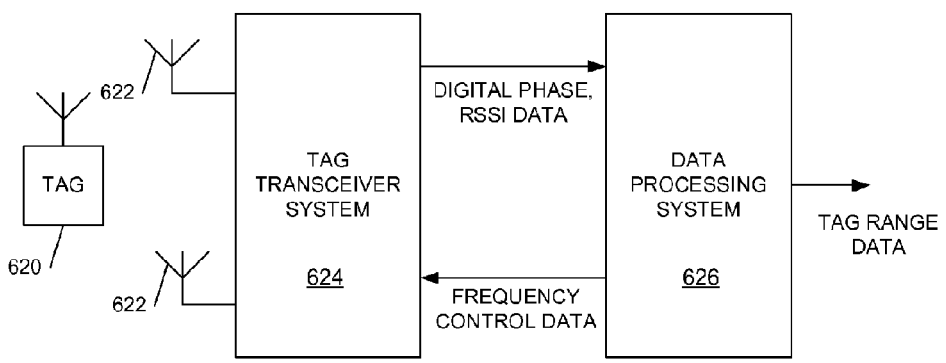

Referring now to FIGS. 53a and 53b, these show functional and structural block diagrams of a second embodiment of an RFID tag location system 600 according to a first aspect of the invention. Thus in module 602 a frequency is set and, optionally in module 604, a set of wide and/or narrow beamwidth antennas is selected for use. The system then enters a loop 606, 607 in which the relative phase of signals transmitted from two transmit antennas is adjusted and the received RSSI is observed, the relative phase being adjusted to maximise the return signal. At this point the phases of the two transmitted signals are substantially equal at the tag. The phase and RSSI data from this measurement is then passed to the backend processing, which may be substantially the same as that described with reference to FIG. 50a. Thus in embodiments this comprises discarding low RSSI signals 608, Kalman filtering 601 the result and using the filtered data to calculate an estimated range at 612 as previously described. Thus in embodiments a data processing system 626 controls a (tag) interrogation transceiver system 624 having a plurality of antennas 622 to communicate with tag 620. The implementation of FIG. 53b is broadly similar to that shown in FIG. 50b; the skilled person will appreciate that the functional modules of FIG. 53a may be implemented in hardware, software, or a combination of the two.

Concurrent Frequency Dithering Over Multiple Antennas Using Multiple Interrogation Transceivers Frequency dithering, in particular randomly selecting a frequency out of many, applied over multiple antennas, which transmit radio frequency (RF) signals simultaneously, can improve RFID coverage. This is due to the fact that varying the frequency over multiple antennas (which transmit simultaneously) results in both constructive and destructive interference signals from multiple antennas, and in areas of constructive interference the signal level is enhanced. Therefore applying frequency dithering (particularly when combined with phase dithering) over a multi-casting antenna system tends to show a further improvement in radio frequency identification (RFID) coverage compared to a switched antenna system.

We now describe how concurrent frequency dithering over multiple antennas as opposed to a sequential frequency dithering can provide increased speed in terms of one or both of (a) tag read rate and (b) location update rate in a DAS RFID system. This is due to two reasons. Firstly, the low-error tag reading system we have described above is based on varying frequency and phase over multiple antennas. This uses multiple frequencies to be transmitted to dither the location of nulls. If the frequency of RFID signals are dithered sequentially there is a need for multiple tag inventory rounds/cycles (comprising a set of time slots to read multiple tags). However, if the multiple frequencies are transmitted in parallel (i.e. concurrent frequency dithering), all the tags can then be read in reduced number of inventory rounds/cycles. In order to read RFID tags faster, we parallelise the dithering operations as much as possible in a DAS RFID system as previously described.

Secondly, the tag locating system we have described is partly based on measuring RSSI and phase shift of the coherent received tag backscatter signals and the measurements are taken over a number of frequencies from each antenna unit (AU). This can be done through a sequential frequency dithering over each AU. However, if we measure them simultaneously through parallelising the operations (i.e. multiple frequency transmission from each AU) then it is possible to improve the location update rate.

Figure 54A:
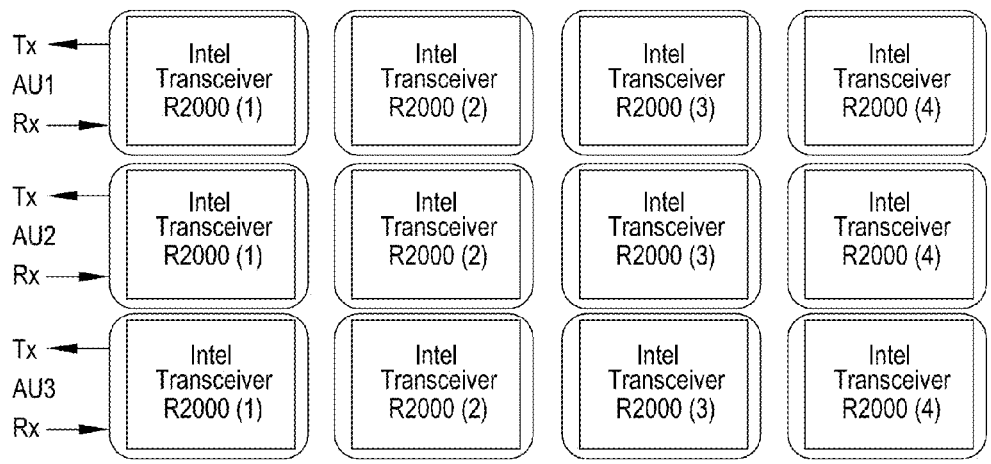
FIGS. 54a and 54b. Show first and second examples of interrogation transceiver systems in an embodiment of a second aspect of the invention, showing systems configured for concurrent frequency dithering over multiple antennas (as opposed to sequential frequency dithering) to parallelise operations in a DAS RFID system, using multiple transceiver circuits transmitting multiple frequencies simultaneously over each antenna unit (in FIG. 54a the numbers in brackets show the frequency channels).
Figure 54B:
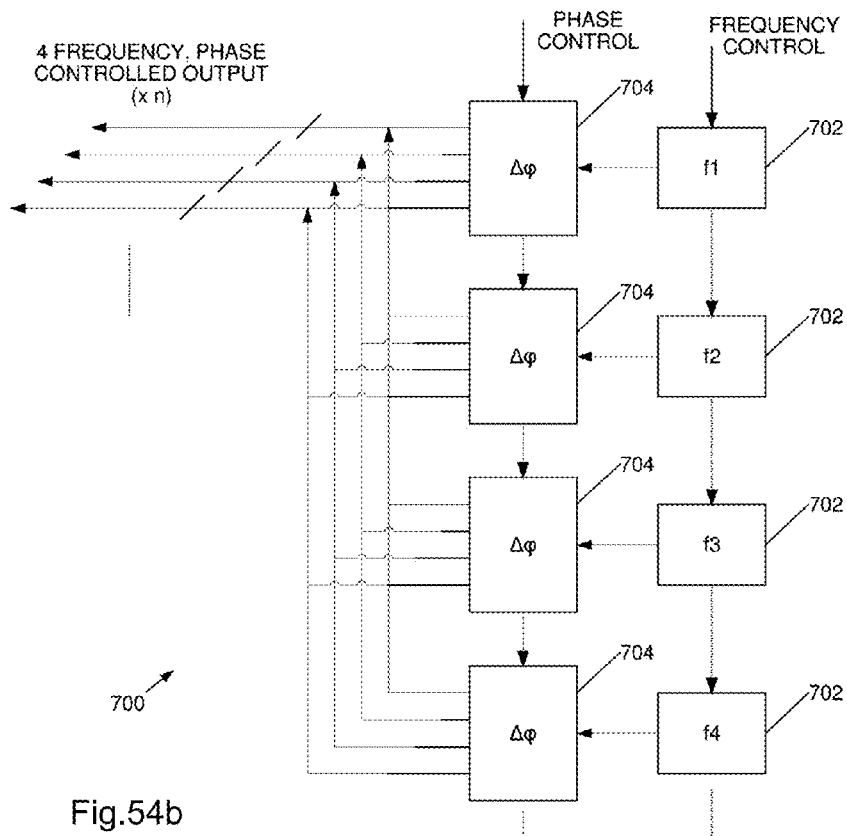

This parallelised operation can be implemented with multiple reader/transceiver chips 700 (leading to multiple RF front ends), which can enable transmission of multiple frequencies simultaneously over each AU as shown in FIG. 54a. For example, an integrator, which comprises 12 reader/transceivers, as shown in FIG. 54a, is capable of transmitting 4 frequencies to each of 3 antennas simultaneously. FIG. 54b shows a block diagram of an alternative RFID interrogation transceiver system 702 for providing a set of multiple frequency, phase controlled outputs to a corresponding set of antenna units. Thus the system of FIG. 54b comprises a set of controllable frequency sources 702 each having a respective phase control unit 704 providing multiple outputs each with a controllable phase, preferably providing independent phase control for each of the outputs. Outputs from each of the phase control blocks 704 are combined to provide a signal for one of the antenna units. In the example shown 4 frequencies and 4 antenna unit outputs are provided, but the skilled person will recognise that different number of frequencies and/or antenna unit outputs may be provided.

An arrangement of the type shown in FIG. 54 allows us to transmit multiple frequencies over each AU. This has a great impact on tag read speed/rate, as well as location update rate, resulting in a high speed sensing system.

This concurrent frequency dithering is possible in RFID system because the RFID tags are not tuned to a particular frequency in the RFID band, hence modulation of the backscatter will have substantially the same effect at multiple frequencies simultaneously. Due to the lack of frequency selectivity care should be taken to ensure that the same reader to tag commands are transmitted across all frequencies and AUs simultaneously otherwise RFID performance can be degraded due to multiple protocol commands.

To improve the tag read rate, multiple frequencies are multi-cast across all the antennas simultaneously such that frequency dithering can occur simultaneously rather than sequentially. To improve the location update rate, each AU may use several unique frequencies to allow the frequency dependent phase shift of the wireless channel from that particular AU to the tag to be recorded.

Figures 55A, 55B:
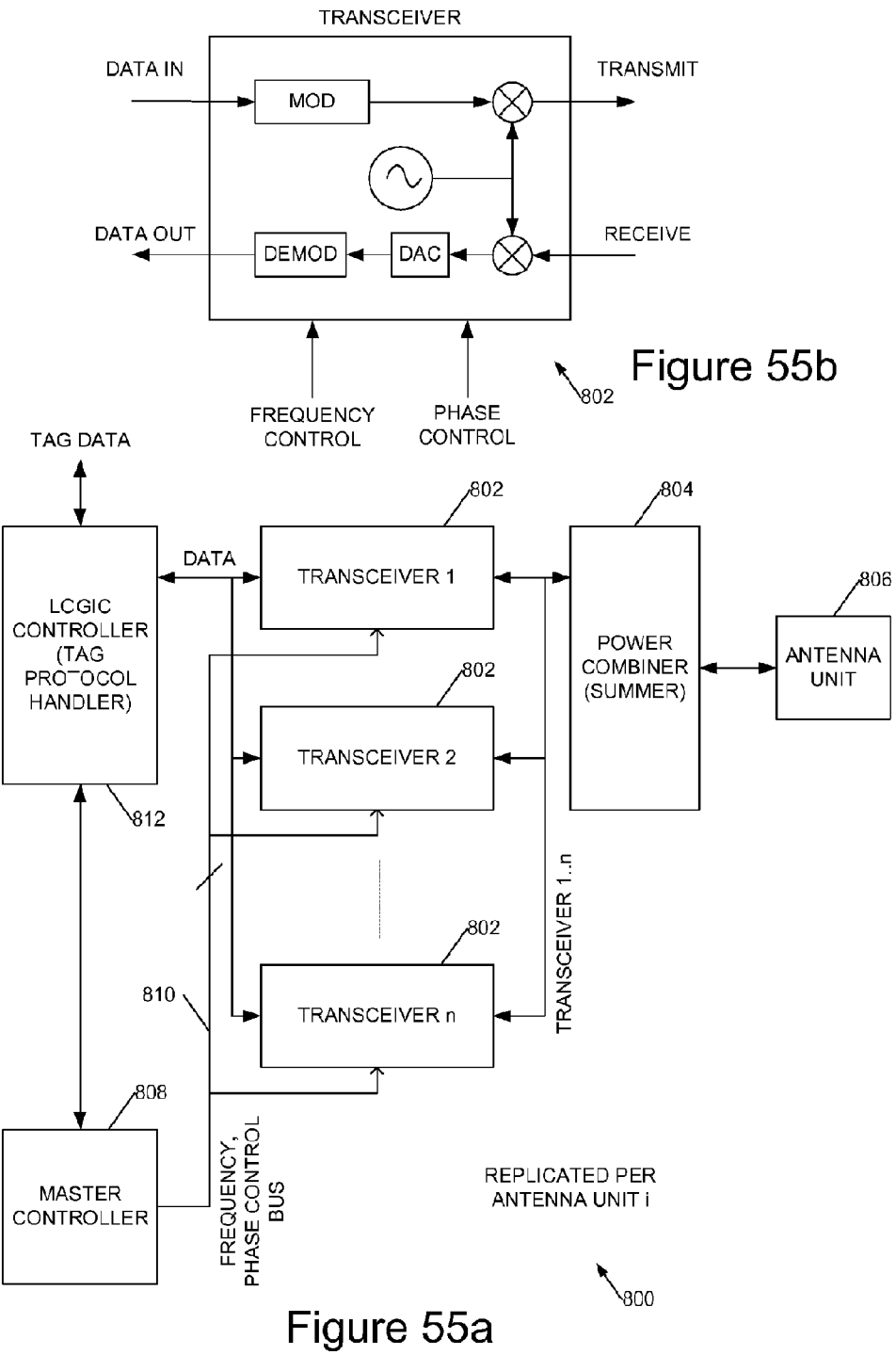
FIGS. 55a and 55b. Show, respectively, a blocked diagram of an embodiment of an RFID tag read/location system according to a second aspect of the invention, and an example transceiver for the system.

Referring now to FIG. 55a, this shows a block diagram of an RFID tag reading/location system 800 according to an embodiment of a second aspect of the invention. The system comprises a plurality of transceivers 802 each for example as shown in FIG. 55b, configured to provide frequency and phase control via a bus. The outputs from the transceivers are combined in a power combiner or summer 804 which in turn is coupled to an antenna unit 806. A master controller 808 controls the frequency and phase of the transceivers 802 via a control bus 810 in order to provide frequency and phase dither. A logic controller 812 handles the tag protocol and provides an interface for reading and/or writing data from/to a tag using transceivers 802. The controller 812 cooperates with the master controller 808 to implement a multiple concurrent frequency communication/location protocol as described above.

The skilled person will appreciate that embodiments of the above described techniques may be employed for tag location and/or improved coverage/reduced error reading. The skilled person will also appreciate that the tag location systems and the tag reading/location system described above may be employed when multiple tags are present simultaneously.

Thus in broad terms, in embodiments we have described a location approach based on three main principles:
1. It is very difficult to determine the location of a tag if it is in or near a null. As a result
   a. Use several antennas so that the likelihood of nulls is reduced
   b. Dynamically spatially shift any nulls by frequency dithering, phase dithering and antenna switching so that location accuracy is enhanced.
   c. Reduce the likelihood of indirect paths causing interference which leads to nulls by using beamed antennas (i.e. narrow beam-width antennas)
2. Use combination of phase information from the received tag backscatter signal or from the transmitted carrier signal at tag location and RSSI to increase accuracy
3. Be selective of use of information from system—i.e. neglect low RSSI signals (or use weighting techniques/Kalman filtering) to minimise causes of errors.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of locating an RFID tag in a multipath environment including reflected signal paths, the method comprising:
   transmitting tag location signals from a plurality of different transmit antennas, wherein said antennas are spaced apart by a distance of more than a near field limit at a frequency of a said signal, wherein said near field limit is $D^2/(4\lambda)$ where $\lambda$ is a wavelength at said frequency of said signal and D is a maximum dimension of one of said antennas, wherein D is expressed in centimeters and a quotient of the near field limit is greater than 1 centimeter;
   receiving a corresponding plurality of return signals from said tag; and
   processing said tag return signals to determine a range to said tag;
   wherein said transmitting comprises transmitting at a plurality of different frequencies, relative phase, or both;
   wherein said processing comprises determining a phase difference at said plurality of different frequencies to determine said range by evaluating a phase-frequency gradient $\Delta\phi/\Delta f$ where $\Delta\phi$ is said phase difference between frequencies with a frequency difference $\Delta f$, and wherein said determining of said phase difference determines a phase difference between either:
   i) two of said transmit signals or
   ii) a first transmit signal and its corresponding return signal; and
   wherein said determining of said range to said tag employs multiple transmissions from said plurality of different transmit antennas and receiving from said plurality of different transmit antennas with a phase-frequency gradient weighting for uses said return signals determined responsive to respective received signal strengths of the return signals to mitigate erroneous range measurements resulting from said reflected signal paths weighted responsive to a respective received signal strength of the return signal.

2. A method as claimed in claim 1, wherein said determining of said phase difference comprises determining a phase difference between a said transmit signal and its corresponding return signal at a first frequency and at a second frequency, and repeating said determining of said phase difference at a plurality of said first and second frequencies, maintaining a substantially constant frequency offset between said first and second frequencies.

3. A method as claimed in claim 2, further comprising exchanging between antennas used to transmit said transmit signal and receive said return signal to use a transmit antenna for a receiver antenna and vice-versa when determining a said phase difference.

4. A method as claimed in claim 1, wherein said determining of said phase difference comprises determining a phase difference between two transmit signals simultaneously transmitted towards said RFID tag which substantially maximises a return signal from said RFID tag.

5. A method as claimed in claim 4, comprising adjusting a relative phase of said signals simultaneously transmitted towards said RFID tag to substantially maximise said return signal.

6. A method as claimed in claim 1, further comprising determining a said phase difference using antennas of a plurality of different beamwidths.

7. A method as claimed in claim 1, wherein weighting of said return signals comprises thresholding said return signals to discard return signals below a threshold received signal strength when determining said range to said tag.

8. A method as claimed in claim 1, further comprising applying a prediction-correction filter to a plurality of said phase differences at said plurality of different frequencies to determine a plurality of corrected estimates of said phase differences, wherein a said corrected estimate of a said phase difference is dependent on a phase variance value responsive to said received signal strength for the return signal from which the said phase difference was derived.

9. A method as claimed in claim 8, wherein said prediction-correction filter comprises a Kalman filter.

10. A method as derives in claim 1, herein said RFID tag is a passive, backscatter modulation tag.

11. A method as claimed in claim 1, wherein said transmitting at said plurality of different frequencies is performed sequentially.

12. A method as claimed in claim 1, wherein said transmitting at said plurality of different frequencies is performed simultaneously.

13. A system for locating an RFID tag in a multipath environment including reflected signal paths, the system comprising:
a transmitter to transmit tag location signals from a plurality of different transmit antennas, wherein said antennas are spaced apart by a distance of more than a near new field limit distance at a frequency of a said signal, wherein said near field limit is $D^2/(4\lambda)$ where $\lambda$ is a wavelength at said frequency of said signal and D is a maximum dimension of said antennas, wherein D is expressed in centimeters and a quotient of the near field limit is greater than 1 centimeter; and
a processor to process said tag return signals to determine a range to said tag; wherein said transmitting comprises transmitting at a plurality of different frequencies, relative phase, or both;
wherein said processing comprises determining a phase difference at said plurality of different frequencies to determine said range by evaluating a phase-frequency gradient $\Delta\phi/\Delta f$ where $\Delta\phi$ is said phase difference between frequencies with a frequency difference $\Delta f$, and wherein said determining of said phase difference determines a phase difference between either:
i) two of said transmit signals or
ii) a first transmit signal and its corresponding return signal; and-4-Serial No. wherein said determining of said range to said tag employs multiple transmissions from said plurality of different transmit antennas and receiving from said plurality of different transmit antennas with a phase-frequency gradient weighting for uses said return signals determined responsive to respective received signal strengths of the return signals to mitigate erroneous range measurements resulting from said reflected signal paths weighted responsive to a respective received signal strength of the return signal.

* * * * *